United States Patent
Powell

(10) Patent No.: US 10,471,299 B2
(45) Date of Patent: Nov. 12, 2019

(54) SYSTEMS AND METHODS FOR COOLING INTERNAL EXERCISE EQUIPMENT COMPONENTS

(71) Applicant: ICON Health & Fitness, Inc., Logan, UT (US)

(72) Inventor: Wade A. Powell, Logan, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 3 days.

(21) Appl. No.: 15/639,935

(22) Filed: Jun. 30, 2017

(65) Prior Publication Data

US 2018/0001135 A1 Jan. 4, 2018

Related U.S. Application Data

(60) Provisional application No. 62/357,815, filed on Jul. 1, 2016.

(51) Int. Cl.
| | |
|---|---|
| *A63B 21/00* | (2006.01) |
| *A63B 22/02* | (2006.01) |
| *A63B 21/22* | (2006.01) |
| *H02K 9/06* | (2006.01) |
| *A63B 22/18* | (2006.01) |
| *A63B 22/00* | (2006.01) |
| *A63B 71/06* | (2006.01) |
| *A63B 22/06* | (2006.01) |

(52) U.S. Cl.
CPC ........ *A63B 22/0257* (2013.01); *A63B 21/154* (2013.01); *A63B 21/225* (2013.01); *H02K 9/06* (2013.01); *A63B 22/00* (2013.01); *A63B 22/0076* (2013.01); *A63B 22/0235* (2013.01); *A63B 22/0605* (2013.01); *A63B 22/0664* (2013.01); *A63B 22/18* (2013.01); *A63B 71/0622* (2013.01); *A63B 2220/18* (2013.01); *A63B 2220/20* (2013.01); *A63B 2225/30* (2013.01); *A63B 2230/06* (2013.01); *A63B 2230/75* (2013.01)

(58) Field of Classification Search
CPC ..................................................... A63B 22/02
See application file for complete search history.

(56) References Cited

U.S. PATENT DOCUMENTS

| | | | |
|---|---|---|---|
| 232,022 | A | 9/1880 | Gifford |
| 284,294 | A | 9/1883 | Graves |
| 321,388 | A | 6/1885 | Ruebsam |
| 339,638 | A | 4/1886 | Goldie |

(Continued)

FOREIGN PATENT DOCUMENTS

| | | |
|---|---|---|
| CN | 102357284 | 5/2013 |
| CN | 106310589 | 11/2018 |

(Continued)

OTHER PUBLICATIONS

Taiwan Office Action and Search Report issued in 106122194 dated Jan. 19, 2018 with English Translation.

(Continued)

*Primary Examiner* — Stephen R Crow
(74) *Attorney, Agent, or Firm* — Ray Quinney & Nebeker

(57) ABSTRACT

An exercise machine may include a deck, a lift motor connected to the deck, and a cooling mechanism that cools the lift motor when the cooling mechanism is activated.

15 Claims, 9 Drawing Sheets

(56) References Cited

U.S. PATENT DOCUMENTS

| | | |
|---|---|---|
| 421,779 A | 2/1890 | Steven |
| 447,780 A | 3/1891 | Luge |
| 450,792 A | 4/1891 | Dodd |
| 659,216 A | 10/1900 | Dowling |
| 663,486 A | 12/1900 | Boren |
| 674,391 A | 5/1901 | Baker |
| 683,284 A | 9/1901 | Honey |
| 766,930 A | 8/1904 | Clemons |
| 881,521 A | 3/1908 | Wilson |
| 897,722 A | 9/1908 | Day |
| 931,394 A | 8/1909 | Day |
| 937,795 A | 10/1909 | Hackney |
| 1,016,729 A | 2/1912 | Barrett |
| 1,020,777 A | 3/1912 | Peterson |
| 1,064,968 A | 6/1913 | Lauraine |
| 1,082,940 A | 12/1913 | Flora |
| 1,211,765 A | 1/1917 | Schmidt |
| 1,570,482 A | 1/1926 | Hale |
| 1,580,530 A | 4/1926 | Rambo |
| 1,585,748 A | 5/1926 | Wendelken |
| 1,715,870 A | 6/1929 | Augustine |
| 1,766,089 A | 6/1930 | Wood |
| 1,778,635 A | 10/1930 | Heisler |
| 1,824,406 A | 9/1931 | Petersime |
| 1,850,530 A | 3/1932 | Brown |
| 1,893,728 A | 1/1933 | Bullis |
| 1,902,694 A | 3/1933 | Edwards |
| 1,919,627 A | 7/1933 | Fitz Gerald |
| 1,928,089 A | 9/1933 | Blickman |
| 1,973,945 A | 9/1934 | Chavin |
| 1,978,579 A | 10/1934 | Hooks |
| 1,982,843 A | 12/1934 | Traver |
| 2,067,136 A | 1/1937 | Bridenbaugh |
| 2,117,957 A | 5/1938 | Ritter |
| 2,165,700 A | 7/1939 | Henry |
| 2,177,957 A | 10/1939 | Stewart |
| 2,219,219 A | 10/1940 | Boger |
| 2,247,946 A | 7/1941 | Hein et al. |
| 2,255,864 A | 9/1941 | Stephens |
| 2,315,485 A | 4/1943 | Le Roy |
| 2,399,915 A | 5/1946 | Drake |
| 2,440,644 A | 4/1948 | Powell |
| 2,569,007 A | 9/1951 | Klyce |
| 2,607,816 A | 8/1952 | Ryder |
| 2,632,645 A | 3/1953 | Barkschat |
| 2,645,539 A | 7/1953 | Thompson |
| 2,646,282 A | 7/1953 | Ringman |
| 2,648,540 A | 8/1953 | Hunter |
| 2,674,453 A | 4/1954 | Hummert |
| 2,743,623 A | 5/1956 | Wells |
| 2,746,822 A | 5/1956 | Copenhaver |
| 2,842,365 A | 7/1958 | Kelley |
| 2,855,200 A | 10/1958 | Blickman |
| 2,874,971 A | 2/1959 | Devery |
| 2,969,060 A | 1/1961 | Swanda |
| 2,984,594 A | 5/1961 | Runton |
| 3,035,671 A | 5/1962 | Sicherman |
| 3,059,312 A | 10/1962 | Jamieson |
| 3,068,950 A | 12/1962 | Davidson |
| 3,072,426 A | 1/1963 | Gilbert |
| 3,112,108 A | 11/1963 | Hanke |
| 3,127,171 A | 3/1964 | Noland et al. |
| 3,179,071 A | 4/1965 | Johnston |
| 3,193,287 A | 7/1965 | Robinson |
| 3,205,888 A | 9/1965 | Stroop |
| 3,316,898 A | 5/1967 | Brown |
| 3,319,273 A | 5/1967 | Solin |
| 3,322,338 A | 5/1967 | Stallman et al. |
| 3,342,485 A | 9/1967 | Gaul |
| 3,345,067 A | 10/1967 | Smith |
| 3,358,813 A | 12/1967 | Kohlhagen |
| 3,368,746 A * | 2/1968 | Zelinski ............... F04D 25/082 416/170 R |
| 3,378,259 A | 4/1968 | Kupchinski |
| 3,408,067 A | 10/1968 | Armstrong |
| 3,408,069 A | 10/1968 | Lewis |
| 3,411,497 A | 11/1968 | Rickey et al. |
| 3,416,174 A | 12/1968 | Novitske |
| 3,430,084 A | 2/1969 | Hall |
| 3,430,507 A | 3/1969 | Hurst et al. |
| 3,438,627 A | 4/1969 | La Lanne |
| 3,444,830 A | 5/1969 | Doetsch |
| 3,446,503 A | 5/1969 | Lawton |
| 3,501,140 A | 3/1970 | Eichorn |
| 3,511,500 A | 5/1970 | Dunn |
| 3,514,110 A | 5/1970 | Thomander |
| 3,518,985 A | 7/1970 | Quinton |
| 3,547,435 A | 12/1970 | Scott |
| 3,554,541 A | 1/1971 | Seaman |
| 3,563,541 A | 2/1971 | Sanquist |
| 3,566,861 A | 3/1971 | Weiss |
| 3,567,219 A | 3/1971 | Foster |
| 3,568,669 A | 3/1971 | Stites |
| 3,572,700 A | 3/1971 | Mastropaolo |
| 3,583,465 A | 6/1971 | Youngs et al. |
| 3,586,322 A | 6/1971 | Kverneland |
| 3,589,715 A | 6/1971 | Mark |
| 3,592,466 A | 7/1971 | Parsons |
| 3,598,404 A | 8/1971 | Bowman |
| 3,602,502 A | 8/1971 | Jaegar |
| 3,606,320 A | 9/1971 | Erwin, Jr. |
| 3,608,898 A | 9/1971 | Berlin |
| 3,614,097 A | 10/1971 | Blickman |
| 3,628,654 A | 12/1971 | Haracz |
| 3,628,791 A | 12/1971 | Garcia |
| 3,634,895 A | 1/1972 | Childers |
| 3,636,577 A | 1/1972 | Nissen |
| 3,638,941 A | 2/1972 | Kulkens |
| 3,640,528 A | 2/1972 | Proctor |
| 3,641,601 A | 2/1972 | Sieg |
| 3,642,279 A | 2/1972 | Cutter |
| 3,643,943 A | 2/1972 | Erwin, Jr. et al. |
| 3,650,529 A | 3/1972 | Salm |
| 3,658,327 A | 4/1972 | Thiede |
| 3,659,845 A | 5/1972 | Quinton |
| 3,664,666 A | 5/1972 | Lloyd |
| 3,686,776 A | 8/1972 | Dahl |
| 3,689,066 A | 9/1972 | Hagen |
| 3,703,284 A | 11/1972 | Hesen |
| 3,708,166 A | 1/1973 | Annas |
| 3,709,197 A | 1/1973 | Moseley |
| 3,731,917 A | 5/1973 | Townsend |
| 3,738,649 A | 6/1973 | Miller |
| 3,741,538 A | 6/1973 | Useldinger |
| 3,751,033 A | 8/1973 | Rosenthal |
| 3,756,595 A | 9/1973 | Hague |
| 3,767,195 A | 10/1973 | Dimick |
| 3,788,412 A | 1/1974 | Vincent |
| 3,792,860 A | 2/1974 | Seines |
| 3,809,393 A | 5/1974 | Jones |
| 3,814,420 A | 6/1974 | Encke |
| 3,822,488 A | 7/1974 | Johnson |
| 3,826,491 A | 7/1974 | Elder |
| 3,848,467 A | 11/1974 | Flavell |
| 3,851,874 A | 12/1974 | Wilkin |
| 3,858,938 A | 1/1975 | Kristensson et al. |
| 3,861,215 A | 1/1975 | Bradley |
| 3,869,121 A | 3/1975 | Flavell |
| 3,870,297 A | 3/1975 | Elder |
| 3,874,657 A | 4/1975 | Niebojewski |
| 3,880,274 A | 4/1975 | Bechtloff |
| 3,883,922 A | 5/1975 | Fleischhauer |
| 3,892,404 A | 7/1975 | Martucci |
| 3,901,379 A | 8/1975 | Bruhm |
| 3,903,613 A | 9/1975 | Bisberg |
| 3,904,196 A | 9/1975 | Berlin |
| 3,909,857 A | 10/1975 | Herrera |
| 3,912,263 A | 10/1975 | Yatso |
| 3,918,710 A | 11/1975 | Niebojewski |
| 3,926,430 A | 12/1975 | Good, Jr. |
| 3,929,026 A | 12/1975 | Hofmann |
| 3,938,400 A | 2/1976 | Konyha |
| 3,941,377 A | 3/1976 | Lie |
| 3,948,513 A | 4/1976 | Pfotenhauer |

(56) References Cited

U.S. PATENT DOCUMENTS

| | | |
|---|---|---|
| 3,963,101 A | 6/1976 | Stadelmann et al. |
| 3,977,451 A | 8/1976 | Duba |
| 3,981,500 A | 9/1976 | Ryan |
| 4,012,015 A | 3/1977 | Nelson et al. |
| 4,024,949 A | 5/1977 | Kleysteuber et al. |
| 4,026,545 A | 5/1977 | Schonenberger |
| 4,033,567 A | 7/1977 | Lipfert |
| 4,056,265 A | 11/1977 | Ide |
| 4,063,726 A | 12/1977 | Wilson |
| 4,063,727 A | 12/1977 | Hall |
| 4,066,257 A | 1/1978 | Moller |
| 4,066,259 A | 1/1978 | Brentham |
| 4,067,372 A | 1/1978 | Masson |
| 4,072,309 A | 2/1978 | Wilson |
| 4,077,626 A | 3/1978 | Newman |
| 4,082,267 A | 4/1978 | Flavell |
| 4,093,196 A | 6/1978 | Bauer |
| 4,094,330 A | 6/1978 | Jong |
| 4,111,417 A | 9/1978 | Gardner |
| 4,113,071 A | 9/1978 | Muller et al. |
| 4,120,294 A | 10/1978 | Wolfe |
| 4,141,158 A | 2/1979 | Benseler et al. |
| 4,146,222 A | 3/1979 | Hribar |
| 4,149,714 A | 4/1979 | Lambert, Jr. |
| 4,151,988 A | 5/1979 | Nabinger |
| 4,151,994 A | 5/1979 | Stalberger, Jr. |
| 4,161,998 A | 7/1979 | Trimble |
| 4,167,938 A | 9/1979 | Remih |
| 4,168,061 A | 9/1979 | Gordon |
| 4,171,805 A | 10/1979 | Abbott |
| 4,179,134 A | 12/1979 | Atkinson |
| 4,183,156 A | 1/1980 | Rudy |
| 4,183,494 A | 1/1980 | Cleveland |
| 4,188,030 A | 2/1980 | Hooper |
| 4,199,139 A | 4/1980 | Mahnke |
| 4,204,673 A | 5/1980 | Speer, Sr. |
| 4,208,049 A | 6/1980 | Wilson |
| 4,215,516 A | 8/1980 | Huschle et al. |
| 4,216,856 A | 8/1980 | Moring et al. |
| 4,227,689 A | 10/1980 | Keiser |
| 4,235,437 A | 11/1980 | Ruis et al. |
| 4,240,627 A | 12/1980 | Brentham |
| 4,248,476 A | 2/1981 | Phelps |
| 4,249,725 A | 2/1981 | Mattox |
| 4,251,932 A | 2/1981 | Love |
| 4,253,661 A | 3/1981 | Russell |
| 4,258,821 A | 3/1981 | Wendt |
| 4,258,913 A | 3/1981 | Brentham |
| 4,274,625 A | 6/1981 | Gaetano |
| 4,278,095 A | 7/1981 | Lapeyre |
| 4,278,249 A | 7/1981 | Forrest |
| 4,286,782 A | 9/1981 | Fuhrhop |
| 4,290,601 A | 9/1981 | Mittelstadt |
| 4,300,761 A | 11/1981 | Howard |
| 4,313,602 A | 2/1982 | Sullivan |
| 4,313,603 A | 2/1982 | Simjian |
| 4,324,501 A | 4/1982 | Herbenar |
| 4,333,978 A | 6/1982 | Kocher |
| 4,334,676 A | 6/1982 | Schonenberger |
| 4,334,695 A | 6/1982 | Ashby |
| 4,337,283 A | 6/1982 | Haas, Jr. |
| 4,342,452 A | 8/1982 | Summa |
| 4,344,616 A | 8/1982 | Ogden |
| 4,349,597 A | 9/1982 | Fine et al. |
| 4,350,336 A | 9/1982 | Hanford |
| 4,358,105 A | 11/1982 | Sweeney, Jr. |
| 4,363,480 A | 12/1982 | Fisher et al. |
| 4,363,486 A | 12/1982 | Chaudhry |
| 4,367,895 A | 1/1983 | Pacitti et al. |
| 4,369,081 A | 1/1983 | Curry et al. |
| 4,370,766 A | 2/1983 | Teague, Jr. |
| 4,374,587 A | 2/1983 | Ogden |
| 4,377,045 A | 3/1983 | Aurensan |
| 4,383,684 A | 5/1983 | Schliep |
| 4,383,714 A | 5/1983 | Ishida |
| 4,397,462 A | 8/1983 | Wilmarth |
| 4,406,451 A | 9/1983 | Gaetano |
| 4,408,613 A | 10/1983 | Relyea |
| 4,422,635 A | 12/1983 | Herod |
| 4,422,636 A | 12/1983 | de Angeli |
| 4,423,864 A | 1/1984 | Wiik |
| 4,426,077 A | 1/1984 | Becker |
| 4,431,181 A | 2/1984 | Baswell |
| 4,434,981 A | 3/1984 | Norton |
| 4,441,708 A | 4/1984 | Brentham |
| 4,445,684 A | 5/1984 | Ruff |
| 4,452,448 A | 6/1984 | Ausherman |
| 4,453,766 A | 6/1984 | DiVito |
| 4,461,472 A | 7/1984 | Martinez |
| 4,465,277 A | 8/1984 | Dittrich |
| 4,476,582 A | 10/1984 | Strauss et al. |
| 4,477,071 A | 10/1984 | Brown et al. |
| 4,489,933 A | 12/1984 | Fisher |
| 4,491,318 A | 1/1985 | Francke |
| 4,492,380 A | 1/1985 | Saytar |
| 4,494,662 A | 1/1985 | Clymer |
| 4,496,147 A | 1/1985 | DeCloux et al. |
| 4,499,784 A | 2/1985 | Shum |
| 4,502,679 A | 3/1985 | De Lorenzo |
| 4,505,474 A | 3/1985 | Mattox |
| 4,505,475 A | 3/1985 | Olschansky et al. |
| 4,509,510 A | 4/1985 | Hook |
| 4,512,567 A | 4/1985 | Phillips |
| 4,512,571 A | 4/1985 | Hermelin |
| 4,522,394 A | 6/1985 | Broussard |
| 4,529,194 A | 7/1985 | Haaheim |
| 4,533,136 A | 8/1985 | Smith et al. |
| 4,536,244 A | 8/1985 | Greci et al. |
| 4,538,805 A | 9/1985 | Parviainen |
| 4,542,899 A | 9/1985 | Hendricks |
| 4,544,152 A | 10/1985 | Taitel |
| 4,544,153 A | 10/1985 | Babcock |
| 4,546,971 A | 10/1985 | Raasoch |
| 4,548,405 A | 10/1985 | Lee |
| 4,549,733 A | 10/1985 | Salyer |
| 4,555,108 A | 11/1985 | Monteiro |
| 4,556,216 A | 12/1985 | Pitkanen |
| 4,563,001 A | 1/1986 | Terauds |
| 4,563,003 A | 1/1986 | Bugallo et al. |
| 4,564,193 A | 1/1986 | Stewart |
| 4,566,689 A | 1/1986 | Ogden |
| 4,566,732 A | 1/1986 | Ostergaard, Sr. |
| 4,569,518 A | 2/1986 | Fulks |
| 4,571,682 A | 2/1986 | Silverman et al. |
| 4,572,500 A | 2/1986 | Weiss |
| 4,572,504 A | 2/1986 | DiBartolo |
| 4,576,352 A | 3/1986 | Ogden |
| 4,576,376 A | 3/1986 | Miller |
| 4,577,860 A | 3/1986 | Matias et al. |
| 4,580,983 A | 4/1986 | Cassini et al. |
| 4,581,269 A | 4/1986 | Tilman |
| 4,582,320 A | 4/1986 | Shaw |
| 4,583,916 A | 4/1986 | Senghaas |
| 4,589,656 A | 5/1986 | Baldwin |
| 4,591,147 A | 5/1986 | Smith et al. |
| 4,592,544 A | 6/1986 | Smith et al. |
| 4,600,196 A | 7/1986 | Jones |
| 4,601,142 A | 7/1986 | Frommelt |
| 4,602,779 A | 7/1986 | Ogden |
| 4,610,449 A | 9/1986 | Diercks, Jr. |
| 4,614,337 A | 9/1986 | Schonenberger |
| 4,616,822 A | 10/1986 | Trulaske |
| 4,618,139 A | 10/1986 | Haaheim |
| 4,618,140 A | 10/1986 | Brown |
| 4,619,454 A | 10/1986 | Walton |
| 4,621,623 A | 11/1986 | Wang |
| 4,624,457 A | 11/1986 | Silberman et al. |
| 4,625,962 A | 12/1986 | Street |
| 4,627,614 A | 12/1986 | De Angeli |
| 4,627,615 A | 12/1986 | Nurkowski |
| 4,627,616 A | 12/1986 | Kauffman |
| 4,630,817 A | 12/1986 | Buckley |
| 4,632,385 A | 12/1986 | Geraci |
| 4,632,386 A | 12/1986 | Beech |

(56) References Cited

U.S. PATENT DOCUMENTS

| | | |
|---|---|---|
| 4,632,390 A | 12/1986 | Richey |
| 4,634,127 A | 1/1987 | Rockwell |
| 4,635,927 A | 1/1987 | Shu |
| 4,635,928 A | 1/1987 | Ogden et al. |
| 4,637,605 A | 1/1987 | Ritchie |
| 4,638,523 A | 1/1987 | Todd |
| 4,638,969 A | 1/1987 | Brown |
| 4,641,833 A | 2/1987 | Trethewey |
| 4,642,080 A | 2/1987 | Takano et al. |
| 4,643,418 A | 2/1987 | Bart |
| 4,645,197 A | 2/1987 | Mcfee |
| 4,645,200 A | 2/1987 | Hix |
| 4,645,201 A | 2/1987 | Evans |
| 4,645,917 A | 2/1987 | Penney et al. |
| 4,647,041 A | 3/1987 | Whiteley |
| 4,650,067 A | 3/1987 | Brule |
| 4,650,184 A | 3/1987 | Brebner |
| 4,650,185 A | 3/1987 | Cartwright |
| 4,651,581 A | 3/1987 | Svensson |
| 4,659,074 A | 4/1987 | Taitel et al. |
| 4,659,077 A | 4/1987 | Stropkay |
| 4,659,078 A | 4/1987 | Blome |
| 4,662,630 A | 5/1987 | Dignard et al. |
| 4,664,371 A | 5/1987 | Viander |
| 4,664,373 A | 5/1987 | Hait |
| 4,664,646 A | 5/1987 | Rorabaugh |
| 4,673,177 A | 6/1987 | Szymski |
| 4,674,740 A | 6/1987 | Iams et al. |
| 4,674,743 A | 6/1987 | Hirano |
| 4,678,185 A | 7/1987 | Mahnke |
| 4,679,787 A | 7/1987 | Guilbault |
| 4,684,121 A | 8/1987 | Nestegard |
| 4,685,670 A | 8/1987 | Zinkin |
| 4,687,195 A | 8/1987 | Potts |
| 4,697,809 A | 10/1987 | Rockwell |
| 4,700,946 A | 10/1987 | Breunig |
| 4,702,475 A | 10/1987 | Elstein et al. |
| 4,705,267 A | 11/1987 | Jackson |
| 4,708,337 A | 11/1987 | Shyu |
| 4,709,917 A | 12/1987 | Yang |
| 4,709,918 A | 12/1987 | Grinblat |
| 4,709,920 A | 12/1987 | Schnell |
| 4,711,447 A | 12/1987 | Mansfield |
| 4,714,248 A | 12/1987 | Koss |
| 4,718,207 A | 1/1988 | Frommelt |
| 4,720,093 A | 1/1988 | Del Mar |
| 4,720,099 A | 1/1988 | Carlson |
| 4,720,789 A | 1/1988 | Hector et al. |
| 4,721,303 A | 1/1988 | Fitzpatrick |
| 4,725,057 A | 2/1988 | Shifferaw |
| 4,726,581 A | 2/1988 | Chang |
| 4,729,558 A | 3/1988 | Kuo |
| 4,729,562 A | 3/1988 | Pipasik |
| 4,733,858 A | 3/1988 | Lan |
| 4,743,009 A | 5/1988 | Beale |
| 4,743,015 A | 5/1988 | Marshall |
| 4,744,559 A | 5/1988 | Mahnke et al. |
| 4,746,115 A | 5/1988 | Lahman |
| 4,749,181 A | 6/1988 | Pittaway |
| 4,749,184 A | 6/1988 | Tobin |
| 4,750,736 A | 6/1988 | Watterson |
| 4,751,755 A | 6/1988 | Carey, Jr. et al. |
| 4,756,098 A | 7/1988 | Boggia |
| 4,757,987 A | 7/1988 | Allemand |
| 4,759,540 A | 7/1988 | Yu et al. |
| 4,771,148 A | 9/1988 | Bersonnet |
| 4,772,015 A | 9/1988 | Carlson et al. |
| 4,773,170 A | 9/1988 | Moore et al. |
| 4,776,582 A | 10/1988 | Ramhorst |
| 4,779,884 A | 10/1988 | Minati |
| 4,786,049 A | 11/1988 | Lautenschlager |
| 4,786,050 A | 11/1988 | Geschwender |
| 4,788,493 A * | 11/1988 | Liptak ............ G01R 19/14 318/376 |
| 4,790,528 A | 12/1988 | Nakao et al. |
| 4,792,134 A | 12/1988 | Chen |
| 4,797,968 A | 1/1989 | Wenzlick |
| 4,798,760 A | 1/1989 | Diaz-Kotti |
| 4,799,475 A | 1/1989 | Iams et al. |
| 4,799,671 A | 1/1989 | Hoggan et al. |
| 4,804,178 A | 2/1989 | Friedebach |
| 4,805,901 A | 2/1989 | Kulick |
| 4,807,874 A | 2/1989 | Little |
| 4,809,804 A | 3/1989 | Houston et al. |
| 4,809,972 A | 3/1989 | Rasmussen et al. |
| 4,813,667 A | 3/1989 | Watterson |
| 4,813,668 A | 3/1989 | Solloway |
| 4,813,743 A | 3/1989 | Mizelle |
| 4,817,939 A | 4/1989 | Augspurger et al. |
| 4,818,175 A | 4/1989 | Kimura |
| 4,819,583 A | 4/1989 | Guerra |
| 4,822,029 A | 4/1989 | Sarno |
| 4,822,034 A | 4/1989 | Shields |
| 4,824,104 A | 4/1989 | Bloch |
| 4,826,153 A | 5/1989 | Schalip |
| 4,826,157 A | 5/1989 | Fitzpatrick |
| 4,826,158 A | 5/1989 | Fields, Jr. |
| 4,826,159 A | 5/1989 | Hersey |
| 4,828,255 A | 5/1989 | Lahman |
| 4,828,257 A | 5/1989 | Dyer et al. |
| 4,830,362 A | 5/1989 | Bull |
| 4,832,332 A | 5/1989 | Dumbser |
| 4,836,530 A | 6/1989 | Stanley, Jr. |
| 4,838,543 A | 6/1989 | Armstrong et al. |
| 4,838,544 A | 6/1989 | Sasakawa et al. |
| 4,842,266 A | 6/1989 | Sweeney, Sr. |
| 4,842,274 A | 6/1989 | Oosthuizen |
| 4,844,449 A | 7/1989 | Truslaske |
| 4,844,450 A | 7/1989 | Rodgers, Jr. |
| 4,848,737 A | 7/1989 | Ehrenfield |
| 4,850,585 A | 7/1989 | Dalebout |
| 4,861,023 A | 8/1989 | Wedman |
| 4,861,025 A | 8/1989 | Rockwell |
| 4,863,161 A | 9/1989 | Telle |
| 4,865,344 A | 9/1989 | Romero, Sr. et al. |
| 4,867,443 A | 9/1989 | Jensen |
| 4,869,493 A | 9/1989 | Johnston |
| 4,869,494 A | 9/1989 | Lambert, Sr. |
| 4,869,497 A | 9/1989 | Stewart et al. |
| 4,875,676 A | 10/1989 | Zimmer |
| 4,877,239 A | 10/1989 | Dela Rosa |
| 4,878,662 A | 11/1989 | Chern |
| 4,878,663 A | 11/1989 | Luquette |
| 4,880,227 A | 11/1989 | Sowell |
| 4,881,742 A | 11/1989 | Hargreave |
| 4,883,272 A | 11/1989 | Lay |
| 4,886,266 A | 12/1989 | Trulaske |
| 4,891,764 A | 1/1990 | McIntosh |
| 4,894,933 A | 1/1990 | Tonkel et al. |
| 4,898,379 A | 2/1990 | Shiba |
| 4,898,381 A | 2/1990 | Gordon |
| 4,900,012 A | 2/1990 | Fu |
| 4,900,017 A | 2/1990 | Bold, Jr. |
| 4,900,018 A | 2/1990 | Ish, III |
| 4,902,006 A | 2/1990 | Stallings, Jr. |
| 4,904,829 A | 2/1990 | Berthaud et al. |
| 4,905,330 A | 3/1990 | Jacobs |
| 4,907,795 A | 3/1990 | Shaw et al. |
| 4,907,797 A | 3/1990 | Gezari et al. |
| 4,907,798 A | 3/1990 | Burchatz |
| 4,909,504 A | 3/1990 | Yang |
| 4,911,438 A | 3/1990 | Van Straaten |
| 4,913,396 A | 4/1990 | Dalebout et al. |
| 4,913,423 A | 4/1990 | Farran |
| 4,915,377 A | 4/1990 | Malnke et al. |
| 4,915,379 A | 4/1990 | Sapp |
| 4,917,376 A | 4/1990 | Lo |
| 4,919,418 A | 4/1990 | Miller |
| 4,919,419 A | 4/1990 | Houston |
| 4,921,242 A | 5/1990 | Watterson |
| 4,921,247 A | 5/1990 | Sterling |
| 4,923,193 A | 5/1990 | Pitzen et al. |
| 4,925,183 A | 5/1990 | Kim |
| 4,925,724 A | 5/1990 | Ogden |

(56) References Cited

U.S. PATENT DOCUMENTS

| | | |
|---|---|---|
| 4,927,136 A | 5/1990 | Leask |
| 4,928,546 A | 5/1990 | Walters |
| 4,928,957 A | 5/1990 | Lanier et al. |
| 4,930,768 A | 6/1990 | Lapcevic |
| 4,930,769 A | 6/1990 | Nenoff |
| 4,930,770 A | 6/1990 | Baker |
| 4,934,690 A | 6/1990 | Bull |
| 4,934,692 A | 6/1990 | Greening, Jr. |
| 4,938,469 A | 7/1990 | Crandell |
| 4,938,473 A | 7/1990 | Lee |
| 4,940,233 A | 7/1990 | Bull |
| 4,941,652 A | 7/1990 | Nagano et al. |
| 4,941,673 A | 7/1990 | Bennett |
| 4,948,121 A | 8/1990 | Haaheim et al. |
| 4,949,022 A | 8/1990 | Lipman |
| 4,949,954 A | 8/1990 | Hix |
| 4,949,958 A | 8/1990 | Richey |
| 4,949,959 A | 8/1990 | Stevens |
| 4,952,265 A | 8/1990 | Yamanaka et al. |
| 4,953,415 A | 9/1990 | Lehtonen |
| 4,953,858 A | 9/1990 | Zelli |
| 4,955,466 A | 9/1990 | Almes et al. |
| 4,958,832 A | 9/1990 | Kim |
| 4,960,276 A | 10/1990 | Feuer et al. |
| 4,964,632 A | 10/1990 | Rockwell |
| 4,968,028 A | 11/1990 | Wehrell |
| 4,971,316 A | 11/1990 | Dalebout et al. |
| 4,974,831 A | 12/1990 | Dunham |
| 4,974,832 A | 12/1990 | Dalebout |
| 4,976,424 A | 12/1990 | Sargeant et al. |
| 4,976,428 A | 12/1990 | Ghazi |
| 4,976,435 A | 12/1990 | Shatford |
| 4,984,810 A | 1/1991 | Stearns et al. |
| 4,986,261 A | 1/1991 | Iams et al. |
| 4,989,860 A | 2/1991 | Iams et al. |
| 4,998,725 A | 3/1991 | Watterson et al. |
| 5,000,440 A | 3/1991 | Lynch |
| 5,000,442 A | 3/1991 | Dalebout et al. |
| 5,001,632 A | 3/1991 | Hall Tipping |
| 5,002,271 A | 3/1991 | Gonzales |
| 5,004,224 A | 4/1991 | Wang |
| 5,007,630 A | 4/1991 | Real et al. |
| 5,007,631 A | 4/1991 | Wang |
| 5,013,031 A | 5/1991 | Bull |
| 5,016,870 A | 5/1991 | Bulloch et al. |
| 5,020,793 A | 6/1991 | Loane |
| 5,024,441 A | 6/1991 | Rousseau |
| 5,026,049 A | 6/1991 | Goodman |
| 5,027,303 A | 6/1991 | Witte |
| 5,029,801 A | 7/1991 | Dalebout et al. |
| 5,031,455 A | 7/1991 | Cline |
| 5,031,901 A | 7/1991 | Saarinen |
| 5,034,576 A | 7/1991 | Dalebout et al. |
| RE33,662 E | 8/1991 | Blair et al. |
| 5,037,084 A | 8/1991 | Flor |
| 5,037,089 A | 8/1991 | Spagnuolo |
| 5,039,089 A | 8/1991 | Lapcevic |
| 5,039,091 A | 8/1991 | Johnson |
| 5,042,799 A | 8/1991 | Stanley |
| 5,046,382 A | 9/1991 | Steinberg |
| 5,046,722 A | 9/1991 | Antoon |
| 5,048,823 A | 9/1991 | Bean |
| 5,051,638 A | 9/1991 | Pyles |
| 5,054,770 A | 10/1991 | Bull |
| 5,058,881 A | 10/1991 | Measom |
| 5,058,882 A | 10/1991 | Dalebout et al. |
| 5,058,888 A | 10/1991 | Walker et al. |
| 5,062,626 A | 11/1991 | Dalebout et al. |
| 5,062,629 A | 11/1991 | Vaughan |
| 5,062,632 A | 11/1991 | Dalebout et al. |
| 5,066,000 A | 11/1991 | Dolan |
| 5,067,710 A | 11/1991 | Watterson et al. |
| 5,071,115 A | 12/1991 | Welch |
| 5,071,117 A | 12/1991 | Mautner et al. |
| 5,072,928 A | 12/1991 | Stearns et al. |
| 5,072,929 A | 12/1991 | Peterson et al. |
| 5,074,550 A | 12/1991 | Sloan |
| 5,077,916 A | 1/1992 | Beneteau |
| 5,080,353 A | 1/1992 | Tench |
| 5,081,991 A | 1/1992 | Chance |
| 5,085,426 A | 2/1992 | Wanzer et al. |
| 5,085,427 A | 2/1992 | Finn |
| 5,087,047 A | 2/1992 | McConnell |
| 5,088,729 A | 2/1992 | Dalebout |
| 5,088,740 A | 2/1992 | Peterson |
| 5,094,249 A | 3/1992 | Marras et al. |
| 5,094,447 A | 3/1992 | Wang |
| 5,096,225 A | 3/1992 | Osawa |
| 5,102,122 A | 4/1992 | Piane, Jr. |
| 5,102,380 A | 4/1992 | Jacobson et al. |
| 5,104,119 A | 4/1992 | Lynch |
| 5,104,120 A | 4/1992 | Watterson et al. |
| 5,108,093 A | 4/1992 | Watterson |
| 5,109,778 A | 5/1992 | Berkowitz et al. |
| 5,110,117 A | 5/1992 | Fisher et al. |
| 5,112,045 A | 5/1992 | Mason et al. |
| 5,114,388 A | 5/1992 | Trulaske |
| 5,114,391 A | 5/1992 | Pitzen et al. |
| 5,123,629 A | 6/1992 | Takeuchi |
| 5,123,885 A | 6/1992 | Shields |
| 5,123,886 A | 6/1992 | Cook |
| 5,129,872 A | 7/1992 | Dalton et al. |
| 5,131,895 A | 7/1992 | Rogers, Jr. |
| 5,135,458 A | 8/1992 | Huang |
| 5,137,501 A | 8/1992 | Mertesdorf |
| 5,138,730 A | 8/1992 | Masuda |
| 5,141,480 A | 8/1992 | Lennox et al. |
| 5,142,358 A | 8/1992 | Jason |
| 5,145,475 A | 9/1992 | Cares |
| 5,145,481 A | 9/1992 | Friedebach |
| 5,147,266 A | 9/1992 | Ricard |
| 5,149,084 A | 9/1992 | Dalebout et al. |
| 5,149,312 A | 9/1992 | Croft et al. |
| 5,158,520 A | 10/1992 | Lemke et al. |
| 5,162,029 A | 11/1992 | Schine |
| 5,163,885 A | 11/1992 | Wanzer |
| 5,167,159 A | 12/1992 | Lucking |
| 5,167,597 A | 12/1992 | David |
| 5,171,196 A | 12/1992 | Lynch |
| 5,178,593 A | 1/1993 | Roberts |
| 5,178,599 A | 1/1993 | Scott |
| 5,181,894 A | 1/1993 | Shieng |
| 5,184,295 A | 2/1993 | Mann |
| 5,184,988 A | 2/1993 | Dunham |
| 5,186,697 A | 2/1993 | Rennex |
| 5,192,255 A | 3/1993 | Dalebout et al. |
| 5,192,257 A | 3/1993 | Panasewicz |
| 5,192,258 A | 3/1993 | Keller |
| 5,195,781 A | 3/1993 | Osawa |
| 5,195,935 A | 3/1993 | Fencel |
| 5,195,937 A | 3/1993 | Engel et al. |
| 5,199,931 A | 4/1993 | Easley et al. |
| 5,201,694 A | 4/1993 | Zappel |
| 5,203,229 A | 4/1993 | Chen |
| 5,203,800 A | 4/1993 | Meredith |
| 5,203,826 A | 4/1993 | Dalebout |
| 5,205,798 A | 4/1993 | Lekhtman |
| 5,205,800 A | 4/1993 | Grant |
| 5,207,489 A | 5/1993 | Miller |
| 5,207,622 A | 5/1993 | Wilkinson et al. |
| 5,207,625 A | 5/1993 | White |
| 5,207,628 A | 5/1993 | Graham |
| 5,211,617 A | 5/1993 | Millen |
| 5,215,510 A | 6/1993 | Baran |
| 5,217,422 A | 6/1993 | Domzalski |
| 5,226,866 A | 7/1993 | Engel et al. |
| 5,232,422 A | 8/1993 | Bishop, Jr. |
| 5,234,392 A | 8/1993 | Clark |
| 5,240,417 A | 8/1993 | Smithson et al. |
| 5,242,339 A | 9/1993 | Thornton |
| 5,242,340 A | 9/1993 | Jerome |
| 5,242,343 A | 9/1993 | Miller |
| 5,242,347 A | 9/1993 | Keeton |
| 5,247,853 A | 9/1993 | Dalebout |

(56) References Cited

U.S. PATENT DOCUMENTS

| | | |
|---|---|---|
| 5,250,012 A | 10/1993 | Whitcomb, Jr. |
| 5,250,013 A | 10/1993 | Brangi |
| 5,254,067 A | 10/1993 | Habing et al. |
| 5,256,117 A | 10/1993 | Potts et al. |
| 5,256,118 A | 10/1993 | Chen |
| 5,256,126 A | 10/1993 | Grotstein |
| 5,257,701 A | 11/1993 | Edelson |
| 5,257,964 A | 11/1993 | Petters |
| 5,261,864 A | 11/1993 | Fitzpatrick |
| 5,269,736 A | 12/1993 | Roberts |
| 5,271,416 A | 12/1993 | Lepley |
| 5,273,285 A | 12/1993 | Long |
| 5,277,678 A | 1/1994 | Friedebach et al. |
| 5,279,528 A | 1/1994 | Dalebout et al. |
| 5,279,529 A | 1/1994 | Eschenbach |
| 5,279,531 A | 1/1994 | Jen Huey |
| 5,282,776 A | 2/1994 | Dalebout |
| 5,284,461 A | 2/1994 | Wilkinson et al. |
| 5,290,205 A | 3/1994 | Densmore et al. |
| 5,290,211 A | 3/1994 | Stearns |
| 5,292,293 A | 3/1994 | Schumacher |
| 5,295,928 A | 3/1994 | Rennex |
| 5,295,935 A | 3/1994 | Wang |
| 5,299,992 A | 4/1994 | Wilkinson |
| 5,299,993 A | 4/1994 | Habing |
| 5,302,162 A | 4/1994 | Pasero |
| 5,306,221 A | 4/1994 | Itaru |
| 5,308,075 A | 5/1994 | Theriault |
| 5,308,296 A | 5/1994 | Eckstein |
| 5,308,304 A | 5/1994 | Habing |
| 5,310,392 A | 5/1994 | Lo |
| 5,313,852 A | 5/1994 | Arena |
| 5,314,390 A | 5/1994 | Westing et al. |
| 5,314,391 A | 5/1994 | Potash |
| 5,314,392 A | 5/1994 | Hawkins et al. |
| 5,314,394 A | 5/1994 | Ronan |
| 5,318,487 A | 6/1994 | Golen et al. |
| 5,320,343 A | 6/1994 | McKinney |
| 5,320,588 A | 6/1994 | Wanzer et al. |
| 5,320,591 A | 6/1994 | Harmon et al. |
| 5,324,242 A | 6/1994 | Lo |
| 5,328,420 A | 7/1994 | Allen |
| 5,328,422 A | 7/1994 | Nichols |
| 5,328,429 A | 7/1994 | Potash et al. |
| 5,330,401 A | 7/1994 | Walstead |
| 5,330,402 A | 7/1994 | Johnson |
| 5,334,120 A | 8/1994 | Rasmussen |
| 5,336,144 A | 8/1994 | Rodden |
| 5,336,145 A | 8/1994 | Keiser |
| 5,336,146 A | 8/1994 | Piaget |
| 5,342,264 A | 8/1994 | Gordon |
| 5,342,271 A | 8/1994 | Long |
| RE34,728 E | 9/1994 | Hall-Tipping |
| 5,344,372 A | 9/1994 | Hung |
| 5,348,524 A | 9/1994 | Grant |
| 5,350,344 A | 9/1994 | Kissel |
| 5,352,166 A | 10/1994 | Chang |
| 5,352,167 A | 10/1994 | Ulicny |
| 5,352,169 A | 10/1994 | Eschenbach |
| 5,353,452 A | 10/1994 | Rulis |
| 5,354,248 A | 10/1994 | Rawls et al. |
| 5,354,251 A | 10/1994 | Sleamaker |
| 5,356,356 A | 10/1994 | Hildebrandt et al. |
| 5,358,461 A | 10/1994 | Bailey, Jr. |
| 5,359,986 A | 11/1994 | Magrath, III et al. |
| 5,362,069 A | 11/1994 | Hall-Tipping |
| 5,362,295 A | 11/1994 | Nurge |
| 5,364,327 A | 11/1994 | Graham |
| 5,368,532 A | 11/1994 | Farnet |
| 5,372,556 A | 12/1994 | Ropp |
| 5,372,559 A | 12/1994 | Dalebout et al. |
| 5,372,560 A | 12/1994 | Chang |
| 5,372,564 A | 12/1994 | Spirito |
| 5,374,227 A | 12/1994 | Webb |
| 5,378,212 A | 1/1995 | Pin-Kuo |
| 5,380,258 A | 1/1995 | Hawley, Jr. |
| 5,382,207 A * | 1/1995 | Skowronski ....... A63B 22/0023 198/807 |
| 5,382,208 A | 1/1995 | Hu |
| 5,382,209 A | 1/1995 | Pasier |
| 5,383,827 A | 1/1995 | Stern |
| 5,383,828 A | 1/1995 | Sands et al. |
| 5,385,346 A | 1/1995 | Carroll et al. |
| 5,385,519 A | 1/1995 | Hsu |
| 5,387,169 A | 2/1995 | Wang |
| 5,387,170 A | 2/1995 | Rawls et al. |
| 5,387,171 A | 2/1995 | Casey et al. |
| 5,394,922 A | 3/1995 | Colson et al. |
| 5,396,876 A | 3/1995 | Liscio et al. |
| 5,398,948 A | 3/1995 | Mathis |
| 5,401,226 A | 3/1995 | Stearns |
| 5,403,251 A | 4/1995 | Belsito et al. |
| 5,403,252 A | 4/1995 | Leon et al. |
| 5,403,253 A | 4/1995 | Gaylord |
| 5,403,254 A | 4/1995 | Lundin et al. |
| 5,403,255 A | 4/1995 | Johnston |
| 5,406,661 A | 4/1995 | Pekar |
| 5,407,403 A | 4/1995 | Coleman |
| 5,407,408 A | 4/1995 | Wilkinson |
| 5,409,435 A | 4/1995 | Daniels |
| RE34,959 E | 5/1995 | Potts |
| 5,410,971 A | 5/1995 | Golden et al. |
| 5,417,643 A | 5/1995 | Taylor |
| 5,419,570 A | 5/1995 | Bollotte |
| 5,419,571 A | 5/1995 | Vaughan |
| 5,419,751 A | 5/1995 | Byrd et al. |
| 5,423,729 A | 6/1995 | Eschenbach |
| 5,423,730 A | 6/1995 | Hirsch |
| 5,429,563 A | 7/1995 | Engel et al. |
| 5,429,569 A | 7/1995 | Gunnari |
| 5,431,612 A | 7/1995 | Holden |
| 5,433,679 A | 7/1995 | Szymczak et al. |
| 5,435,315 A | 7/1995 | McPhee et al. |
| 5,435,798 A | 7/1995 | Habing et al. |
| 5,441,467 A | 8/1995 | Stevens |
| 5,441,468 A | 8/1995 | Deckers et al. |
| 5,449,334 A | 9/1995 | Kingsbury |
| 5,454,772 A | 10/1995 | Rodden |
| 5,454,773 A | 10/1995 | Blanchard et al. |
| 5,456,648 A | 10/1995 | Edinburg |
| 5,460,586 A | 10/1995 | Wilkinson |
| 5,462,503 A | 10/1995 | Benjamin et al. |
| 5,462,504 A | 10/1995 | Trulaske et al. |
| 5,466,200 A | 11/1995 | Ulrich et al. |
| 5,466,203 A | 11/1995 | Chen |
| 5,470,298 A | 11/1995 | Curtis |
| 5,471,405 A | 11/1995 | Marsh |
| 5,474,087 A | 12/1995 | Nashner |
| 5,474,510 A | 12/1995 | Chen |
| 5,476,430 A | 12/1995 | Lee et al. |
| 5,484,358 A | 1/1996 | Wang et al. |
| 5,484,362 A | 1/1996 | Skowronski et al. |
| 5,487,707 A | 1/1996 | Sharf et al. |
| 5,489,249 A | 2/1996 | Brewer et al. |
| 5,489,250 A | 2/1996 | Densmore et al. |
| 5,490,818 A | 2/1996 | Haber et al. |
| 5,492,514 A | 2/1996 | Daum |
| 5,492,520 A | 2/1996 | Brown |
| 5,496,235 A | 3/1996 | Stevens |
| 5,496,236 A | 3/1996 | Buonauito |
| 5,496,238 A | 3/1996 | Taylor |
| 5,496,239 A | 3/1996 | Kallman |
| 5,499,956 A | 3/1996 | Habing et al. |
| 5,505,011 A | 4/1996 | Bleimhofer |
| 5,507,271 A | 4/1996 | Actor |
| 5,509,870 A | 4/1996 | Lloyd |
| 5,512,025 A | 4/1996 | Dalebout et al. |
| 5,512,029 A | 4/1996 | Barnard |
| 5,514,053 A | 5/1996 | Hawkins et al. |
| 5,518,471 A | 5/1996 | Hettinger et al. |
| 5,518,473 A | 5/1996 | Miller |
| 5,520,599 A | 5/1996 | Chen |
| 5,522,783 A | 6/1996 | Gordon |
| 5,527,245 A | 6/1996 | Dalebout et al. |

(56) References Cited

U.S. PATENT DOCUMENTS

| | | |
|---|---|---|
| 5,529,553 A | 6/1996 | Finlayson |
| 5,529,554 A | 6/1996 | Eschenbach |
| 5,531,658 A | 7/1996 | Liao |
| 5,533,899 A | 7/1996 | Young |
| 5,533,948 A | 7/1996 | Wilkinson |
| 5,533,951 A | 7/1996 | Chang |
| 5,538,489 A | 7/1996 | Magid |
| 5,542,892 A | 8/1996 | Buhler |
| 5,545,112 A | 8/1996 | Densmore et al. |
| 5,549,052 A | 8/1996 | Hoffman |
| 5,549,536 A | 8/1996 | Clark |
| 5,551,934 A | 9/1996 | Binette |
| 5,551,937 A | 9/1996 | Kwo |
| 5,554,033 A | 9/1996 | Bizzi et al. |
| 5,554,083 A | 9/1996 | Chen |
| 5,556,362 A | 9/1996 | Whipps |
| 5,562,572 A | 10/1996 | Carmein |
| 5,562,574 A | 10/1996 | Miller |
| 5,563,487 A | 10/1996 | Davis |
| 5,568,993 A | 10/1996 | Potzick |
| 5,569,128 A | 10/1996 | Dalebout |
| 5,569,138 A | 10/1996 | Wang et al. |
| 5,573,485 A | 11/1996 | Geschwender |
| 5,575,740 A | 11/1996 | Piaget |
| 5,577,985 A | 11/1996 | Miller |
| 5,577,987 A | 11/1996 | Brown |
| 5,580,249 A | 12/1996 | Jacobsen et al. |
| 5,582,563 A | 12/1996 | Fan |
| 5,584,700 A | 12/1996 | Feldman et al. |
| 5,584,779 A | 12/1996 | Knecht |
| 5,585,561 A | 12/1996 | Bahl et al. |
| 5,586,736 A | 12/1996 | Mollet |
| 5,588,938 A | 12/1996 | Schneider et al. |
| 5,590,893 A | 1/1997 | Robinson et al. |
| 5,591,104 A | 1/1997 | Andrus et al. |
| 5,591,106 A | 1/1997 | Dalebout et al. |
| 5,591,107 A | 1/1997 | Rodgers, Jr. |
| 5,591,908 A | 1/1997 | Reid |
| 5,593,372 A | 1/1997 | Rodgers, Jr. |
| 5,593,380 A | 1/1997 | Bittikofer |
| 5,595,556 A | 1/1997 | Dalebout et al. |
| 5,599,261 A | 2/1997 | Easley et al. |
| 5,600,310 A | 2/1997 | Whipple, III et al. |
| 5,603,675 A | 2/1997 | Wu |
| 5,603,678 A | 2/1997 | Wilson |
| 5,607,375 A | 3/1997 | Dalebout |
| 5,611,756 A | 3/1997 | Miller |
| 5,613,216 A | 3/1997 | Galler |
| 5,613,856 A | 3/1997 | Hoover |
| 5,616,103 A | 4/1997 | Lee |
| 5,622,527 A | 4/1997 | Watterson et al. |
| 5,625,577 A | 4/1997 | Kunii et al. |
| 5,626,539 A | 5/1997 | Piaget |
| 5,630,566 A | 5/1997 | Case |
| 5,632,209 A | 5/1997 | Sakakibara |
| 5,634,870 A | 6/1997 | Wilkinson |
| 5,643,142 A | 7/1997 | Salerno et al. |
| 5,643,144 A | 7/1997 | Trulaske |
| 5,643,147 A | 7/1997 | Huang |
| 5,643,152 A | 7/1997 | Simonson |
| 5,643,153 A | 7/1997 | Nylen et al. |
| 5,643,157 A | 7/1997 | Seliber |
| 5,645,509 A | 7/1997 | Brewer et al. |
| 5,645,914 A | 7/1997 | Horowitz |
| 5,649,882 A | 7/1997 | Parikh et al. |
| 5,650,709 A | 7/1997 | Rotunda et al. |
| 5,653,662 A | 8/1997 | Rodgers, Jr. |
| 5,655,997 A | 8/1997 | Greenberg et al. |
| 5,656,003 A | 8/1997 | Robinson et al. |
| 5,658,227 A | 8/1997 | Stearns |
| 5,662,557 A | 9/1997 | Watterson et al. |
| 5,665,031 A | 9/1997 | Hsieh |
| 5,665,033 A | 9/1997 | Palmer |
| 5,667,459 A | 9/1997 | Su |
| 5,669,833 A | 9/1997 | Stone |
| 5,669,857 A | 9/1997 | Watterson et al. |
| 5,669,865 A | 9/1997 | Gordon |
| 5,672,140 A | 9/1997 | Watterson et al. |
| 5,674,156 A | 10/1997 | Watterson et al. |
| 5,674,453 A | 10/1997 | Watterson et al. |
| 5,676,624 A | 10/1997 | Watterson et al. |
| 5,679,047 A | 10/1997 | Engel |
| 5,679,101 A | 10/1997 | Magid |
| 5,683,332 A | 11/1997 | Watterson et al. |
| 5,685,804 A | 11/1997 | Whan-Tong et al. |
| 5,688,209 A | 11/1997 | Trulaske et al. |
| 5,688,216 A | 11/1997 | Mauriello |
| 5,690,582 A | 11/1997 | Ulrich et al. |
| 5,690,587 A | 11/1997 | Gruenangerl |
| 5,690,589 A | 11/1997 | Rodgers, Jr. |
| 5,692,994 A | 12/1997 | Eschenbach |
| 5,695,436 A | 12/1997 | Huang |
| 5,702,325 A | 12/1997 | Watterson et al. |
| 5,704,879 A | 1/1998 | Watterson et al. |
| 5,707,319 A | 1/1998 | Riley |
| 5,708,355 A | 1/1998 | Schrey |
| 5,709,632 A | 1/1998 | Socwell |
| 5,709,633 A | 1/1998 | Sokol |
| 5,711,745 A | 1/1998 | Yang |
| 5,711,749 A | 1/1998 | Miller |
| 5,713,549 A | 2/1998 | Shieh |
| 5,713,821 A | 2/1998 | Nissen |
| 5,716,308 A | 2/1998 | Lee |
| 5,718,657 A | 2/1998 | Dalebout et al. |
| 5,718,660 A | 2/1998 | Chen |
| 5,720,200 A | 2/1998 | Anderson et al. |
| 5,720,474 A | 2/1998 | Sugiyama |
| 5,722,917 A | 3/1998 | Olschansky et al. |
| 5,722,920 A | 3/1998 | Bauer |
| 5,722,922 A | 3/1998 | Watterson et al. |
| 5,725,459 A | 3/1998 | Rexach |
| 5,730,236 A | 3/1998 | Miller et al. |
| 5,733,228 A | 3/1998 | Stevens |
| 5,733,229 A | 3/1998 | Dalebout et al. |
| 5,735,586 A | 4/1998 | Cheng |
| 5,735,773 A | 4/1998 | Vittone |
| 5,735,776 A | 4/1998 | Swezey |
| 5,738,612 A | 4/1998 | Tsuda |
| 5,741,205 A | 4/1998 | Doll et al. |
| 5,743,193 A | 4/1998 | Kakuta et al. |
| 5,743,832 A | 4/1998 | Sands et al. |
| 5,743,833 A | 4/1998 | Watterson et al. |
| 5,743,834 A | 4/1998 | Rodgers, Jr. |
| 5,743,835 A | 4/1998 | Trotter |
| 5,746,682 A | 5/1998 | Hung |
| 5,749,372 A | 5/1998 | Allen |
| 5,749,787 A | 5/1998 | Jank |
| 5,749,807 A | 5/1998 | Webb |
| 5,749,809 A | 5/1998 | Lin |
| 5,749,813 A | 5/1998 | Domzalski |
| 5,752,879 A | 5/1998 | Berdut |
| 5,752,897 A | 5/1998 | Skowronski et al. |
| 5,755,642 A | 5/1998 | Miller |
| 5,755,645 A | 5/1998 | Miller et al. |
| 5,755,651 A | 5/1998 | Homyonfer |
| 5,759,136 A | 6/1998 | Chen |
| 5,760,353 A | 6/1998 | Rapp |
| 5,761,831 A | 6/1998 | Cho |
| 5,762,584 A | 6/1998 | Daniels |
| 5,762,587 A | 6/1998 | Dalebout et al. |
| 5,762,588 A | 6/1998 | Chen |
| 5,769,759 A | 6/1998 | Alter |
| 5,771,152 A | 6/1998 | Crompton et al. |
| 5,772,522 A | 6/1998 | Nesbit |
| 5,772,558 A | 6/1998 | Rodgers, Jr. |
| 5,772,560 A | 6/1998 | Watterson et al. |
| 5,776,582 A | 7/1998 | Needham |
| 5,779,599 A | 7/1998 | Chen |
| 5,779,600 A | 7/1998 | Pape |
| 5,779,607 A | 7/1998 | Harris |
| 5,782,639 A | 7/1998 | Beal |
| 5,782,723 A | 7/1998 | Kuo |
| 5,785,630 A | 7/1998 | Bobick et al. |
| 5,788,609 A | 8/1998 | Miller |

(56) References Cited

U.S. PATENT DOCUMENTS

| | | |
|---|---|---|
| 5,788,610 A | 8/1998 | Eschenbach |
| 5,788,611 A | 8/1998 | Kuo |
| 5,792,027 A | 8/1998 | Gvoich |
| 5,792,031 A | 8/1998 | Alton |
| 5,795,270 A | 8/1998 | Woods et al. |
| 5,797,578 A | 8/1998 | Graffeo |
| 5,803,874 A | 9/1998 | Wilkinson |
| 5,803,877 A | 9/1998 | Franey |
| 5,803,882 A | 9/1998 | Habing et al. |
| 5,807,210 A | 9/1998 | Devlin |
| 5,810,696 A | 9/1998 | Webb |
| 5,810,697 A | 9/1998 | Joiner |
| 5,810,698 A | 9/1998 | Hullett et al. |
| 5,813,142 A | 9/1998 | Demon |
| 5,813,947 A | 9/1998 | Densmore |
| 5,813,953 A | 9/1998 | Whipple |
| 5,816,981 A | 10/1998 | Hung |
| 5,820,478 A | 10/1998 | Wood et al. |
| 5,823,618 A | 10/1998 | Fox et al. |
| 5,827,155 A | 10/1998 | Jensen et al. |
| 5,827,158 A | 10/1998 | Drecksel |
| 5,830,107 A | 11/1998 | Brigliadoro |
| 5,830,113 A | 11/1998 | Coody et al. |
| 5,830,114 A | 11/1998 | Halfen et al. |
| 5,833,577 A | 11/1998 | Hurt |
| 5,833,583 A | 11/1998 | Chuang |
| 5,833,584 A | 11/1998 | Piaget et al. |
| 5,833,587 A | 11/1998 | Strong et al. |
| 5,836,770 A | 11/1998 | Powers |
| 5,839,990 A | 11/1998 | Virkkala |
| 5,839,993 A | 11/1998 | Fox |
| 5,842,961 A | 12/1998 | Davis |
| 5,846,166 A | 12/1998 | Kuo |
| 5,848,954 A | 12/1998 | Stearns et al. |
| 5,852,264 A | 12/1998 | Muller |
| 5,855,537 A | 1/1999 | Coody et al. |
| 5,855,538 A | 1/1999 | Argabright |
| 5,857,939 A | 1/1999 | Kaufman |
| 5,857,940 A | 1/1999 | Husted |
| 5,857,941 A | 1/1999 | Maresh |
| 5,857,943 A | 1/1999 | Murray |
| 5,860,893 A | 1/1999 | Watterson et al. |
| 5,860,894 A | 1/1999 | Dalebout et al. |
| 5,860,899 A | 1/1999 | Rassman |
| 5,865,710 A | 2/1999 | Wilson-Hyde |
| 5,868,108 A | 2/1999 | Schmitz et al. |
| 5,868,648 A | 2/1999 | Coody et al. |
| 5,871,421 A | 2/1999 | Trulaske et al. |
| 5,876,095 A | 3/1999 | Johnston |
| 5,879,271 A | 3/1999 | Stearns et al. |
| 5,879,273 A | 3/1999 | Wei |
| 5,879,276 A | 3/1999 | Miller |
| 5,882,281 A | 3/1999 | Stearns et al. |
| 5,885,197 A | 3/1999 | Barton |
| 5,888,172 A | 3/1999 | Andrus et al. |
| 5,890,562 A | 4/1999 | Bartels et al. |
| 5,890,995 A | 4/1999 | Bobick et al. |
| 5,891,001 A | 4/1999 | Carnes et al. |
| 5,891,003 A | 4/1999 | Deac et al. |
| 5,895,339 A | 4/1999 | Maresh |
| 5,895,340 A | 4/1999 | Keller |
| 5,897,457 A | 4/1999 | Mackovjak |
| 5,897,459 A | 4/1999 | Habing et al. |
| 5,897,460 A | 4/1999 | McBride et al. |
| 5,897,461 A | 4/1999 | Socwell |
| 5,899,833 A | 5/1999 | Ryan et al. |
| 5,899,834 A | 5/1999 | Dalebout et al. |
| 5,902,214 A | 5/1999 | Makikawa et al. |
| 5,904,398 A | 5/1999 | Farricielli |
| 5,904,636 A | 5/1999 | Chen |
| 5,906,269 A | 5/1999 | Zabron et al. |
| 5,906,564 A | 5/1999 | Jacobsen |
| 5,910,070 A | 6/1999 | Henry et al. |
| 5,910,072 A | 6/1999 | Rawls et al. |
| 5,911,132 A | 6/1999 | Sloane |
| 5,913,751 A | 6/1999 | Eschenbach |
| 5,916,064 A | 6/1999 | Eschenbach |
| 5,916,069 A | 6/1999 | Wang |
| 5,917,692 A | 6/1999 | Schmitz et al. |
| 5,919,118 A | 7/1999 | Stearns |
| 5,921,892 A | 7/1999 | Easton |
| 5,921,893 A | 7/1999 | Hurt |
| 5,921,896 A | 7/1999 | Boland |
| 5,925,001 A | 7/1999 | Hoyt et al. |
| 5,938,551 A | 8/1999 | Warner |
| 5,938,565 A | 8/1999 | Bernacki |
| 5,938,570 A | 8/1999 | Maresh |
| 5,938,571 A | 8/1999 | Stevens |
| 5,938,575 A | 8/1999 | Stearns |
| 5,940,502 A | 8/1999 | Hirai et al. |
| 5,940,911 A | 8/1999 | Wang |
| 5,941,807 A | 8/1999 | Cassidy |
| 5,943,794 A | 8/1999 | Gelsomini |
| 5,944,641 A | 8/1999 | Habing |
| 5,947,869 A | 9/1999 | Shea |
| 5,947,872 A | 9/1999 | Ryan et al. |
| 5,951,441 A | 9/1999 | Dalebout |
| 5,951,444 A | 9/1999 | Webber |
| 5,951,447 A | 9/1999 | Butler |
| 5,951,449 A | 9/1999 | Oppriecht |
| 5,957,814 A | 9/1999 | Eschenbach |
| 5,961,423 A | 10/1999 | Sellers |
| 5,961,430 A | 10/1999 | Zuckerman et al. |
| 5,967,944 A | 10/1999 | Vittone et al. |
| 5,967,954 A | 10/1999 | Habing |
| 5,967,955 A | 10/1999 | Westfall et al. |
| 5,971,902 A | 10/1999 | Robertson et al. |
| 5,976,039 A | 11/1999 | Epel et al. |
| 5,976,061 A | 11/1999 | Moon et al. |
| 5,980,430 A | 11/1999 | Wang |
| 5,980,432 A | 11/1999 | Ahman |
| 5,984,798 A | 11/1999 | Gilmour |
| 5,984,839 A | 11/1999 | Corkum |
| 5,989,161 A | 11/1999 | Wang et al. |
| 5,989,163 A | 11/1999 | Rodgers, Jr. |
| 5,989,168 A | 11/1999 | See |
| 5,991,143 A | 11/1999 | Wright et al. |
| 5,993,358 A | 11/1999 | Gureghian et al. |
| 5,993,359 A | 11/1999 | Eschenbach |
| 5,993,362 A | 11/1999 | Ghobadi |
| 5,997,447 A | 12/1999 | Giannelli et al. |
| 5,997,450 A | 12/1999 | Wilkinson |
| 6,003,481 A | 12/1999 | Pischinger et al. |
| 6,004,244 A | 12/1999 | Simonson |
| 6,006,379 A | 12/1999 | Hensley |
| 6,010,432 A | 1/2000 | Vawter |
| 6,012,591 A | 1/2000 | Brandenberg |
| 6,012,772 A | 1/2000 | Conde et al. |
| 6,013,011 A | 1/2000 | Moore et al. |
| 6,015,367 A | 1/2000 | Scaramucci |
| 6,015,368 A | 1/2000 | Clem |
| 6,027,429 A | 2/2000 | Daniels |
| 6,027,430 A | 2/2000 | Stearns et al. |
| 6,027,432 A | 2/2000 | Cheng |
| 6,030,320 A | 2/2000 | Stearns |
| 6,030,321 A | 2/2000 | Fuentes |
| 6,030,323 A | 2/2000 | Fontenot |
| 6,033,344 A | 3/2000 | Trulaske et al. |
| 6,033,347 A | 3/2000 | Dalebout et al. |
| 6,033,350 A | 3/2000 | Krull |
| 6,036,622 A | 3/2000 | Gordon |
| 6,042,512 A | 3/2000 | Eschenbach |
| 6,042,513 A | 3/2000 | Koteles et al. |
| 6,042,514 A | 3/2000 | Abelbeck |
| 6,042,515 A | 3/2000 | Wang |
| 6,042,516 A | 3/2000 | Norton |
| 6,042,518 A | 3/2000 | Hildebrandt et al. |
| 6,042,523 A | 3/2000 | Graham |
| 6,045,487 A | 4/2000 | Miller |
| 6,045,488 A | 4/2000 | Eschenbach |
| 6,045,490 A * | 4/2000 | Shafer .................. A63B 22/02 482/51 |
| 6,045,491 A | 4/2000 | McNergney |
| 6,050,920 A | 4/2000 | Ehrenfried |

(56) References Cited

U.S. PATENT DOCUMENTS

| | | |
|---|---|---|
| 6,050,921 A | 4/2000 | Wang |
| 6,050,922 A | 4/2000 | Wang |
| 6,050,923 A | 4/2000 | Yu |
| 6,053,844 A | 4/2000 | Clem |
| 6,053,847 A | 4/2000 | Stearns et al. |
| 6,053,848 A | 4/2000 | Eschenbach |
| 6,055,747 A | 5/2000 | Lombardino |
| 6,056,678 A | 5/2000 | Giannelli et al. |
| 6,059,692 A | 5/2000 | Hickman |
| 6,059,695 A | 5/2000 | Hung |
| 6,063,009 A | 5/2000 | Stearns |
| 6,066,073 A | 5/2000 | Stearns |
| 6,066,074 A | 5/2000 | Marcinkiewicz |
| 6,066,075 A | 5/2000 | Poulton |
| 6,068,578 A | 5/2000 | Wang |
| 6,068,579 A | 5/2000 | Killian et al. |
| 6,071,031 A | 6/2000 | Bailey |
| 6,071,216 A | 6/2000 | Giannelli et al. |
| 6,075,525 A | 6/2000 | Hsieh |
| 6,077,196 A | 6/2000 | Eschenbach |
| 6,077,198 A | 6/2000 | Eschenbach |
| 6,077,199 A | 6/2000 | Hsu |
| 6,077,200 A | 6/2000 | Lin |
| 6,080,091 A | 6/2000 | Habing et al. |
| 6,086,520 A | 7/2000 | Rodriquez |
| 6,090,014 A | 7/2000 | Eschenbach |
| 6,090,016 A | 7/2000 | Kuo |
| 6,095,951 A | 8/2000 | Skowronski et al. |
| 6,099,439 A | 8/2000 | Ryan et al. |
| 6,102,412 A | 8/2000 | Staffaroni |
| 6,102,832 A | 8/2000 | Tani |
| 6,110,076 A | 8/2000 | Hurt |
| 6,110,077 A | 8/2000 | Yu |
| 6,113,188 A | 9/2000 | Stewart et al. |
| 6,113,522 A | 9/2000 | Montgomery |
| 6,117,049 A | 9/2000 | Lowe |
| 6,120,421 A | 9/2000 | Kuo |
| 6,123,646 A | 9/2000 | Colassi |
| 6,123,647 A | 9/2000 | Mitchell |
| 6,123,648 A | 9/2000 | Stevens |
| 6,123,649 A | 9/2000 | Lee |
| 6,123,650 A | 9/2000 | Birrell |
| 6,125,851 A | 10/2000 | Walker et al. |
| 6,126,574 A | 10/2000 | Stearns |
| 6,126,575 A | 10/2000 | Wang |
| 6,126,576 A | 10/2000 | Wang |
| 6,129,962 A | 10/2000 | Quigley et al. |
| 6,132,340 A | 10/2000 | Wang |
| 6,135,924 A | 10/2000 | Gibbs et al. |
| 6,135,925 A | 10/2000 | Liu |
| 6,142,870 A | 11/2000 | Wada et al. |
| 6,142,913 A | 11/2000 | Ewert |
| 6,142,914 A | 11/2000 | Crawford et al. |
| 6,142,915 A | 11/2000 | Eschenbach |
| 6,146,313 A | 11/2000 | Whan-Tong et al. |
| 6,146,315 A | 11/2000 | Schonenberger |
| 6,149,551 A | 11/2000 | Pyles et al. |
| 6,149,552 A | 11/2000 | Chen |
| 6,152,856 A | 11/2000 | Studor et al. |
| 6,152,859 A | 11/2000 | Stearns |
| 6,162,183 A | 12/2000 | Hoover |
| 6,163,451 A | 12/2000 | Chiu |
| 6,165,107 A | 12/2000 | Birrell |
| 6,168,551 B1 | 1/2001 | Mcguinness |
| 6,168,552 B1 | 1/2001 | Eschenbach |
| 6,171,215 B1 | 1/2001 | Stearns |
| 6,171,216 B1 | 1/2001 | Wang |
| 6,174,267 B1 | 1/2001 | Dalebout |
| 6,174,268 B1 | 1/2001 | Novak |
| 6,176,814 B1 | 1/2001 | Ryan et al. |
| 6,179,753 B1 | 1/2001 | Barker et al. |
| 6,181,647 B1 | 1/2001 | Tipton et al. |
| 6,183,397 B1 | 2/2001 | Stearns et al. |
| 6,186,290 B1 | 2/2001 | Carlson |
| 6,186,460 B1 | 2/2001 | Lin |
| 6,186,929 B1 | 2/2001 | Endelman et al. |
| 6,189,846 B1 | 2/2001 | Wang |
| 6,190,289 B1 | 2/2001 | Pyles et al. |
| 6,193,635 B1 | 2/2001 | Webber et al. |
| 6,203,474 B1 | 3/2001 | Jones |
| 6,206,795 B1 | 3/2001 | Ou |
| 6,210,305 B1 | 4/2001 | Eschenbach |
| 6,213,919 B1 | 4/2001 | Wang |
| 6,215,870 B1 | 4/2001 | Hirai et al. |
| 6,217,487 B1 | 4/2001 | Reinert |
| 6,220,990 B1 | 4/2001 | Crivello |
| 6,220,995 B1 | 4/2001 | Chen |
| 6,224,516 B1 | 5/2001 | Disch |
| 6,224,519 B1 | 5/2001 | Doolittle |
| 6,230,047 B1 | 5/2001 | McHugh |
| 6,230,460 B1 | 5/2001 | Huyett |
| 6,231,482 B1 | 5/2001 | Thompson |
| 6,231,946 B1 | 5/2001 | Brown, Jr. et al. |
| 6,234,935 B1 | 5/2001 | Chu |
| 6,234,936 B1 | 5/2001 | Wang |
| 6,237,583 B1 | 5/2001 | Ripley |
| 6,238,323 B1 | 5/2001 | Simonson |
| 6,241,638 B1 | 6/2001 | Hurt |
| 6,244,988 B1 | 6/2001 | Delman |
| 6,244,992 B1 | 6/2001 | James |
| 6,245,001 B1 | 6/2001 | Siaperas |
| 6,251,047 B1 | 6/2001 | Stearns et al. |
| 6,251,048 B1 | 6/2001 | Kaufman |
| 6,254,514 B1 | 7/2001 | Maresh et al. |
| 6,254,515 B1 | 7/2001 | Carman et al. |
| 6,261,209 B1 | 7/2001 | Coody |
| 6,264,586 B1 | 7/2001 | Webber |
| 6,267,710 B1 | 7/2001 | Liu |
| 6,273,842 B1 | 8/2001 | Wang |
| 6,273,843 B1 | 8/2001 | Lo |
| 6,276,749 B1 | 8/2001 | Okazawa et al. |
| 6,277,054 B1 | 8/2001 | Kuo |
| 6,277,056 B1 | 8/2001 | McBride et al. |
| 6,280,361 B1 | 8/2001 | Harvey et al. |
| 6,280,362 B1 | 8/2001 | Dalebout et al. |
| 6,280,367 B1 | 8/2001 | Arsenault |
| D447,780 S | 9/2001 | Arnold et al. |
| 6,282,816 B1 | 9/2001 | Rosendahl |
| 6,283,896 B1 | 9/2001 | Grunfeld |
| 6,287,240 B1 | 9/2001 | Trabbic |
| 6,293,375 B1 | 9/2001 | Chen |
| 6,299,959 B1 | 10/2001 | Squires et al. |
| 6,302,815 B1 | 10/2001 | Shishido et al. |
| 6,302,826 B1 | 10/2001 | Lee |
| 6,302,828 B1 | 10/2001 | Martin et al. |
| 6,302,829 B1 | 10/2001 | Schmidt |
| 6,302,830 B1 | 10/2001 | Stearns |
| 6,302,833 B1 | 10/2001 | Ellis et al. |
| 6,306,108 B1 | 10/2001 | Butler |
| 6,307,167 B1 | 10/2001 | Kajio et al. |
| D450,792 S | 11/2001 | Kuo |
| 6,312,363 B1 | 11/2001 | Watterson et al. |
| 6,314,667 B1 | 11/2001 | Rife et al. |
| 6,315,486 B1 | 11/2001 | Lunz |
| 6,322,059 B1 | 11/2001 | Kelm et al. |
| 6,322,481 B1 | 11/2001 | Krull |
| 6,325,179 B1 | 12/2001 | Barreiro et al. |
| 6,325,745 B1 | 12/2001 | Yu |
| 6,325,746 B1 | 12/2001 | Wang |
| 6,328,676 B1 | 12/2001 | Alessandri |
| 6,328,677 B1 | 12/2001 | Drapeau |
| 6,334,624 B1 | 1/2002 | Giglio |
| 6,344,986 B1 | 2/2002 | Jain et al. |
| 6,347,603 B1 | 2/2002 | Felger |
| 6,348,028 B1 | 2/2002 | Cragg |
| 6,350,218 B1 | 2/2002 | Dalebout et al. |
| 6,352,494 B2 | 3/2002 | McAlonan |
| 6,357,077 B1 | 3/2002 | Jones, Jr. et al. |
| 6,361,476 B1 | 3/2002 | Eschenbach |
| 6,368,252 B1 | 4/2002 | Stearns |
| 6,368,254 B1 | 4/2002 | Wall |
| 6,371,738 B2 | 4/2002 | Jones |
| 6,371,895 B1 | 4/2002 | Endelman et al. |
| 6,375,580 B1 | 4/2002 | Schmidt |

(56) References Cited

U.S. PATENT DOCUMENTS

| | | |
|---|---|---|
| 6,379,289 B1 | 4/2002 | Gossie |
| 6,382,627 B1 | 5/2002 | Lundberg |
| 6,383,120 B1 | 5/2002 | Lo |
| 6,387,015 B1 | 5/2002 | Watson |
| 6,387,016 B1 | 5/2002 | Lo |
| 6,390,953 B1 | 5/2002 | Maresh |
| 6,390,955 B1 | 5/2002 | Wang |
| 6,394,239 B1 | 5/2002 | Carlson |
| 6,397,797 B1 | 6/2002 | Kolmanovsky et al. |
| 6,398,695 B2 | 6/2002 | Miller |
| 6,402,666 B2 | 6/2002 | Krull |
| 6,409,632 B1 | 6/2002 | Eschenbach |
| 6,409,633 B1 | 6/2002 | Abelbeck |
| 6,413,197 B2 | 7/2002 | McKechnie et al. |
| 6,416,442 B1 | 7/2002 | Stearns et al. |
| 6,416,444 B1 | 7/2002 | Lim |
| 6,419,611 B1 | 7/2002 | Levine et al. |
| 6,422,976 B1 | 7/2002 | Eschenbach |
| 6,422,977 B1 | 7/2002 | Eschenbach |
| 6,422,983 B1 | 7/2002 | Weck |
| 6,428,449 B1 | 8/2002 | Apseloff |
| 6,430,997 B1 | 8/2002 | French et al. |
| 6,432,026 B1 | 8/2002 | Wang |
| 6,435,466 B1 | 8/2002 | Adams |
| 6,436,007 B1 | 8/2002 | Eschenbach |
| 6,436,008 B1 | 8/2002 | Skowronski et al. |
| 6,440,013 B1 | 8/2002 | Brown |
| 6,440,042 B2 | 8/2002 | Eschenbach |
| 6,443,875 B1 | 9/2002 | Golen, Jr. et al. |
| 6,447,424 B1 | 9/2002 | Ashby et al. |
| 6,447,430 B1 | 9/2002 | Webb et al. |
| 6,450,284 B1 | 9/2002 | Sakyo et al. |
| 6,450,922 B1 | 9/2002 | Henderson et al. |
| 6,450,923 B1 | 9/2002 | Vatti |
| 6,450,925 B1 | 9/2002 | Kuo |
| 6,454,679 B1 | 9/2002 | Radow |
| 6,454,682 B1 | 9/2002 | Kuo |
| 6,455,960 B1 | 9/2002 | Trago et al. |
| 6,458,060 B1 | 10/2002 | Watterson et al. |
| 6,461,275 B1 | 10/2002 | Wang |
| 6,461,279 B1 | 10/2002 | Kuo |
| 6,466,460 B1 | 10/2002 | Rein et al. |
| 6,468,189 B2 | 10/2002 | Alessandri |
| 6,471,622 B1 | 10/2002 | Hammer et al. |
| 6,475,121 B2 | 11/2002 | Wang |
| 6,478,721 B1 | 11/2002 | Hunter |
| 6,482,128 B1 | 11/2002 | Michalow |
| 6,482,130 B1 | 11/2002 | Pasero et al. |
| 6,482,132 B2 | 11/2002 | Eschenbach |
| 6,485,397 B1 | 11/2002 | Manderbacka |
| 6,488,020 B1 | 12/2002 | Rosas-Magallan |
| 6,491,610 B1 | 12/2002 | Henn |
| 6,494,814 B1 | 12/2002 | Wang |
| 6,494,817 B2 | 12/2002 | Lake |
| 6,500,097 B1 | 12/2002 | Hall |
| 6,503,173 B2 | 1/2003 | Clem |
| 6,505,503 B1 | 1/2003 | Teresi et al. |
| 6,514,180 B1 | 2/2003 | Rawls |
| 6,520,891 B1 | 2/2003 | Stephens, Jr. |
| 6,527,674 B1 | 3/2003 | Clem |
| 6,527,678 B1 | 3/2003 | Wang |
| 6,527,685 B2 | 3/2003 | Endelman et al. |
| 6,527,796 B1 | 3/2003 | Magovern |
| 6,530,864 B1 | 3/2003 | Parks |
| 6,533,707 B2 | 3/2003 | Wang |
| 6,537,184 B2 | 3/2003 | Kim |
| 6,539,931 B2 | 4/2003 | Trajkovic et al. |
| 6,543,247 B2 | 4/2003 | Strauss |
| 6,544,146 B1 | 4/2003 | Stearns et al. |
| 6,547,701 B1 | 4/2003 | Eschenbach |
| 6,547,702 B1 | 4/2003 | Heidecke |
| 6,551,218 B2 | 4/2003 | Goh |
| 6,551,223 B2 | 4/2003 | Cheng |
| 6,554,749 B2 | 4/2003 | Iund et al. |
| 6,558,301 B1 | 5/2003 | Jackson |
| 6,561,960 B2 | 5/2003 | Webber |
| 6,563,489 B1 | 5/2003 | Latypov et al. |
| 6,569,061 B2 | 5/2003 | Stearns |
| 6,569,062 B2 | 5/2003 | Wang |
| 6,572,511 B1 | 6/2003 | Volpe |
| 6,572,512 B2 | 6/2003 | Anderson et al. |
| 6,572,513 B2 | 6/2003 | Whan-Tong et al. |
| 6,575,878 B1 | 6/2003 | Choy |
| 6,579,210 B1 | 6/2003 | Stearns et al. |
| 6,582,342 B2 | 6/2003 | Kaufman |
| 6,582,344 B2 | 6/2003 | Tang |
| 6,585,624 B1 | 7/2003 | Chen |
| 6,585,626 B2 | 7/2003 | McBride |
| 6,589,138 B2 | 7/2003 | Dyer et al. |
| 6,592,502 B1 | 7/2003 | Phillips |
| 6,599,223 B2 | 7/2003 | Wang |
| 6,601,016 B1 | 7/2003 | Brown et al. |
| 6,601,358 B2 | 8/2003 | Panatta |
| 6,601,825 B2 | 8/2003 | Bressner et al. |
| 6,604,008 B2 | 8/2003 | Chudley et al. |
| 6,605,020 B1 | 8/2003 | Huang |
| 6,609,478 B2 | 8/2003 | Del Valle |
| 6,610,063 B2 | 8/2003 | Kumar et al. |
| 6,612,969 B2 | 9/2003 | Eschenbach |
| 6,612,971 B1 | 9/2003 | Morris |
| 6,619,681 B2 | 9/2003 | Gutierrez |
| 6,620,079 B2 | 9/2003 | Kuo |
| 6,623,407 B2 | 9/2003 | Novak |
| 6,623,409 B1 | 9/2003 | Abelbeck |
| 6,626,799 B2 | 9/2003 | Watterson et al. |
| 6,626,802 B1 | 9/2003 | Rodgers, Jr. |
| 6,626,803 B1 | 9/2003 | Oglesby et al. |
| 6,629,902 B2 | 10/2003 | Murphy et al. |
| 6,629,909 B1 | 10/2003 | Stearns et al. |
| 6,629,910 B1 | 10/2003 | Krull |
| 6,632,161 B1 | 10/2003 | Nir |
| 6,634,996 B2 | 10/2003 | Jacobsen |
| 6,637,811 B2 | 10/2003 | Zheng |
| 6,637,818 B2 | 10/2003 | Williams |
| 6,645,125 B1 | 11/2003 | Stearns et al. |
| 6,645,126 B1 | 11/2003 | Martin et al. |
| 6,645,130 B2 | 11/2003 | Webber |
| 6,648,800 B2 | 11/2003 | Stearns et al. |
| 6,648,801 B2 | 11/2003 | Stearns et al. |
| 6,648,802 B2 | 11/2003 | Ware |
| 6,652,424 B2 | 11/2003 | Dalebout |
| 6,652,425 B1 | 11/2003 | Martin et al. |
| 6,652,429 B2 | 11/2003 | Bushnell |
| 6,660,949 B2 | 12/2003 | Kamino et al. |
| 6,661,136 B1 | 12/2003 | Lee |
| 6,663,127 B2 | 12/2003 | Miller |
| 6,663,498 B2 | 12/2003 | Stipan |
| 6,663,500 B2 | 12/2003 | Huang |
| 6,666,800 B2 | 12/2003 | Krull |
| 6,666,801 B1 | 12/2003 | Michalow |
| 6,668,678 B1 | 12/2003 | Baba et al. |
| 6,669,600 B2 | 12/2003 | Warner |
| 6,669,609 B2 | 12/2003 | Gerschefske et al. |
| 6,671,975 B2 | 1/2004 | Hennessey |
| 6,672,991 B2 | 1/2004 | O'Malley |
| 6,672,992 B1 | 1/2004 | Lo et al. |
| 6,672,994 B1 | 1/2004 | Stearns et al. |
| 6,676,530 B2 | 1/2004 | Lochtefeld |
| 6,676,569 B1 | 1/2004 | Radow |
| 6,676,572 B2 | 1/2004 | Wang |
| 6,676,579 B1 | 1/2004 | Lin |
| 6,679,816 B1 | 1/2004 | Krull |
| 6,679,820 B2 | 1/2004 | Barkus et al. |
| 6,681,704 B1 | 1/2004 | Brookhiser |
| 6,681,728 B2 | 1/2004 | Haghgooie |
| 6,682,460 B2 | 1/2004 | Lo |
| 6,682,461 B1 | 1/2004 | Wang |
| 6,685,601 B1 | 2/2004 | Knapp |
| 6,685,602 B2 | 2/2004 | Colosky, Jr. et al. |
| 6,685,607 B1 | 2/2004 | Olson |
| 6,689,019 B2 | 2/2004 | Ohrt et al. |
| 6,695,694 B2 | 2/2004 | Ishikawa et al. |
| 6,698,110 B1 | 3/2004 | Robbins |
| 6,699,159 B2 | 3/2004 | Rouse |

(56) References Cited

U.S. PATENT DOCUMENTS

| | | |
|---|---|---|
| 6,699,162 B2 | 3/2004 | Chen |
| 6,702,719 B1 | 3/2004 | Brown et al. |
| 6,705,977 B1 | 3/2004 | Ziak |
| 6,708,427 B2 | 3/2004 | Sussmann et al. |
| 6,712,737 B1 | 3/2004 | Nusbaum |
| 6,716,142 B2 | 4/2004 | Kuo |
| 6,716,144 B1 | 4/2004 | Shifferaw |
| 6,719,667 B2 | 4/2004 | Wong et al. |
| 6,719,669 B1 | 4/2004 | Wang |
| 6,723,413 B2 | 4/2004 | Walters |
| 6,726,600 B2 | 4/2004 | Miller |
| 6,726,601 B1 | 4/2004 | Beutel |
| 6,726,602 B2 | 4/2004 | Chang |
| 6,730,002 B2 | 5/2004 | Hald et al. |
| 6,733,423 B1 | 5/2004 | Chang |
| 6,733,424 B2 | 5/2004 | Krull |
| 6,736,360 B1 | 5/2004 | Buczek |
| 6,738,274 B2 | 5/2004 | Prasad et al. |
| 6,740,009 B1 | 5/2004 | Hall |
| 6,741,052 B2 | 5/2004 | Fitzgibbon |
| 6,743,153 B2 | 6/2004 | Watterson et al. |
| 6,746,371 B1 | 6/2004 | Brown et al. |
| 6,747,427 B1 | 6/2004 | Carson |
| 6,749,540 B1 | 6/2004 | Pasero et al. |
| 6,749,542 B2 | 6/2004 | Wu |
| 6,758,790 B1 | 7/2004 | Ellis |
| 6,758,791 B1 | 7/2004 | Kuo |
| 6,758,792 B1 | 7/2004 | Chang |
| 6,761,387 B2 | 7/2004 | Sloss |
| 6,761,667 B1 | 7/2004 | Cutler et al. |
| 6,764,429 B1 | 7/2004 | Michalow |
| 6,764,430 B1 | 7/2004 | Fencel |
| 6,764,431 B2 | 7/2004 | Yoss |
| 6,765,726 B2 | 7/2004 | French et al. |
| 6,767,314 B2 | 7/2004 | Thompson |
| 6,770,015 B2 | 8/2004 | Simonson |
| 6,776,740 B1 | 8/2004 | Anderson et al. |
| 6,778,938 B1 | 8/2004 | Ng et al. |
| 6,783,482 B2 | 8/2004 | Oglesby et al. |
| 6,786,821 B2 | 9/2004 | Nobe et al. |
| 6,786,847 B1 | 9/2004 | Morgan et al. |
| 6,786,848 B2 | 9/2004 | Yamashita et al. |
| 6,786,850 B2 | 9/2004 | Nizamuddin |
| 6,786,852 B2 | 9/2004 | Watterson et al. |
| 6,790,162 B1 | 9/2004 | Ellis et al. |
| 6,793,607 B2 | 9/2004 | Neil |
| 6,793,609 B1 | 9/2004 | Fan |
| 6,796,159 B2 | 9/2004 | Kelm et al. |
| 6,796,927 B2 | 9/2004 | Toyama |
| 6,808,458 B1 | 10/2004 | Jung |
| 6,808,475 B2 | 10/2004 | Kehrbaum |
| 6,811,519 B2 | 11/2004 | Kuo |
| 6,811,520 B2 | 11/2004 | Wu |
| 6,817,117 B1 | 11/2004 | Campbell |
| 6,817,968 B2 | 11/2004 | Galbraith et al. |
| 6,821,230 B2 | 11/2004 | Dalebout et al. |
| 6,824,210 B2 | 11/2004 | Zheng |
| 6,824,502 B1 | 11/2004 | Huang |
| 6,830,540 B2 | 12/2004 | Watterson |
| 6,830,541 B2 | 12/2004 | Wu |
| 6,835,166 B1 | 12/2004 | Stearns et al. |
| 6,837,829 B2 | 1/2005 | Eschenbach |
| 6,837,830 B2 | 1/2005 | Eldridge |
| 6,837,838 B2 | 1/2005 | List |
| 6,840,892 B1 | 1/2005 | Wu |
| 6,842,928 B2 | 1/2005 | Yang et al. |
| 6,843,732 B1 | 1/2005 | Huang |
| 6,846,272 B2 | 1/2005 | Rosenow et al. |
| 6,849,032 B2 | 2/2005 | Chu |
| 6,852,025 B2 | 2/2005 | Gumucio Del Pozo |
| 6,852,068 B2 | 2/2005 | Ogawa |
| 6,855,093 B2 | 2/2005 | Anderson et al. |
| 6,855,097 B2 | 2/2005 | Krull |
| 6,857,993 B2 | 2/2005 | Yeh |
| 6,860,836 B1 | 3/2005 | Wu |
| 6,860,839 B1 | 3/2005 | Dice |
| 6,872,168 B2 | 3/2005 | Wang et al. |
| 6,872,175 B2 | 3/2005 | Lin |
| 6,875,157 B1 | 4/2005 | Wang |
| 6,875,160 B2 | 4/2005 | Watterson et al. |
| 6,876,606 B2 | 4/2005 | Kajino et al. |
| 6,878,101 B2 | 4/2005 | Colley |
| 6,880,487 B2 | 4/2005 | Reinkensmeyer et al. |
| 6,881,176 B2 | 4/2005 | Oishi et al. |
| 6,887,185 B1 | 5/2005 | Kuo |
| 6,887,190 B1 | 5/2005 | Azari |
| 6,893,383 B1 | 5/2005 | Chang et al. |
| 6,896,645 B1 | 5/2005 | Krull |
| 6,899,657 B2 | 5/2005 | Chuang |
| 6,899,659 B2 | 5/2005 | Anderson et al. |
| 6,902,513 B1 | 6/2005 | Mcclure |
| 6,902,515 B2 | 6/2005 | Howell et al. |
| 6,905,446 B2 | 6/2005 | Greenland |
| 6,908,416 B2 | 6/2005 | Mercado et al. |
| 6,908,417 B2 | 6/2005 | Jackson |
| 6,913,562 B2 | 7/2005 | Chen |
| 6,913,563 B2 | 7/2005 | Chen |
| 6,916,278 B2 | 7/2005 | Webber |
| 6,918,858 B2 | 7/2005 | Watterson et al. |
| 6,918,859 B1 | 7/2005 | Yeh |
| 6,918,860 B1 | 7/2005 | Nusbaum |
| 6,921,354 B1 | 7/2005 | Shifferaw |
| 6,921,355 B2 | 7/2005 | Campanaro et al. |
| 6,923,746 B1 | 8/2005 | Skowronski et al. |
| 6,923,747 B1 | 8/2005 | Chu |
| 6,926,644 B2 | 8/2005 | Chen |
| 6,926,646 B1 | 8/2005 | Nguyen |
| 6,932,745 B1 | 8/2005 | Ellis |
| 6,939,271 B1 | 9/2005 | Whan-Tong et al. |
| 6,944,294 B2 | 9/2005 | Tsay |
| 6,945,912 B2 | 9/2005 | Levi |
| 6,945,917 B1 | 9/2005 | Baatz |
| 6,949,053 B1 | 9/2005 | Stearns |
| 6,949,054 B1 | 9/2005 | Stearns |
| 6,953,418 B1 | 10/2005 | Chen |
| 6,964,632 B1 | 11/2005 | Ko |
| 6,966,872 B2 | 11/2005 | Eschenbach |
| 6,974,404 B1 | 12/2005 | Watterson et al. |
| 6,976,698 B2 | 12/2005 | Kuiken |
| 6,979,283 B2 | 12/2005 | Pan |
| 6,991,588 B1 | 1/2006 | Adams |
| 6,994,306 B1 | 2/2006 | Sweere et al. |
| 6,994,657 B1 | 2/2006 | Eschenbach |
| 6,997,852 B2 | 2/2006 | Watterson et al. |
| 6,997,856 B1 | 2/2006 | Krull |
| 7,001,288 B2 | 2/2006 | Harrell |
| 7,003,122 B2 | 2/2006 | Chen |
| 7,004,271 B1 | 2/2006 | Kamen et al. |
| 7,004,887 B2 | 2/2006 | Pan et al. |
| 7,004,888 B1 | 2/2006 | Weng |
| 7,008,359 B2 | 3/2006 | Fan et al. |
| 7,011,326 B1 | 3/2006 | Schroeder et al. |
| 7,011,607 B2 | 3/2006 | Kolda et al. |
| 7,011,609 B1 | 3/2006 | Kuo |
| 7,022,048 B1 | 4/2006 | Fernandez |
| 7,022,049 B2 | 4/2006 | Ryan et al. |
| 7,022,051 B2 | 4/2006 | Ota |
| 7,032,870 B2 | 4/2006 | Sweere et al. |
| 7,033,176 B2 | 4/2006 | Feldman |
| 7,033,306 B2 | 4/2006 | Graber |
| 7,039,263 B2 | 5/2006 | Towle |
| 7,041,034 B1 | 5/2006 | Stearns et al. |
| 7,041,038 B2 | 5/2006 | Smith |
| 7,041,041 B1 | 5/2006 | Evans |
| 7,044,891 B1 | 5/2006 | Rivera |
| 7,052,426 B2 | 5/2006 | Battat et al. |
| 7,052,440 B2 | 5/2006 | Pyles et al. |
| 7,052,442 B2 | 5/2006 | Watterson |
| 7,052,444 B2 | 5/2006 | Webber |
| 7,052,446 B2 | 5/2006 | Morris et al. |
| 7,055,899 B2 | 6/2006 | Zhurong et al. |
| 7,060,005 B2 | 6/2006 | Carlsen et al. |
| 7,060,006 B1 | 6/2006 | Watterson et al. |
| 7,070,542 B2 | 7/2006 | Reyes et al. |

(56) References Cited

U.S. PATENT DOCUMENTS

| | | |
|---|---|---|
| 7,070,545 B2 | 7/2006 | Lull et al. |
| 7,073,852 B1 | 7/2006 | Zheng |
| 7,077,788 B2 | 7/2006 | Chang |
| 7,077,791 B2 | 7/2006 | Krull |
| 7,081,073 B1 | 7/2006 | Smith |
| 7,082,703 B2 | 8/2006 | Greene et al. |
| 7,086,994 B2 | 8/2006 | Turak et al. |
| 7,090,621 B2 | 8/2006 | Loane |
| 7,090,622 B2 | 8/2006 | Hetrick |
| 7,097,591 B2 | 8/2006 | Moon |
| 7,097,593 B2 | 8/2006 | Chang |
| 7,100,517 B1 | 9/2006 | Godwin |
| 7,101,319 B1 | 9/2006 | Potts |
| 7,101,322 B2 | 9/2006 | Carle |
| 7,101,330 B2 | 9/2006 | Elbaz et al. |
| 7,104,926 B2 | 9/2006 | Carlson |
| 7,104,937 B2 | 9/2006 | Arbuckle |
| 7,108,641 B2 | 9/2006 | Pertegaz-Esteban |
| 7,108,659 B2 | 9/2006 | Ross et al. |
| 7,112,037 B2 | 9/2006 | Sabini et al. |
| 7,115,073 B2 | 10/2006 | Nizamuddin |
| 7,125,371 B2 | 10/2006 | Henderson |
| 7,132,939 B2 | 11/2006 | Tyndall et al. |
| 7,140,626 B1 | 11/2006 | Keay |
| 7,141,008 B2 | 11/2006 | Krull et al. |
| 7,156,776 B2 | 1/2007 | Maser |
| 7,163,493 B1 | 1/2007 | Kuo |
| 7,163,498 B1 | 1/2007 | Abelbeck |
| 7,163,500 B2 | 1/2007 | Endelman et al. |
| 7,166,062 B1 | 1/2007 | Watterson et al. |
| 7,166,064 B2 | 1/2007 | Watterson et al. |
| 7,166,067 B2 | 1/2007 | Talish et al. |
| 7,168,668 B2 | 1/2007 | Coyle |
| 7,169,087 B2 | 1/2007 | Ercanbrack et al. |
| 7,169,088 B2 | 1/2007 | Rodgers, Jr. |
| 7,172,531 B2 | 2/2007 | Rodgers, Jr. |
| 7,175,193 B2 | 2/2007 | Wu |
| 7,179,201 B2 | 2/2007 | Rodgers, Jr. |
| 7,179,207 B2 | 2/2007 | Gerschefske |
| 7,179,208 B1 | 2/2007 | Nalley |
| 7,179,209 B2 | 2/2007 | Sechrest et al. |
| 7,186,189 B2 | 3/2007 | Huang |
| 7,187,145 B2 | 3/2007 | Tsuruta et al. |
| 7,192,387 B2 | 3/2007 | Mendel |
| 7,192,388 B2 | 3/2007 | Dalebout et al. |
| 7,195,568 B2 | 3/2007 | Huang |
| 7,201,705 B2 | 4/2007 | Rodgers, Jr. |
| 7,201,707 B1 | 4/2007 | Moon |
| 7,204,328 B2 | 4/2007 | LoPresti |
| 7,211,029 B2 | 5/2007 | Kau |
| 7,214,167 B2 | 5/2007 | Stearns |
| 7,217,224 B2 | 5/2007 | Thomas |
| 7,217,225 B2 | 5/2007 | Husted et al. |
| 7,220,219 B2 | 5/2007 | Papadopoulos et al. |
| 7,220,221 B2 | 5/2007 | Mosimann et al. |
| 7,223,209 B2 | 5/2007 | Lee |
| 7,223,216 B1 | 5/2007 | McBride |
| 7,225,694 B2 | 6/2007 | Said |
| 7,226,402 B1 | 6/2007 | Joya |
| 7,235,942 B2 | 6/2007 | Nagaoka et al. |
| 7,238,147 B2 | 7/2007 | Mills et al. |
| 7,244,217 B2 | 7/2007 | Rodgers, Jr. |
| 7,247,128 B2 | 7/2007 | Oga |
| 7,248,942 B2 | 7/2007 | Bash et al. |
| 7,250,022 B2 | 7/2007 | Dalebout |
| 7,257,468 B1 | 8/2007 | Costa et al. |
| 7,258,651 B2 | 8/2007 | Clarke |
| 7,264,554 B2 | 9/2007 | Bentley |
| 7,269,038 B2 | 9/2007 | Shekhawat |
| 7,278,934 B2 | 10/2007 | McBride et al. |
| 7,278,955 B2 | 10/2007 | Giannelli et al. |
| 7,278,958 B2 | 10/2007 | Morgan |
| 7,278,966 B2 | 10/2007 | Hjelt et al. |
| 7,279,868 B2 | 10/2007 | Lanni |
| 7,285,075 B2 | 10/2007 | Cutler et al. |
| 7,287,770 B2 | 10/2007 | Drabant et al. |
| 7,290,760 B1 | 11/2007 | Lindsay |
| 7,291,096 B2 | 11/2007 | Ho |
| 7,292,151 B2 | 11/2007 | Ferguson |
| 7,293,510 B1 | 11/2007 | Siao et al. |
| 7,294,094 B1 | 11/2007 | Howle |
| 7,294,100 B2 | 11/2007 | Bull |
| 7,303,508 B2 | 12/2007 | Toyama et al. |
| 7,303,510 B2 | 12/2007 | Gebhardt |
| 7,311,640 B2 | 12/2007 | Baatz |
| 7,316,633 B2 | 1/2008 | Liao et al. |
| 7,319,457 B2 | 1/2008 | Lin et al. |
| 7,322,907 B2 | 1/2008 | Bowser |
| 7,329,212 B2 | 2/2008 | Roque |
| 7,334,350 B2 | 2/2008 | Ellis, III |
| 7,335,139 B2 | 2/2008 | Bartholomew et al. |
| 7,335,140 B2 | 2/2008 | Webber et al. |
| 7,335,147 B2 | 2/2008 | Jones |
| 7,344,481 B2 | 3/2008 | Watterson et al. |
| 7,346,935 B1 | 3/2008 | Patterson |
| 7,347,806 B2 | 3/2008 | Nakano et al. |
| 7,351,187 B2 | 4/2008 | Seliber |
| 7,352,365 B2 | 4/2008 | Trachte |
| 7,354,380 B2 | 4/2008 | Volpe, Jr. |
| 7,357,758 B2 | 4/2008 | Polk, III |
| 7,359,121 B2 | 4/2008 | French et al. |
| 7,361,125 B2 | 4/2008 | Webber et al. |
| 7,364,538 B2 | 4/2008 | Aucamp |
| 7,366,921 B2 | 4/2008 | Ranganathan |
| 7,367,926 B2 | 5/2008 | Clark |
| 7,369,121 B2 | 5/2008 | Lane |
| 7,374,522 B2 | 5/2008 | Arnold |
| 7,377,881 B2 | 5/2008 | Moon |
| 7,377,882 B2 | 5/2008 | Watterson |
| 7,384,013 B2 | 6/2008 | Yen |
| 7,393,308 B1 | 7/2008 | Huang |
| 7,402,145 B1 | 7/2008 | Woggon |
| 7,410,449 B2 | 8/2008 | Yeh |
| 7,413,532 B1 | 8/2008 | Monsrud et al. |
| 7,425,189 B1 | 9/2008 | Eschenbach |
| 7,428,760 B2 | 9/2008 | McCrimmon |
| 7,429,236 B2 | 9/2008 | Dalebout et al. |
| 7,432,677 B2 | 10/2008 | Heydt et al. |
| 7,435,202 B2 | 10/2008 | Daly et al. |
| 7,435,205 B2 | 10/2008 | Reyes et al. |
| 7,455,621 B1 | 11/2008 | Anthony |
| 7,455,626 B2 | 11/2008 | Trevino et al. |
| 7,455,628 B1 | 11/2008 | Stearns |
| 7,470,234 B1 | 12/2008 | Elhag et al. |
| 7,475,613 B2 | 1/2009 | Bailey |
| 7,488,277 B1 | 2/2009 | Knapp |
| 7,494,450 B2 | 2/2009 | Solomon |
| 7,497,784 B2 | 3/2009 | Henry |
| 7,507,187 B2 | 3/2009 | Dyer et al. |
| 7,507,189 B2 | 3/2009 | Krull |
| 7,510,511 B2 | 3/2009 | Von Detten |
| 7,517,303 B2 | 4/2009 | Crawford et al. |
| 7,520,840 B2 | 4/2009 | Shifferaw |
| 7,524,272 B2 | 4/2009 | Bruck et al. |
| 7,525,293 B1 | 4/2009 | Notohamiprodjo et al. |
| 7,525,751 B2 | 4/2009 | Han et al. |
| 7,537,546 B2 | 5/2009 | Watterson et al. |
| 7,537,549 B2 | 5/2009 | Nelson et al. |
| 7,537,550 B1 | 5/2009 | Krull |
| 7,540,828 B2 | 6/2009 | Watterson et al. |
| 7,540,829 B1 | 6/2009 | Lin |
| 7,544,153 B2 | 6/2009 | Trevino et al. |
| 7,553,260 B2 | 6/2009 | Piaget et al. |
| 7,553,262 B2 | 6/2009 | Piane, Jr. |
| 7,556,590 B2 | 7/2009 | Watterson et al. |
| 7,556,591 B2 | 7/2009 | Chuang |
| 7,556,592 B2 | 7/2009 | Nizam |
| 7,559,879 B2 | 7/2009 | Anderson et al. |
| 7,563,203 B2 | 7/2009 | Dalebout et al. |
| 7,563,205 B2 | 7/2009 | Alling |
| 7,569,000 B2 | 8/2009 | Wang |
| 7,569,004 B2 | 8/2009 | Kolomeir |
| 7,575,537 B2 | 8/2009 | Ellis |
| 7,585,251 B2 | 9/2009 | Doody, Jr. et al. |

(56) References Cited

U.S. PATENT DOCUMENTS

| | | |
|---|---|---|
| 7,585,254 B1 | 9/2009 | Vittone |
| 7,585,258 B2 | 9/2009 | Watson et al. |
| 7,591,770 B2 | 9/2009 | Stewart et al. |
| 7,591,795 B2 | 9/2009 | Whalen et al. |
| 7,594,877 B2 | 9/2009 | Anderson et al. |
| 7,594,878 B1 | 9/2009 | Joannou |
| 7,601,101 B2 | 10/2009 | Jackson et al. |
| 7,602,301 B1 | 10/2009 | Stirling et al. |
| 7,604,571 B2 | 10/2009 | Wilkins et al. |
| 7,604,572 B2 | 10/2009 | Stanford |
| 7,604,573 B2 | 10/2009 | Dalebout et al. |
| 7,608,015 B2 | 10/2009 | Radow |
| 7,608,021 B1 | 10/2009 | Nalley |
| 7,608,023 B2 | 10/2009 | Casagrande |
| 7,608,028 B2 | 10/2009 | Pertegaz-Esteban |
| 7,614,482 B2 | 11/2009 | Shikai et al. |
| 7,614,639 B2 | 11/2009 | Tholkes et al. |
| 7,614,981 B2 | 11/2009 | Cao |
| 7,618,345 B2 | 11/2009 | Corbalis et al. |
| 7,618,346 B2 | 11/2009 | Crawford et al. |
| 7,618,350 B2 | 11/2009 | Dalebout et al. |
| 7,621,850 B2 | 11/2009 | Piaget et al. |
| 7,621,855 B1 | 11/2009 | Krull |
| 7,625,314 B2 | 12/2009 | Ungari |
| 7,628,730 B1 | 12/2009 | Watterson et al. |
| 7,628,732 B1 | 12/2009 | Porszasz et al. |
| 7,637,847 B1 | 12/2009 | Hickman |
| 7,637,850 B2 | 12/2009 | Lin |
| 7,639,520 B1 | 12/2009 | Zansky et al. |
| 7,645,212 B2 | 1/2010 | Ashby et al. |
| 7,645,214 B2 | 1/2010 | Lull |
| 7,645,215 B2 | 1/2010 | Gordon |
| 7,645,218 B2 | 1/2010 | Potok et al. |
| 7,647,196 B2 | 1/2010 | Kahn et al. |
| 7,648,446 B2 | 1/2010 | Chiles et al. |
| 7,650,987 B2 | 1/2010 | Taniguchi et al. |
| 7,651,442 B2 | 1/2010 | Carlson |
| 7,654,229 B2 | 2/2010 | Smith |
| 7,658,694 B2 | 2/2010 | Ungari |
| 7,658,695 B1 | 2/2010 | Amsbury et al. |
| 7,658,698 B2 | 2/2010 | Pacheco et al. |
| 7,670,263 B2 | 3/2010 | Ellis |
| 7,674,205 B2 | 3/2010 | Dalebout et al. |
| 7,674,206 B2 | 3/2010 | Jones |
| 7,677,518 B2 | 3/2010 | Chouinard et al. |
| 7,682,286 B2 | 3/2010 | Badarneh et al. |
| 7,682,287 B1 | 3/2010 | Hsieh |
| 7,682,290 B2 | 3/2010 | Liao et al. |
| 7,682,291 B2 | 3/2010 | Gill et al. |
| 7,690,556 B1 | 4/2010 | Kahn et al. |
| 7,695,409 B2 | 4/2010 | Helie et al. |
| 7,704,191 B2 | 4/2010 | Smith et al. |
| 7,704,192 B2 | 4/2010 | Dyer et al. |
| 7,708,668 B2 | 5/2010 | Rodgers, Jr. |
| 7,708,672 B2 | 5/2010 | Gibson et al. |
| 7,713,172 B2 | 5/2010 | Watterson et al. |
| 7,713,177 B2 | 5/2010 | Lo |
| 7,717,826 B2 | 5/2010 | Cox et al. |
| 7,717,827 B2 | 5/2010 | Kurunmäki et al. |
| 7,717,828 B2 | 5/2010 | Simonson et al. |
| 7,717,830 B1 | 5/2010 | Charniga et al. |
| 7,721,561 B2 | 5/2010 | Kim |
| 7,722,503 B1 | 5/2010 | Smith et al. |
| 7,722,509 B2 | 5/2010 | Eder |
| 7,731,634 B2 | 6/2010 | Stewart et al. |
| 7,736,272 B2 | 6/2010 | Martens |
| 7,736,273 B2 | 6/2010 | Cox et al. |
| 7,736,279 B2 | 6/2010 | Dalebout et al. |
| 7,736,280 B2 | 6/2010 | Weier et al. |
| 7,736,281 B2 | 6/2010 | Corbalis et al. |
| 7,740,563 B2 | 6/2010 | Dalebout et al. |
| 7,745,716 B1 | 6/2010 | Murphy |
| 7,746,063 B2 | 6/2010 | Sabini et al. |
| 7,749,137 B2 | 7/2010 | Watt et al. |
| 7,749,138 B2 | 7/2010 | Wang |
| 7,753,830 B1 | 7/2010 | Marsh et al. |
| 7,753,861 B1 | 7/2010 | Kahn et al. |
| 7,758,469 B2 | 7/2010 | Dyer et al. |
| 7,758,470 B2 | 7/2010 | Hirata et al. |
| 7,761,212 B2 | 7/2010 | Takebayashi |
| 7,762,952 B2 | 7/2010 | Lee et al. |
| 7,766,797 B2 | 8/2010 | Dalebout |
| 7,771,319 B1 | 8/2010 | Lannon |
| 7,771,320 B2 | 8/2010 | Riley et al. |
| 7,771,329 B2 | 8/2010 | Dalebout et al. |
| 7,771,371 B2 | 8/2010 | Avni |
| 7,775,128 B2 | 8/2010 | Roessingh et al. |
| 7,775,936 B2 | 8/2010 | Wilkinson |
| 7,775,943 B2 | 8/2010 | Vittone |
| 7,780,578 B2 | 8/2010 | Packham |
| 7,789,800 B1 | 9/2010 | Watterson et al. |
| 7,794,363 B2 | 9/2010 | Wang |
| 7,795,824 B2 | 9/2010 | Wong |
| 7,806,780 B1 | 10/2010 | Plunkett |
| 7,806,805 B2 | 10/2010 | Barufka et al. |
| 7,811,209 B2 | 10/2010 | Crawford et al. |
| 7,815,549 B2 | 10/2010 | Crawford et al. |
| 7,815,550 B2 | 10/2010 | Watterson et al. |
| 7,815,554 B2 | 10/2010 | Gibson et al. |
| 7,828,698 B2 | 11/2010 | Rodgers, Jr. |
| 7,828,699 B2 | 11/2010 | P Erez De Lazarraga |
| 7,837,161 B2 | 11/2010 | Chase |
| 7,837,595 B2 | 11/2010 | Rice |
| 7,839,058 B1 | 11/2010 | Churchill et al. |
| 7,846,070 B2 | 12/2010 | Oglesby et al. |
| 7,854,669 B2 | 12/2010 | Marty et al. |
| 7,854,690 B2 | 12/2010 | Trevino et al. |
| 7,862,475 B2 | 1/2011 | Watterson |
| 7,862,483 B2 | 1/2011 | Hendrickson et al. |
| 7,871,355 B2 | 1/2011 | Yeh |
| 7,871,357 B2 | 1/2011 | Gibson et al. |
| 7,873,849 B2 | 1/2011 | Mucignat et al. |
| 7,874,963 B2 | 1/2011 | Grind |
| 7,878,950 B1 | 2/2011 | Bastian |
| 7,883,448 B2 | 2/2011 | Wang |
| 7,887,465 B2 | 2/2011 | Uffelman |
| 7,892,148 B1 | 2/2011 | Stauffer et al. |
| 7,892,149 B2 | 2/2011 | Wu |
| 7,892,150 B1 | 2/2011 | Colley |
| 7,901,324 B2 | 3/2011 | Kodama |
| 7,901,325 B2 | 3/2011 | Henderson |
| 7,908,981 B2 | 3/2011 | Agee |
| 7,914,420 B2 | 3/2011 | Daly et al. |
| 7,914,421 B2 | 3/2011 | Weier et al. |
| 7,919,950 B2 | 4/2011 | Uno et al. |
| 7,922,635 B2 | 4/2011 | Lull et al. |
| 7,927,253 B2 | 4/2011 | Vincent |
| 7,927,257 B2 | 4/2011 | Patel |
| 7,927,267 B2 | 4/2011 | Splane |
| 7,931,563 B2 | 4/2011 | Shaw et al. |
| 8,029,418 B2 | 4/2011 | Nishimura |
| 7,938,751 B2 | 5/2011 | Nicolas et al. |
| 7,938,755 B1 | 5/2011 | Dyer et al. |
| 7,942,783 B2 | 5/2011 | Ochi |
| 7,942,788 B2 | 5/2011 | Wu |
| 7,946,967 B2 | 5/2011 | Berhanu |
| 7,946,968 B2 | 5/2011 | Kjellberg |
| 7,949,295 B2 | 5/2011 | Kumar et al. |
| 7,951,046 B1 | 5/2011 | Barber, Jr. |
| 7,959,124 B2 | 6/2011 | Phifer et al. |
| 7,967,728 B2 | 6/2011 | Zavadsky |
| 7,967,730 B2 | 6/2011 | Crawford et al. |
| 7,972,245 B2 | 7/2011 | Temple |
| 7,972,249 B1 | 7/2011 | Napalan |
| 7,976,437 B1 | 7/2011 | Von Detten |
| 7,978,081 B2 | 7/2011 | Shears et al. |
| 7,985,164 B2 | 7/2011 | Ashby |
| 7,985,166 B2 | 7/2011 | Farnsworth et al. |
| 7,988,600 B2 | 8/2011 | Rodgers, Jr. |
| 7,992,879 B2 | 8/2011 | Eisenberg et al. |
| 8,001,472 B2 | 8/2011 | Gilley et al. |
| 8,002,674 B2 | 8/2011 | Piaget et al. |
| 8,002,684 B2 | 8/2011 | Laurent |
| 8,007,407 B2 | 8/2011 | Richter |

(56) References Cited

U.S. PATENT DOCUMENTS

| | | |
|---|---|---|
| 8,007,409 B2 | 8/2011 | Elllis |
| 8,007,422 B2 | 8/2011 | Zaccherini |
| 8,011,242 B2 | 9/2011 | O'neill |
| 8,012,067 B2 | 9/2011 | Joannou |
| 8,012,068 B1 | 9/2011 | Malcolm |
| 8,029,415 B2 | 10/2011 | Ashby et al. |
| 8,033,959 B2 | 10/2011 | Oleson et al. |
| 8,038,117 B2 | 10/2011 | Chen et al. |
| 8,038,577 B2 | 10/2011 | McIntosh |
| 8,040,117 B2 | 10/2011 | Telefus |
| 8,043,173 B2 | 10/2011 | Menalagha et al. |
| 8,047,965 B2 | 11/2011 | Shea |
| 8,047,966 B2 | 11/2011 | Dorogusker et al. |
| 8,047,970 B2 | 11/2011 | Nalley |
| 8,055,469 B2 | 11/2011 | Kulach et al. |
| 8,057,366 B2 | 11/2011 | Schippers |
| 8,057,368 B1 | 11/2011 | Lyszczarz |
| 8,062,196 B1 | 11/2011 | Khubani |
| 8,063,776 B2 | 11/2011 | Ruha |
| 8,066,514 B2 | 11/2011 | Clarke |
| 8,079,937 B2 | 12/2011 | Bedell |
| 8,079,939 B1 | 12/2011 | Wang |
| 8,082,029 B2 | 12/2011 | Honda |
| 8,083,693 B1 | 12/2011 | McKeon et al. |
| 8,088,044 B2 | 1/2012 | Tchao et al. |
| 8,103,379 B2 | 1/2012 | Biba et al. |
| 8,104,411 B2 | 1/2012 | Fenton |
| 8,105,213 B2 | 1/2012 | Stewart et al. |
| 8,109,858 B2 | 2/2012 | Redmann |
| 8,109,864 B2 | 2/2012 | Tseng |
| 8,113,990 B2 | 2/2012 | Kolman et al. |
| 8,113,994 B2 | 2/2012 | Piaget et al. |
| 8,118,888 B2 | 2/2012 | Molter |
| 8,123,527 B2 | 2/2012 | Holljes |
| 8,141,276 B2 | 3/2012 | Ellis |
| 8,147,385 B2 | 4/2012 | Crawford et al. |
| 8,162,804 B2 | 4/2012 | Tagliabue |
| 8,169,326 B2 | 5/2012 | Niva et al. |
| 8,172,729 B2 | 5/2012 | Ellis |
| 8,177,688 B2 | 5/2012 | Burnfield et al. |
| 8,182,399 B2 | 5/2012 | Davis et al. |
| 8,188,700 B2 | 5/2012 | Tseng et al. |
| 8,192,332 B2 | 6/2012 | Baker et al. |
| 8,200,323 B2 | 6/2012 | Dibenedetto et al. |
| 8,206,266 B2 | 6/2012 | Hall |
| 8,221,290 B2 | 7/2012 | Vincent et al. |
| 8,240,430 B2 | 8/2012 | Downey |
| 8,241,186 B2 | 8/2012 | Brodess |
| 8,241,187 B2 | 8/2012 | Moon et al. |
| 8,251,874 B2 | 8/2012 | Ashby et al. |
| 8,260,858 B2 | 9/2012 | Belz et al. |
| 8,272,996 B2 | 9/2012 | Weier |
| 8,275,265 B2 | 9/2012 | Kobyakov et al. |
| 8,280,259 B2 | 10/2012 | George et al. |
| 8,287,434 B2 | 10/2012 | Zavadsky et al. |
| 8,306,635 B2 | 11/2012 | Pryor |
| 8,309,870 B2 | 11/2012 | Peterson et al. |
| 8,315,823 B2 | 11/2012 | Berme et al. |
| 8,317,663 B2 | 11/2012 | Stewart et al. |
| 8,320,578 B2 | 11/2012 | Kahn et al. |
| 8,323,157 B2 | 12/2012 | Campanaro et al. |
| 8,333,681 B2 | 12/2012 | Schmidt |
| 8,343,016 B1 | 1/2013 | Astilean |
| 8,360,904 B2 | 1/2013 | Oleson et al. |
| 8,360,935 B2 | 1/2013 | Olsen et al. |
| 8,360,936 B2 | 1/2013 | Dibenedetto et al. |
| 8,368,329 B1 | 2/2013 | Depew et al. |
| 8,376,911 B2 | 2/2013 | Ogg et al. |
| 8,378,647 B2 | 2/2013 | Yonezawa et al. |
| 8,394,002 B2 | 3/2013 | Park |
| 8,394,005 B2 | 3/2013 | Solow et al. |
| 8,395,366 B2 | 3/2013 | Uno |
| 8,398,529 B2 | 3/2013 | Ellis |
| 8,403,816 B2 | 3/2013 | Park |
| 8,435,160 B1 | 5/2013 | Clum |
| 8,446,275 B2 | 5/2013 | Utter, II |
| 8,449,620 B2 | 5/2013 | Hakansson et al. |
| 8,454,437 B2 | 6/2013 | Dugan |
| 8,467,979 B2 | 6/2013 | Sobolewski |
| 8,475,346 B2 | 7/2013 | Gerschefske et al. |
| 8,475,367 B1 | 7/2013 | Yuen et al. |
| 8,480,541 B2 | 7/2013 | Brunts |
| 8,485,944 B2 | 7/2013 | Drazan |
| 8,485,945 B2 | 7/2013 | Leonhard |
| 8,487,759 B2 | 7/2013 | Hill |
| 8,493,757 B2 | 7/2013 | Carletti et al. |
| 8,505,597 B2 | 8/2013 | Sharperson |
| 8,506,370 B2 | 8/2013 | Homsi |
| 8,512,210 B2 | 8/2013 | Shauli |
| 8,516,723 B2 | 8/2013 | Ferrigan et al. |
| 8,527,101 B2 | 9/2013 | Burris et al. |
| 8,535,247 B2 | 9/2013 | Williams |
| 8,537,017 B2 | 9/2013 | Mack et al. |
| 8,540,560 B2 | 9/2013 | Crowley et al. |
| 8,540,607 B2 | 9/2013 | Kissel et al. |
| 8,550,962 B2 | 10/2013 | Piaget et al. |
| 8,552,859 B2 | 10/2013 | Pakula et al. |
| 8,556,090 B2 | 10/2013 | Chen |
| 8,562,489 B2 | 10/2013 | Burton et al. |
| 8,564,235 B2 | 10/2013 | Burris et al. |
| 8,569,963 B2 | 10/2013 | Walters |
| 8,571,250 B2 | 10/2013 | Royer |
| 8,573,982 B1 | 11/2013 | Chuang |
| 8,574,131 B2 | 11/2013 | Daly |
| 8,602,951 B2 | 12/2013 | Morris |
| 8,608,624 B2 | 12/2013 | Shabodyash et al. |
| 8,614,595 B2 | 12/2013 | Acatrinei |
| 8,614,902 B2 | 12/2013 | Pansier et al. |
| 8,615,377 B1 | 12/2013 | Yuen et al. |
| 8,617,008 B2 | 12/2013 | Marty et al. |
| 8,622,747 B2 | 1/2014 | Chu et al. |
| 8,647,240 B2 | 2/2014 | Heidecke |
| 8,651,030 B2 | 2/2014 | Coffman |
| 8,655,004 B2 | 2/2014 | Prest et al. |
| 8,657,724 B2 | 2/2014 | Yang |
| 8,663,072 B2 | 3/2014 | Stewart et al. |
| 8,671,853 B2 | 3/2014 | Flaherty |
| 8,678,897 B2 | 3/2014 | Englert et al. |
| 8,690,578 B1 | 4/2014 | Nusbaum et al. |
| 8,690,735 B2 | 4/2014 | Watterson et al. |
| 8,690,738 B1 | 4/2014 | Astilian |
| 8,698,446 B2 | 4/2014 | Venkataraman |
| 8,701,567 B1 | 4/2014 | Esfandiari et al. |
| 8,702,430 B2 | 4/2014 | Dibenedetto et al. |
| 8,702,567 B2 | 4/2014 | Hu |
| 8,702,575 B2 | 4/2014 | McVay et al. |
| 8,706,530 B2 | 4/2014 | Ohnemus et al. |
| 8,708,870 B2 | 4/2014 | Nalley |
| 8,714,346 B2 | 5/2014 | Freitag |
| 8,734,157 B1 | 5/2014 | Hummel, III |
| 8,734,301 B2 | 5/2014 | Remelius |
| 8,734,302 B2 | 5/2014 | Hsieh |
| 8,738,321 B2 | 5/2014 | Yuen et al. |
| 8,739,974 B2 | 6/2014 | Tevault |
| 8,740,756 B2 | 6/2014 | Shabodyash et al. |
| 8,749,380 B2 | 6/2014 | Vock et al. |
| 8,758,201 B2 | 6/2014 | Ashby et al. |
| 8,762,077 B2 | 6/2014 | Redmond |
| 8,762,101 B2 | 6/2014 | Yuen et al. |
| 8,764,609 B1 | 7/2014 | Elahmadie |
| 8,772,984 B2 | 7/2014 | Chang |
| 8,777,820 B2 | 7/2014 | Lo |
| 8,783,326 B1 | 7/2014 | Vaninger et al. |
| 8,784,274 B1 | 7/2014 | Chuang |
| 8,786,575 B2 | 7/2014 | Miller |
| 8,790,222 B2 | 7/2014 | Burger |
| 8,801,578 B2 | 8/2014 | Corbalis |
| 8,801,581 B2 | 8/2014 | Lai et al. |
| 8,801,582 B2 | 8/2014 | Huang |
| 8,821,350 B2 | 9/2014 | Maertz |
| 8,824,166 B2 | 9/2014 | Rohrbach |
| 8,824,697 B2 | 9/2014 | Christoph |
| 8,825,445 B2 | 9/2014 | Hoffman et al. |
| 8,837,174 B2 | 9/2014 | Hosotani |

(56) References Cited

U.S. PATENT DOCUMENTS

| | | |
|---|---|---|
| 8,839,725 B2 | 9/2014 | Kooistra |
| 8,845,498 B2 | 9/2014 | Webb |
| 8,847,988 B2 | 9/2014 | Geisner et al. |
| 8,851,565 B2 | 10/2014 | Hontz et al. |
| 8,858,409 B2 | 10/2014 | Trees |
| 8,864,627 B2 | 10/2014 | Bayerlein et al. |
| 8,876,661 B2 | 11/2014 | Lu |
| 8,876,668 B2 | 11/2014 | Hendrickson et al. |
| 8,888,660 B1 | 11/2014 | Oteman |
| 8,894,551 B2 | 11/2014 | Kerdjoudj |
| 8,913,409 B2 | 12/2014 | Hui et al. |
| 8,920,288 B2 | 12/2014 | Dalebout |
| 8,920,291 B2 | 12/2014 | Chen et al. |
| 8,922,498 B2 | 12/2014 | Vesely |
| 8,926,475 B2 | 1/2015 | Lin et al. |
| 8,926,479 B2 | 1/2015 | Chen et al. |
| 8,956,290 B2 | 2/2015 | Gilley et al. |
| 8,956,715 B2 | 2/2015 | Kim |
| 8,961,439 B2 | 2/2015 | Yang et al. |
| 8,968,160 B2 | 3/2015 | Cassano |
| 8,968,163 B1 | 3/2015 | Vidmar |
| 8,979,709 B2 | 3/2015 | Toback et al. |
| 8,986,165 B2 | 3/2015 | Ashby |
| 8,986,807 B2 | 3/2015 | Rodgers |
| 8,986,808 B2 | 3/2015 | George |
| 8,990,732 B2 | 3/2015 | Farrenkopf et al. |
| 8,996,978 B2 | 3/2015 | Richstein et al. |
| 9,005,085 B2 | 4/2015 | Astilean |
| 9,008,973 B2 | 4/2015 | French |
| 9,011,291 B2 | 4/2015 | Birrell |
| 9,015,952 B2 | 4/2015 | Magosaki |
| 9,028,368 B2 | 5/2015 | Ashby et al. |
| 9,033,137 B2 | 5/2015 | Koppes et al. |
| 9,033,712 B2 | 5/2015 | Vasin |
| 9,038,218 B1 | 5/2015 | Heil et al. |
| 9,039,578 B2 | 5/2015 | Dalebout |
| 9,044,637 B2 | 6/2015 | Karl |
| 9,050,486 B2 | 6/2015 | Reed |
| 9,050,491 B2 | 6/2015 | Gordon et al. |
| 9,050,498 B2 | 6/2015 | Lu et al. |
| 9,063,026 B2 | 6/2015 | Nassef |
| 9,072,930 B2 | 7/2015 | Ashby et al. |
| 9,072,932 B2 | 7/2015 | Piaget et al. |
| 9,072,941 B2 | 7/2015 | Duda et al. |
| 9,081,534 B2 | 7/2015 | Yuen et al. |
| 9,081,889 B2 | 7/2015 | Ingrassia, Jr. et al. |
| 9,083,245 B2 | 7/2015 | Zhao et al. |
| 9,084,565 B2 | 7/2015 | Mason |
| 9,084,712 B2 | 7/2015 | Roerdink et al. |
| 9,089,732 B2 | 7/2015 | Andon et al. |
| 9,091,008 B2 | 7/2015 | Mathieu |
| 9,095,740 B2 | 8/2015 | Wu |
| 9,108,079 B2 | 8/2015 | Solow et al. |
| 9,114,275 B2 | 8/2015 | Lu et al. |
| 9,114,276 B2 | 8/2015 | Bayerlein et al. |
| 9,119,983 B2 | 9/2015 | Rhea |
| 9,132,051 B2 | 9/2015 | Heil |
| 9,138,614 B2 | 9/2015 | Lu et al. |
| 9,138,615 B2 | 9/2015 | Olson et al. |
| 9,144,703 B2 | 9/2015 | Dalebout et al. |
| 9,148,077 B2 | 9/2015 | Henderson |
| 9,149,683 B2 | 10/2015 | Smith |
| 9,162,102 B1 | 10/2015 | Eder et al. |
| 9,162,106 B1 | 10/2015 | Scheiman |
| 9,168,414 B2 | 10/2015 | Liu et al. |
| 9,174,085 B2 | 11/2015 | Foley |
| 9,186,537 B2 | 11/2015 | Arnold et al. |
| 9,186,549 B2 | 11/2015 | Watterson et al. |
| 9,186,552 B1 | 11/2015 | Deal |
| 9,192,800 B1 | 11/2015 | Meyer et al. |
| 9,198,622 B2 | 12/2015 | Jain et al. |
| 9,199,115 B2 | 12/2015 | Yim et al. |
| 9,199,123 B2 | 12/2015 | Solow |
| 9,201,458 B2 | 12/2015 | Hunt et al. |
| 9,202,355 B2 | 12/2015 | Hill |
| 9,215,956 B2 | 12/2015 | Ryu |
| 9,220,940 B2 | 12/2015 | Al Kuwari |
| 9,221,545 B2 | 12/2015 | Popescu et al. |
| 9,223,936 B2 | 12/2015 | Aragones et al. |
| 9,224,291 B2 | 12/2015 | Moll-Carrillo et al. |
| 9,226,692 B2 | 1/2016 | Haas |
| 9,242,139 B2 | 1/2016 | Holley |
| 9,242,142 B2 | 1/2016 | Vincent et al. |
| 9,256,711 B2 | 2/2016 | Horseman |
| 9,257,054 B2 | 2/2016 | Coza et al. |
| 9,263,967 B2 | 2/2016 | McCune |
| 9,278,248 B2 | 3/2016 | Tyger |
| 9,283,431 B2 | 3/2016 | Marty et al. |
| 9,289,063 B2 | 3/2016 | Baugh et al. |
| 9,289,648 B2 | 3/2016 | Watterson |
| 9,289,674 B2 | 3/2016 | Winsper et al. |
| 9,308,415 B2 | 4/2016 | Crawford et al. |
| 9,311,802 B1 | 4/2016 | Chin et al. |
| 9,314,666 B2 | 4/2016 | Canavan et al. |
| 9,317,660 B2 | 4/2016 | Burich et al. |
| 9,320,457 B2 | 4/2016 | Flaction et al. |
| 9,330,239 B2 | 5/2016 | Koduri et al. |
| 9,330,544 B2 | 5/2016 | Levesque et al. |
| 9,333,388 B2 | 5/2016 | Lee et al. |
| 9,339,681 B1 | 5/2016 | Nalley |
| 9,339,683 B2 | 5/2016 | Dilli et al. |
| 9,352,185 B2 | 5/2016 | Hendrickson et al. |
| 9,352,186 B2 | 5/2016 | Watterson |
| 9,352,187 B2 | 5/2016 | Piaget et al. |
| 9,357,551 B2 | 5/2016 | Gutman |
| 9,358,422 B2 | 6/2016 | Brontman |
| 9,364,706 B2 | 6/2016 | Lo |
| 9,364,708 B2 | 6/2016 | Luger et al. |
| 9,364,714 B2 | 6/2016 | Koduri et al. |
| 9,367,668 B2 | 6/2016 | Flynt et al. |
| 9,369,178 B2 | 6/2016 | Matsutani |
| 9,370,687 B2 | 6/2016 | Hao |
| 9,370,691 B2 | 6/2016 | Nissila et al. |
| 9,375,605 B2 | 6/2016 | Tyger |
| 9,376,155 B2 | 6/2016 | Ying et al. |
| 9,378,336 B2 | 6/2016 | Ohnemus et al. |
| 9,387,387 B2 | 7/2016 | Dalebout |
| 9,389,718 B1 | 7/2016 | Letourneur |
| 9,392,941 B2 | 7/2016 | Powch et al. |
| 9,403,051 B2 | 8/2016 | Cutler |
| 9,409,050 B2 | 8/2016 | Mintz |
| 9,411,940 B2 | 8/2016 | Burroughs et al. |
| 9,415,257 B2 | 8/2016 | Habing |
| 9,427,615 B2 | 8/2016 | Pretz et al. |
| 9,436,231 B2 | 9/2016 | Bevilacqua et al. |
| 9,452,315 B1 | 9/2016 | Murray et al. |
| 9,452,320 B2 | 9/2016 | Yang |
| 9,455,623 B2 | 9/2016 | Fan et al. |
| 9,455,784 B2 | 9/2016 | Cune et al. |
| 9,457,224 B2 | 10/2016 | Giannelli et al. |
| 9,457,256 B2 | 10/2016 | Aragones et al. |
| 9,463,349 B1 | 10/2016 | Chang |
| 9,480,874 B2 | 11/2016 | Cutler |
| 9,486,658 B2 | 11/2016 | Alexander |
| 9,498,671 B1 | 11/2016 | Softky |
| 9,505,241 B2 | 11/2016 | Lyon |
| 9,511,254 B2 | 12/2016 | Netter |
| 9,511,259 B2 | 12/2016 | Mountain |
| 9,511,864 B2 | 12/2016 | Simpson |
| 9,517,378 B2 | 12/2016 | Ashby et al. |
| 9,521,901 B2 | 12/2016 | Dalebout |
| 9,539,458 B1 | 1/2017 | Ross |
| 9,540,071 B2 | 1/2017 | Jordan et al. |
| 9,540,174 B2 | 1/2017 | Josserond et al. |
| 9,545,541 B2 | 1/2017 | Aragones et al. |
| 9,560,917 B2 | 2/2017 | Roslund, Jr. |
| 9,569,986 B2 | 2/2017 | Levine et al. |
| 9,573,017 B2 | 2/2017 | Chang |
| 9,579,534 B2 | 2/2017 | Sutkowski et al. |
| 9,579,544 B2 | 2/2017 | Watterson |
| 9,582,976 B2 | 2/2017 | Chin et al. |
| 9,586,085 B2 | 3/2017 | Arnold et al. |
| 9,604,099 B2 | 3/2017 | Taylor |
| 9,604,757 B2 | 3/2017 | Spivack et al. |

(56) References Cited

U.S. PATENT DOCUMENTS

| | | |
|---|---|---|
| 9,610,475 B1 | 4/2017 | DeKnock et al. |
| 9,610,506 B2 | 4/2017 | Dugan |
| 9,616,278 B2 | 4/2017 | Olson |
| 9,623,281 B2 | 4/2017 | Hendrickson |
| 9,623,286 B1 | 4/2017 | Chen |
| 9,642,415 B2 | 5/2017 | Pease et al. |
| 9,665,873 B2 | 5/2017 | Ackland |
| 9,673,904 B2 | 6/2017 | Palanisamy et al. |
| 9,675,839 B2 | 6/2017 | Dalebout |
| 9,681,313 B2 | 6/2017 | Malach |
| 9,682,306 B2 | 6/2017 | Lin et al. |
| 9,682,307 B2 | 6/2017 | Dalebout |
| 9,694,234 B2 | 7/2017 | Dalebout et al. |
| 9,694,242 B2 | 7/2017 | Ashby |
| 9,700,780 B2 | 7/2017 | Riley et al. |
| 9,707,441 B2 | 7/2017 | Yang |
| 9,707,447 B1 | 7/2017 | Lopez Babodilla |
| 9,731,158 B1 | 8/2017 | Lo |
| 9,737,747 B1 | 8/2017 | Walsh et al. |
| 9,737,755 B2 | 8/2017 | Dalebout |
| 9,757,605 B2 | 9/2017 | Olson et al. |
| 9,764,184 B2 | 9/2017 | Kueker et al. |
| 9,767,785 B2 | 9/2017 | Ashby |
| 9,776,039 B1 | 10/2017 | Xu |
| 9,782,625 B1 | 10/2017 | Blum et al. |
| 9,795,827 B2 | 10/2017 | Wiener et al. |
| 9,808,672 B2 | 11/2017 | Dalebout |
| 9,808,673 B2 | 11/2017 | Robinson |
| 9,814,927 B2 | 11/2017 | Forystek |
| 9,814,929 B2 | 11/2017 | Moser |
| 9,814,930 B2 | 11/2017 | Manzke et al. |
| 9,827,458 B2 | 11/2017 | Dalton |
| 9,829,068 B2 | 11/2017 | Marchetti |
| 9,833,658 B2 | 12/2017 | Wiener et al. |
| 9,846,438 B2 | 12/2017 | Rihn et al. |
| 9,849,330 B2 | 12/2017 | Lagree |
| 9,884,222 B2 | 2/2018 | Chen |
| 9,889,334 B2 | 2/2018 | Ashby et al. |
| 9,895,567 B2 | 2/2018 | Lee |
| 9,901,767 B2 | 2/2018 | Kuo |
| 9,901,780 B2 | 2/2018 | DeLuca et al. |
| 9,901,805 B2 | 2/2018 | Hughes, Jr. |
| 9,914,011 B2 | 3/2018 | Downey et al. |
| 9,914,014 B2 | 3/2018 | Lagree et al. |
| 9,937,375 B2 | 4/2018 | Zhu |
| 9,943,719 B2 | 4/2018 | Smith et al. |
| 9,948,349 B2 | 4/2018 | Malach |
| 9,950,209 B2 | 4/2018 | Yim et al. |
| 9,956,450 B2 | 5/2018 | Bayerlein et al. |
| 9,968,821 B2 | 5/2018 | Finlayson et al. |
| 9,968,823 B2 | 5/2018 | Cutler |
| 9,975,003 B2 | 5/2018 | Molins et al. |
| 9,979,182 B2 | 5/2018 | Lin et al. |
| 9,987,513 B2 | 6/2018 | Yim et al. |
| 9,987,517 B1 | 6/2018 | Kuo |
| 9,990,126 B2 | 6/2018 | Chanyontpatanakul |
| 9,993,680 B2 | 6/2018 | Gordon |
| 9,993,711 B2 | 6/2018 | Moya Saez |
| 10,004,940 B2 | 6/2018 | Badarneh |
| 10,004,945 B2 | 6/2018 | Sauter |
| 10,010,169 B2 | 7/2018 | Grotenhuis |
| 10,010,738 B2 | 7/2018 | Gerschefske et al. |
| 10,010,755 B2 | 7/2018 | Watterson |
| 10,010,756 B2 | 7/2018 | Watterson |
| 10,022,590 B2 | 7/2018 | Foley et al. |
| 10,036,443 B2 | 7/2018 | Galasso |
| 10,039,952 B2 | 8/2018 | Chang |
| 10,039,970 B2 | 8/2018 | Lee et al. |
| 10,046,202 B2 | 8/2018 | Butler, Jr. et al. |
| 10,046,222 B2 | 8/2018 | Hawkins, III et al. |
| 10,065,062 B2 | 9/2018 | Stewart |
| 10,065,070 B2 | 9/2018 | Huang |
| 10,070,816 B2 | 9/2018 | Cowley et al. |
| 10,086,254 B2 | 10/2018 | Watterson |
| 10,183,191 B2 | 1/2019 | Astilean et al. |
| 10,207,143 B2 | 2/2019 | Dalebout |
| 10,207,144 B2 | 2/2019 | Huang |
| 10,207,145 B2 | 2/2019 | Tyger |
| 10,207,148 B2 | 2/2019 | Powell |
| 10,219,750 B2 | 3/2019 | Duan et al. |
| 10,220,246 B2 | 3/2019 | Lernihan |
| 10,220,289 B2 | 3/2019 | Habiche |
| 10,238,911 B2 | 3/2019 | Bayerlein et al. |
| 10,252,109 B2 | 4/2019 | Watterson |
| 10,252,141 B2 | 4/2019 | Chiang et al. |
| 10,254,824 B2 | 4/2019 | Ramsay |
| 10,265,565 B2 | 4/2019 | Jue et al. |
| 10,265,575 B2 | 4/2019 | Chou |
| 10,272,317 B2 | 4/2019 | Watterson |
| 2001/0001303 A1 | 5/2001 | Ohsuga et al. |
| 2001/0008053 A1 | 7/2001 | Belli |
| 2001/0049470 A1 | 12/2001 | Mault et al. |
| 2001/0051564 A1 | 12/2001 | Iund |
| 2002/0016235 A1 | 2/2002 | Ashby et al. |
| 2002/0019298 A1 | 2/2002 | Eschenbach |
| 2002/0024521 A1 | 2/2002 | Goden |
| 2002/0025888 A1 | 2/2002 | Germanton |
| 2002/0026130 A1 | 2/2002 | West |
| 2002/0039952 A1 | 4/2002 | Clem |
| 2002/0043909 A1 | 4/2002 | Nielsen |
| 2002/0045519 A1 | 4/2002 | Watterson |
| 2002/0055418 A1 | 5/2002 | Pyles et al. |
| 2002/0055419 A1 | 5/2002 | Hinnebusch |
| 2002/0055420 A1 | 5/2002 | Stearns et al. |
| 2002/0055422 A1 | 5/2002 | Airmet |
| 2002/0077221 A1 | 6/2002 | Dalebout et al. |
| 2002/0094914 A1 | 7/2002 | Maresh et al. |
| 2002/0107058 A1 | 8/2002 | Namba et al. |
| 2002/0115536 A1 | 8/2002 | Hojo |
| 2002/0128127 A1 | 9/2002 | Chen |
| 2002/0147078 A1 | 10/2002 | Wu |
| 2002/0151413 A1 | 10/2002 | Dalebout |
| 2002/0160883 A1 | 10/2002 | Dugan |
| 2002/0171070 A1 | 11/2002 | Shim |
| 2002/0198084 A1 | 12/2002 | Stearns et al. |
| 2003/0032524 A1 | 2/2003 | Lamar et al. |
| 2003/0032535 A1 | 2/2003 | Wang |
| 2003/0045406 A1 | 3/2003 | Stone |
| 2003/0060344 A1 | 3/2003 | David |
| 2003/0069108 A1 | 4/2003 | Rubinstein |
| 2003/0073545 A1 | 4/2003 | Liu |
| 2003/0092532 A1 | 5/2003 | Giannelli et al. |
| 2003/0092540 A1 | 5/2003 | Gillen |
| 2003/0096675 A1 | 5/2003 | Wang |
| 2003/0097878 A1 | 5/2003 | Farringdon et al. |
| 2003/0104908 A1 | 6/2003 | Tung |
| 2003/0119635 A1 | 6/2003 | Arbuckle |
| 2003/0128151 A1 | 7/2003 | Laker |
| 2003/0134718 A1 | 7/2003 | Kim |
| 2003/0139259 A1* | 7/2003 | Kuo .................. A63B 22/02 482/54 |
| 2003/0148853 A1 | 8/2003 | Alessandri |
| 2003/0171189 A1 | 9/2003 | Kaufman |
| 2003/0171190 A1 | 9/2003 | Rice |
| 2003/0176815 A1 | 9/2003 | Baba et al. |
| 2003/0181289 A1 | 9/2003 | Oscar Moavro |
| 2003/0183027 A1 | 10/2003 | Koch |
| 2003/0195061 A1 | 10/2003 | Brown |
| 2003/0211916 A1 | 11/2003 | Capuano |
| 2003/0222419 A1 | 12/2003 | Geary |
| 2003/0236153 A1 | 12/2003 | Pan et al. |
| 2004/0005958 A1 | 1/2004 | Kamen et al. |
| 2004/0005961 A1 | 1/2004 | Iund |
| 2004/0014567 A1 | 1/2004 | Mendel |
| 2004/0014571 A1 | 1/2004 | Haynes |
| 2004/0018917 A1 | 1/2004 | Corbalis |
| 2004/0018918 A1 | 1/2004 | Reyes |
| 2004/0023759 A1 | 2/2004 | Duncan et al. |
| 2004/0023761 A1 | 2/2004 | Emery |
| 2004/0023762 A1 | 2/2004 | Lull |
| 2004/0023766 A1 | 2/2004 | Slone |
| 2004/0023778 A1 | 2/2004 | Kusumoto et al. |
| 2004/0025754 A1 | 2/2004 | Dye |
| 2004/0029645 A1 | 2/2004 | Chen |

(56) References Cited

U.S. PATENT DOCUMENTS

| | | |
|---|---|---|
| 2004/0033865 A1 | 2/2004 | Wu |
| 2004/0043873 A1 | 3/2004 | Wilkinson et al. |
| 2004/0051392 A1 | 3/2004 | Badarneh |
| 2004/0053748 A1 | 3/2004 | Lo et al. |
| 2004/0063549 A1 | 4/2004 | Kuo |
| 2004/0067821 A1 | 4/2004 | Kehrbaum |
| 2004/0067833 A1 | 4/2004 | Talish |
| 2004/0082444 A1 | 4/2004 | Golesh |
| 2004/0092367 A1 | 5/2004 | Corbalis |
| 2004/0097331 A1 | 5/2004 | Zillig |
| 2004/0100484 A1 | 5/2004 | Barrett |
| 2004/0102292 A1 | 5/2004 | Pyles et al. |
| 2004/0103432 A1 | 5/2004 | Barrett |
| 2004/0114768 A1 | 6/2004 | Luo |
| 2004/0132586 A1 | 7/2004 | Leighton et al. |
| 2004/0132587 A1 | 7/2004 | Leighton et al. |
| 2004/0136750 A1 | 7/2004 | Yoshioka et al. |
| 2004/0138030 A1 | 7/2004 | Wang |
| 2004/0142800 A1 | 7/2004 | Gerschefske |
| 2004/0144626 A1 | 7/2004 | Saeki |
| 2004/0152566 A1 | 8/2004 | Yeh |
| 2004/0155622 A1 | 8/2004 | Mayhew et al. |
| 2004/0160336 A1 | 8/2004 | Hoch |
| 2004/0162189 A1 | 8/2004 | Hickman |
| 2004/0162191 A1 | 8/2004 | Ercanbrack |
| 2004/0163574 A1 | 8/2004 | Schoenbach |
| 2004/0166999 A1 | 8/2004 | Dodge |
| 2004/0171460 A1 | 9/2004 | Park |
| 2004/0171464 A1 | 9/2004 | Ashby et al. |
| 2004/0171465 A1 | 9/2004 | Hald |
| 2004/0176215 A1 | 9/2004 | Gramaccioni |
| 2004/0176217 A1 | 9/2004 | Watterson |
| 2004/0177531 A1 | 9/2004 | Dibenedetto et al. |
| 2004/0180719 A1 | 9/2004 | Feldman |
| 2004/0181972 A1 | 9/2004 | Csorba |
| 2004/0198555 A1 | 10/2004 | Anderson |
| 2004/0198559 A1 | 10/2004 | Grossi |
| 2004/0198571 A1 | 10/2004 | Howell et al. |
| 2004/0224740 A1 | 11/2004 | Ball et al. |
| 2004/0224825 A1 | 11/2004 | Giannelli et al. |
| 2004/0224827 A1 | 11/2004 | Ashley |
| 2004/0242378 A1 | 12/2004 | Pan |
| 2004/0242379 A1 | 12/2004 | Juva |
| 2004/0242380 A1 | 12/2004 | Kuivala |
| 2004/0248699 A1 | 12/2004 | Colley |
| 2004/0254020 A1 | 12/2004 | Dragusin |
| 2004/0256524 A1 | 12/2004 | Beck et al. |
| 2004/0259689 A1 | 12/2004 | Wilkins et al. |
| 2004/0266587 A1 | 12/2004 | Miller |
| 2005/0003931 A1 | 1/2005 | Mills et al. |
| 2005/0008992 A1 | 1/2005 | Westergaard et al. |
| 2005/0009668 A1 | 1/2005 | Savettiere |
| 2005/0032611 A1 | 2/2005 | Webber |
| 2005/0037898 A1 | 2/2005 | Chang |
| 2005/0037904 A1 | 2/2005 | Chang |
| 2005/0043145 A1 | 2/2005 | Anderson et al. |
| 2005/0043146 A1 | 2/2005 | Lo et al. |
| 2005/0043155 A1 | 2/2005 | Yannitte |
| 2005/0049117 A1 | 3/2005 | Rodgers |
| 2005/0049121 A1 | 3/2005 | Dalebout |
| 2005/0054492 A1 | 3/2005 | Neff |
| 2005/0064994 A1 | 3/2005 | Matsumoto |
| 2005/0075213 A1 | 4/2005 | Arick |
| 2005/0090770 A1 | 4/2005 | Chen |
| 2005/0096187 A1 | 5/2005 | Hsu |
| 2005/0096189 A1 | 5/2005 | Chen |
| 2005/0107220 A1 | 5/2005 | Wang |
| 2005/0107226 A1 | 5/2005 | Monda |
| 2005/0113158 A1 | 5/2005 | Sterchi et al. |
| 2005/0129903 A1 | 6/2005 | Carr |
| 2005/0131319 A1 | 6/2005 | Der Meer |
| 2005/0132838 A1 | 6/2005 | Lin |
| 2005/0143226 A1 | 6/2005 | Heidecke |
| 2005/0143228 A1 | 6/2005 | Lee |
| 2005/0148398 A1 | 7/2005 | Lochtefeld et al. |
| 2005/0148439 A1 | 7/2005 | Wu |
| 2005/0148440 A1 | 7/2005 | Denton |
| 2005/0148442 A1 | 7/2005 | Watterson |
| 2005/0159273 A1 | 7/2005 | Chen |
| 2005/0164839 A1 | 7/2005 | Watterson |
| 2005/0170935 A1 | 8/2005 | Manser |
| 2005/0170936 A1 | 8/2005 | Quinn |
| 2005/0172311 A1 | 8/2005 | Hjelt et al. |
| 2005/0178210 A1 | 8/2005 | Lanham |
| 2005/0181347 A1 | 8/2005 | Barnes et al. |
| 2005/0181911 A1 | 8/2005 | Porth |
| 2005/0192162 A1 | 9/2005 | Pan |
| 2005/0196737 A1 | 9/2005 | Mann |
| 2005/0202934 A1 | 9/2005 | Olrik et al. |
| 2005/0209050 A1 | 9/2005 | Bartels |
| 2005/0209051 A1 | 9/2005 | Santomassimo et al. |
| 2005/0209062 A1 | 9/2005 | Anderson |
| 2005/0215397 A1 | 9/2005 | Watterson |
| 2005/0233861 A1 | 10/2005 | Hickman |
| 2005/0233871 A1 | 10/2005 | Anders |
| 2005/0239600 A1 | 10/2005 | Liang |
| 2005/0239607 A1 | 10/2005 | Chang |
| 2005/0245370 A1 | 11/2005 | Boland |
| 2005/0250622 A1 | 11/2005 | Chang |
| 2005/0266961 A1 | 12/2005 | Shum et al. |
| 2005/0272562 A1 | 12/2005 | Alessandri et al. |
| 2005/0272577 A1 | 12/2005 | Olson |
| 2005/0277520 A1 | 12/2005 | Van Waes |
| 2005/0281963 A1 | 12/2005 | Cook |
| 2005/0283911 A1 | 12/2005 | Roussy |
| 2005/0288155 A1 | 12/2005 | Yang |
| 2006/0003869 A1 | 1/2006 | Huang et al. |
| 2006/0004265 A1 | 1/2006 | Pulkkinen et al. |
| 2006/0019804 A1 | 1/2006 | Young |
| 2006/0035757 A1 | 2/2006 | Flick et al. |
| 2006/0035758 A1 | 2/2006 | Rogozinski |
| 2006/0040797 A1 | 2/2006 | Chang |
| 2006/0047447 A1 | 3/2006 | Brady et al. |
| 2006/0053586 A1 | 3/2006 | Chase |
| 2006/0053587 A1 | 3/2006 | Chase |
| 2006/0058158 A1 | 3/2006 | McAvoy |
| 2006/0058162 A1 | 3/2006 | Vieno et al. |
| 2006/0063644 A1 | 3/2006 | Yang |
| 2006/0075544 A1 | 4/2006 | Kriesel |
| 2006/0079800 A1 | 4/2006 | Martikka et al. |
| 2006/0100069 A1 | 5/2006 | Dibble et al. |
| 2006/0100546 A1 | 5/2006 | Silk |
| 2006/0122035 A1 | 6/2006 | Felix |
| 2006/0122038 A1 | 6/2006 | Chou Lin |
| 2006/0122044 A1 | 6/2006 | Ho |
| 2006/0123814 A1 | 6/2006 | Choi et al. |
| 2006/0128534 A1 | 6/2006 | Roque |
| 2006/0135274 A1 | 6/2006 | Henry |
| 2006/0135322 A1 | 6/2006 | Rocker |
| 2006/0148622 A1 | 7/2006 | Chen |
| 2006/0151303 A1 | 7/2006 | Motoda |
| 2006/0160665 A1 | 7/2006 | Tai |
| 2006/0160666 A1 | 7/2006 | Wang |
| 2006/0166791 A1 | 7/2006 | Liao |
| 2006/0166799 A1 | 7/2006 | Boland et al. |
| 2006/0172862 A1 | 8/2006 | Badarneh et al. |
| 2006/0189439 A1 | 8/2006 | Baudhuin |
| 2006/0189440 A1 | 8/2006 | Gravagne |
| 2006/0189462 A1 | 8/2006 | Pearson et al. |
| 2006/0194679 A1 | 8/2006 | Hatcher |
| 2006/0199706 A1 | 9/2006 | Wehrell |
| 2006/0205568 A1 | 9/2006 | Huang |
| 2006/0217236 A1 | 9/2006 | Watterson |
| 2006/0217245 A1 | 9/2006 | Golesh et al. |
| 2006/0223680 A1 | 10/2006 | Chang |
| 2006/0229163 A1 | 10/2006 | Waters |
| 2006/0229170 A1 | 10/2006 | Ozawa et al. |
| 2006/0232147 A1 | 10/2006 | Cheng |
| 2006/0234832 A1 | 10/2006 | Toyama et al. |
| 2006/0240947 A1 | 10/2006 | Qu |
| 2006/0240951 A1 | 10/2006 | Wang |
| 2006/0240959 A1 | 10/2006 | Huang |
| 2006/0244187 A1 | 11/2006 | Downey |
| 2006/0247109 A1 | 11/2006 | Powell |

(56) References Cited

U.S. PATENT DOCUMENTS

| | | |
|---|---|---|
| 2006/0248965 A1 | 11/2006 | Wyatt |
| 2006/0252602 A1 | 11/2006 | Brown |
| 2006/0252608 A1 | 11/2006 | Kang et al. |
| 2006/0258513 A1 | 11/2006 | Routley |
| 2006/0258515 A1 | 11/2006 | Kang et al. |
| 2006/0264306 A1 | 11/2006 | Tischler |
| 2006/0270522 A1 | 11/2006 | Yonehana et al. |
| 2006/0276306 A1 | 12/2006 | Pan et al. |
| 2006/0279294 A1 | 12/2006 | Cehelnik |
| 2006/0287089 A1 | 12/2006 | Addington et al. |
| 2006/0287147 A1 | 12/2006 | Kriesel |
| 2006/0287163 A1 | 12/2006 | Wang |
| 2006/0288846 A1 | 12/2006 | Logan |
| 2007/0004561 A1 | 1/2007 | Yoo |
| 2007/0004562 A1 | 1/2007 | Pan et al. |
| 2007/0004569 A1 | 1/2007 | Cao |
| 2007/0006489 A1 | 1/2007 | Case et al. |
| 2007/0010383 A1 | 1/2007 | Pertegaz-Esteban |
| 2007/0015635 A1 | 1/2007 | Donner |
| 2007/0015636 A1 | 1/2007 | Molter |
| 2007/0027002 A1 | 2/2007 | Clark et al. |
| 2007/0037667 A1 | 2/2007 | Gordon |
| 2007/0038137 A1 | 2/2007 | Arand et al. |
| 2007/0042868 A1 | 2/2007 | Fisher |
| 2007/0049462 A1 | 3/2007 | Asukai et al. |
| 2007/0049464 A1 | 3/2007 | Chou |
| 2007/0049465 A1 | 3/2007 | Wu |
| 2007/0049466 A1 | 3/2007 | Hubbard |
| 2007/0049470 A1 | 3/2007 | Pyles et al. |
| 2007/0054790 A1 | 3/2007 | Dodge et al. |
| 2007/0060449 A1 | 3/2007 | Lo |
| 2007/0060450 A1 | 3/2007 | Lo |
| 2007/0060451 A1 | 3/2007 | Lucas |
| 2007/0066448 A1 | 3/2007 | Pan et al. |
| 2007/0072748 A1 | 3/2007 | Lee |
| 2007/0072752 A1 | 3/2007 | Koch |
| 2007/0079691 A1 | 4/2007 | Turner |
| 2007/0087908 A1 | 4/2007 | Pan et al. |
| 2007/0111858 A1 | 5/2007 | Dugan |
| 2007/0111866 A1 | 5/2007 | McVay et al. |
| 2007/0117683 A1 | 5/2007 | Ercanbrack et al. |
| 2007/0123389 A1 | 5/2007 | Martin |
| 2007/0123390 A1 | 5/2007 | Mathis |
| 2007/0123395 A1 | 5/2007 | Ellis |
| 2007/0123396 A1 | 5/2007 | Ellis |
| 2007/0131409 A1 | 6/2007 | Asahi |
| 2007/0135264 A1 | 6/2007 | Rosenberg |
| 2007/0137331 A1 | 6/2007 | Kachouh |
| 2007/0142177 A1 | 6/2007 | Simms et al. |
| 2007/0142179 A1 | 6/2007 | Terao et al. |
| 2007/0142183 A1 | 6/2007 | Chang |
| 2007/0149363 A1 | 6/2007 | Wang |
| 2007/0151489 A1 | 7/2007 | Byrne |
| 2007/0155277 A1 | 7/2007 | Amitai et al. |
| 2007/0155495 A1 | 7/2007 | Goo |
| 2007/0161468 A1 | 7/2007 | Yanagisawa et al. |
| 2007/0167292 A1 | 7/2007 | Kuo |
| 2007/0179023 A1 | 8/2007 | Dyer |
| 2007/0184953 A1 | 8/2007 | Luberski et al. |
| 2007/0190508 A1 | 8/2007 | Dalton |
| 2007/0191141 A1 | 8/2007 | Weber |
| 2007/0191190 A1 | 8/2007 | Kuo |
| 2007/0197274 A1 | 8/2007 | Dugan |
| 2007/0197345 A1 | 8/2007 | Wallace et al. |
| 2007/0197353 A1 | 8/2007 | Hundley |
| 2007/0197920 A1 | 8/2007 | Adams |
| 2007/0201727 A1 | 8/2007 | Birrell et al. |
| 2007/0204430 A1 | 9/2007 | Chase |
| 2007/0214630 A1 | 9/2007 | Kim |
| 2007/0219066 A1 | 9/2007 | Wang |
| 2007/0225119 A1 | 9/2007 | Schenk |
| 2007/0225120 A1 | 9/2007 | Schenk |
| 2007/0225126 A1 | 9/2007 | Yoo |
| 2007/0225127 A1 | 9/2007 | Pan et al. |
| 2007/0225622 A1 | 9/2007 | Huang et al. |
| 2007/0232455 A1 | 10/2007 | Hanoun |
| 2007/0232463 A1 | 10/2007 | Wu |
| 2007/0245612 A1 | 10/2007 | Tresenfeld |
| 2007/0247320 A1 | 10/2007 | Morahan |
| 2007/0249467 A1 | 10/2007 | Hong et al. |
| 2007/0270294 A1 | 11/2007 | Sheets |
| 2007/0270667 A1 | 11/2007 | Coppi et al. |
| 2007/0270726 A1 | 11/2007 | Chou |
| 2007/0281828 A1 | 12/2007 | Rice |
| 2007/0281831 A1 | 12/2007 | Wang |
| 2007/0284495 A1 | 12/2007 | Charles |
| 2007/0296313 A1 | 12/2007 | Wang |
| 2007/0298935 A1 | 12/2007 | Badarneh |
| 2007/0298937 A1 | 12/2007 | Shah |
| 2008/0001772 A1 | 1/2008 | Saito |
| 2008/0001866 A1 | 1/2008 | Martin |
| 2008/0004162 A1 | 1/2008 | Chen |
| 2008/0018211 A1 | 1/2008 | Dye |
| 2008/0020898 A1 | 1/2008 | Pyles et al. |
| 2008/0020902 A1 | 1/2008 | Arnold |
| 2008/0020907 A1 | 1/2008 | Lin |
| 2008/0026658 A1 | 1/2008 | Kriesel |
| 2008/0026838 A1 | 1/2008 | Dunstan et al. |
| 2008/0032864 A1 | 2/2008 | Hakki |
| 2008/0032870 A1 | 2/2008 | Wu |
| 2008/0032871 A1 | 2/2008 | Yeh |
| 2008/0039301 A1 | 2/2008 | Halbridge |
| 2008/0046246 A1 | 2/2008 | Hakki |
| 2008/0051256 A1 | 2/2008 | Ashby et al. |
| 2008/0057889 A1 | 3/2008 | Jan |
| 2008/0058169 A1 | 3/2008 | Fox |
| 2008/0058170 A1 | 3/2008 | Giannascoli et al. |
| 2008/0067302 A1 | 3/2008 | Olivera |
| 2008/0070756 A1 | 3/2008 | Chu |
| 2008/0076637 A1 | 3/2008 | Gilley et al. |
| 2008/0076972 A1 | 3/2008 | Dorogusker et al. |
| 2008/0077619 A1 | 3/2008 | Gilley et al. |
| 2008/0096745 A1 | 4/2008 | Perry |
| 2008/0103024 A1 | 5/2008 | Habing |
| 2008/0103034 A1 | 5/2008 | Mihara et al. |
| 2008/0108917 A1 | 5/2008 | Joutras et al. |
| 2008/0119333 A1 | 5/2008 | Bowser |
| 2008/0139370 A1 | 6/2008 | Charnitski |
| 2008/0153670 A1 | 6/2008 | Mckirdy |
| 2008/0153682 A1 | 6/2008 | Chen et al. |
| 2008/0155077 A1 | 6/2008 | James |
| 2008/0161170 A1 | 7/2008 | Lumpee |
| 2008/0161653 A1 | 7/2008 | Lin et al. |
| 2008/0171640 A1 | 7/2008 | Chang |
| 2008/0171922 A1 | 7/2008 | Teller |
| 2008/0176717 A1 | 7/2008 | Wang |
| 2008/0176718 A1 | 7/2008 | Wang |
| 2008/0182724 A1 | 7/2008 | Guthrie |
| 2008/0187689 A1 | 8/2008 | Dierkens et al. |
| 2008/0188362 A1 | 8/2008 | Chen |
| 2008/0190745 A1 | 8/2008 | Taniguchi et al. |
| 2008/0191864 A1 | 8/2008 | Wolfson |
| 2008/0200287 A1 | 8/2008 | Marty et al. |
| 2008/0200310 A1 | 8/2008 | Tagliabue |
| 2008/0207407 A1 | 8/2008 | Yeh |
| 2008/0214358 A1 | 9/2008 | Ogg et al. |
| 2008/0214971 A1 | 9/2008 | Talish |
| 2008/0216717 A1 | 9/2008 | Jones |
| 2008/0228110 A1 | 9/2008 | Berme |
| 2008/0229875 A1 | 9/2008 | Ray |
| 2008/0234110 A1 | 9/2008 | Webber et al. |
| 2008/0234111 A1 | 9/2008 | Packham |
| 2008/0242511 A1 | 10/2008 | Munoz et al. |
| 2008/0244870 A1 | 10/2008 | Chase |
| 2008/0245944 A1 | 10/2008 | Chase |
| 2008/0248926 A1 | 10/2008 | Cole et al. |
| 2008/0248935 A1 | 10/2008 | Solow |
| 2008/0250729 A1 | 10/2008 | Kriesel |
| 2008/0255794 A1 | 10/2008 | Levine |
| 2008/0279896 A1 | 11/2008 | Heinen et al. |
| 2008/0280732 A1 | 11/2008 | Jones |
| 2008/0280733 A1 | 11/2008 | Dickie et al. |
| 2008/0280734 A1 | 11/2008 | Dickie et al. |
| 2008/0280735 A1 | 11/2008 | Dickie et al. |

(56) References Cited

U.S. PATENT DOCUMENTS

| | | |
|---|---|---|
| 2008/0287262 A1 | 11/2008 | Chou |
| 2008/0300110 A1 | 12/2008 | Smith et al. |
| 2008/0300115 A1 | 12/2008 | Erlandson |
| 2008/0300914 A1 | 12/2008 | Karkanias et al. |
| 2008/0312047 A1 | 12/2008 | Feng |
| 2008/0318737 A1 | 12/2008 | Chu |
| 2009/0001831 A1 | 1/2009 | Cho et al. |
| 2009/0011907 A1 | 1/2009 | Radow |
| 2009/0023553 A1 | 1/2009 | Shim |
| 2009/0027925 A1 | 1/2009 | Kanouda et al. |
| 2009/0029831 A1 | 1/2009 | Weier |
| 2009/0036276 A1 | 2/2009 | Loach |
| 2009/0042696 A1 | 2/2009 | Wang |
| 2009/0042698 A1 | 2/2009 | Wang |
| 2009/0048073 A1 | 2/2009 | Roimicher |
| 2009/0048079 A1 | 2/2009 | Nalley |
| 2009/0048493 A1 | 2/2009 | James et al. |
| 2009/0053682 A1 | 2/2009 | Stern |
| 2009/0054214 A1 | 2/2009 | Kadar |
| 2009/0054751 A1 | 2/2009 | Babashan et al. |
| 2009/0069159 A1 | 3/2009 | Wang |
| 2009/0069722 A1 | 3/2009 | Flaction et al. |
| 2009/0075781 A1 | 3/2009 | Schwarzberg et al. |
| 2009/0075784 A1 | 3/2009 | Hoggan |
| 2009/0093347 A1 | 4/2009 | Wang |
| 2009/0100718 A1 | 4/2009 | Gerber |
| 2009/0105047 A1 | 4/2009 | Guidi et al. |
| 2009/0105052 A1 | 4/2009 | Dalebout et al. |
| 2009/0105548 A1 | 4/2009 | Bart |
| 2009/0111664 A1 | 4/2009 | Kau |
| 2009/0111665 A1 | 4/2009 | Wang |
| 2009/0111666 A1 | 4/2009 | Wang |
| 2009/0111670 A1 | 4/2009 | Williams |
| 2009/0118098 A1 | 5/2009 | Yeh |
| 2009/0119032 A1 | 5/2009 | Meyer |
| 2009/0120208 A1 | 5/2009 | Meyer |
| 2009/0120210 A1 | 5/2009 | Phillips et al. |
| 2009/0124463 A1 | 5/2009 | Lin |
| 2009/0124464 A1 | 5/2009 | Kastelic |
| 2009/0124465 A1 | 5/2009 | Wang |
| 2009/0124466 A1 | 5/2009 | Zhang |
| 2009/0128516 A1 | 5/2009 | Rimon et al. |
| 2009/0144639 A1 | 6/2009 | Nims et al. |
| 2009/0156363 A1 | 6/2009 | Guidi et al. |
| 2009/0156364 A1 | 6/2009 | Simeoni |
| 2009/0158871 A1 | 6/2009 | Chuo |
| 2009/0163326 A1 | 6/2009 | Wang |
| 2009/0163327 A1 | 6/2009 | Huang et al. |
| 2009/0170667 A1 | 7/2009 | Irving et al. |
| 2009/0170672 A1 | 7/2009 | Mcmullen |
| 2009/0176625 A1 | 7/2009 | Giannelli et al. |
| 2009/0176628 A1 | 7/2009 | Radding et al. |
| 2009/0180646 A1 | 7/2009 | Vulfson et al. |
| 2009/0181829 A1 | 7/2009 | Wu |
| 2009/0181830 A1 | 7/2009 | Wu |
| 2009/0181831 A1 | 7/2009 | Kuo |
| 2009/0181833 A1 | 7/2009 | Cassidy |
| 2009/0197740 A1 | 8/2009 | Julskjaer |
| 2009/0209393 A1 | 8/2009 | Crater et al. |
| 2009/0221405 A1 | 9/2009 | Wang |
| 2009/0221407 A1 | 9/2009 | Hauk |
| 2009/0227424 A1 | 9/2009 | Hirata et al. |
| 2009/0227432 A1 | 9/2009 | Pacheco |
| 2009/0230084 A1 | 9/2009 | Yourist |
| 2009/0240858 A1 | 9/2009 | Takebayashi |
| 2009/0246746 A1 | 10/2009 | Roerdink et al. |
| 2009/0253554 A1 | 10/2009 | Mcintosh |
| 2009/0258710 A1 | 10/2009 | Quatrochi et al. |
| 2009/0258763 A1 | 10/2009 | Richter |
| 2009/0269728 A1 | 10/2009 | Verstegen et al. |
| 2009/0286653 A1 | 11/2009 | Wiber |
| 2009/0293319 A1 | 12/2009 | Avni |
| 2009/0312158 A1 | 12/2009 | Trevino et al. |
| 2010/0015585 A1 | 1/2010 | Baker |
| 2010/0016127 A1 | 1/2010 | Farnsworth et al. |
| 2010/0022354 A1 | 1/2010 | Fisher |
| 2010/0024590 A1 | 2/2010 | O'neill |
| 2010/0032533 A1 | 2/2010 | Chen et al. |
| 2010/0034665 A1 | 2/2010 | Zhong |
| 2010/0035726 A1 | 2/2010 | Fisher |
| 2010/0041516 A1 | 2/2010 | Kodama |
| 2010/0048358 A1 | 2/2010 | Tchao et al. |
| 2010/0062904 A1 | 3/2010 | Crawford et al. |
| 2010/0062914 A1 | 3/2010 | Splane |
| 2010/0063426 A1 | 3/2010 | Planke |
| 2010/0064255 A1 | 3/2010 | Rottler et al. |
| 2010/0079291 A1 | 4/2010 | Kroll et al. |
| 2010/0081548 A1 | 4/2010 | Labedz |
| 2010/0087298 A1 | 4/2010 | Zaccherini |
| 2010/0099541 A1 | 4/2010 | Patel |
| 2010/0105527 A1 | 4/2010 | Johnson |
| 2010/0113223 A1 | 5/2010 | Chiles et al. |
| 2010/0125026 A1 | 5/2010 | Zavadsky et al. |
| 2010/0130337 A1 | 5/2010 | Stewart |
| 2010/0137105 A1 | 6/2010 | Mclaughlin |
| 2010/0144501 A1 | 6/2010 | Berhanu |
| 2010/0156625 A1 | 6/2010 | Ruha |
| 2010/0167883 A1 | 7/2010 | Grind |
| 2010/0173276 A1 | 7/2010 | Vasin |
| 2010/0173755 A1 | 7/2010 | P Erez De Lazarraga |
| 2010/0175634 A1 | 7/2010 | Chang et al. |
| 2010/0184568 A1 | 7/2010 | Schippers |
| 2010/0190615 A1 | 7/2010 | Baker et al. |
| 2010/0192715 A1 | 8/2010 | Vauchel et al. |
| 2010/0197462 A1 | 8/2010 | Piane, Jr. |
| 2010/0197465 A1 | 8/2010 | Stevenson |
| 2010/0210418 A1 | 8/2010 | Park |
| 2010/0216599 A1 | 8/2010 | Watterson |
| 2010/0216600 A1 | 8/2010 | Noffsinger |
| 2010/0216607 A1 | 8/2010 | Mueller |
| 2010/0222179 A1 | 9/2010 | Temple et al. |
| 2010/0222182 A1 | 9/2010 | Park |
| 2010/0227740 A1 | 9/2010 | Liu |
| 2010/0235667 A1 | 9/2010 | Mucignat et al. |
| 2010/0240458 A1 | 9/2010 | Gaiba et al. |
| 2010/0248899 A1 | 9/2010 | Bedell et al. |
| 2010/0255959 A1 | 10/2010 | Dalebout et al. |
| 2010/0267524 A1 | 10/2010 | Stewart et al. |
| 2010/0279822 A1 | 11/2010 | Ford |
| 2010/0285933 A1 | 11/2010 | Nalley |
| 2010/0289466 A1 | 11/2010 | Telefus |
| 2010/0289772 A1 | 11/2010 | Miller |
| 2010/0292050 A1 | 11/2010 | DiBenedetto et al. |
| 2010/0304931 A1 | 12/2010 | Stumpf |
| 2010/0304932 A1 | 12/2010 | Kolman et al. |
| 2010/0311552 A1 | 12/2010 | Sumners |
| 2010/0320956 A1 | 12/2010 | Lumsden et al. |
| 2011/0003664 A1 | 1/2011 | Richard |
| 2011/0021319 A1 | 1/2011 | Nissila et al. |
| 2011/0028282 A1 | 2/2011 | Sbragia |
| 2011/0034300 A1 | 2/2011 | Hall |
| 2011/0054359 A1 | 3/2011 | Sazonov et al. |
| 2011/0056328 A1 | 3/2011 | Ko |
| 2011/0061840 A1 | 3/2011 | Goldmann |
| 2011/0065371 A1 | 3/2011 | Leff |
| 2011/0065373 A1 | 3/2011 | Goldmann |
| 2011/0067361 A1 | 3/2011 | Sloan |
| 2011/0073743 A1 | 3/2011 | Shamie |
| 2011/0077055 A1 | 3/2011 | Pakula et al. |
| 2011/0082013 A1 | 4/2011 | Bastian |
| 2011/0086707 A1 | 4/2011 | Loveland |
| 2011/0087137 A1 | 4/2011 | Hanoun |
| 2011/0087445 A1 | 4/2011 | Sobolewski |
| 2011/0087446 A1 | 4/2011 | Redmond |
| 2011/0093100 A1 | 4/2011 | Ramsay |
| 2011/0098157 A1 | 4/2011 | Whalen et al. |
| 2011/0098615 A1 | 4/2011 | Whalen et al. |
| 2011/0109283 A1 | 5/2011 | Kapels |
| 2011/0112771 A1 | 5/2011 | French |
| 2011/0118089 A1 | 5/2011 | Ellis |
| 2011/0124466 A1 | 5/2011 | Nishimura |
| 2011/0124476 A1 | 5/2011 | Holley |
| 2011/0131005 A1 | 6/2011 | Ueshima |
| 2011/0136627 A1 | 6/2011 | Williams |

(56) References Cited

U.S. PATENT DOCUMENTS

| | | |
|---|---|---|
| 2011/0143769 A1 | 6/2011 | Jones et al. |
| 2011/0143898 A1 | 6/2011 | Trees |
| 2011/0152037 A1 | 6/2011 | Tsou |
| 2011/0152038 A1 | 6/2011 | Freitag |
| 2011/0152039 A1 | 6/2011 | Hendrickson et al. |
| 2011/0152635 A1 | 6/2011 | Morris |
| 2011/0165995 A1 | 7/2011 | Paulus |
| 2011/0172060 A1 | 7/2011 | Morales |
| 2011/0175744 A1 | 7/2011 | Englert |
| 2011/0181420 A1 | 7/2011 | Mack et al. |
| 2011/0188269 A1 | 8/2011 | Hosotani |
| 2011/0197157 A1 | 8/2011 | Hoffman et al. |
| 2011/0199799 A1 | 8/2011 | Hui et al. |
| 2011/0201481 A1 | 8/2011 | Lo |
| 2011/0202236 A1 | 8/2011 | Galasso et al. |
| 2011/0205164 A1 | 8/2011 | Hansen et al. |
| 2011/0221672 A1 | 9/2011 | Osterhout et al. |
| 2011/0247530 A1 | 10/2011 | Coffman |
| 2011/0252597 A1 | 10/2011 | Burris et al. |
| 2011/0257797 A1 | 10/2011 | Burris et al. |
| 2011/0269517 A1 | 11/2011 | Englert et al. |
| 2011/0269604 A1 | 11/2011 | Tseng |
| 2011/0275482 A1 | 11/2011 | Brodess et al. |
| 2011/0275489 A1 | 11/2011 | Apau |
| 2011/0275499 A1 | 11/2011 | Eschenbach |
| 2011/0281691 A1 | 11/2011 | Ellis |
| 2011/0283188 A1 | 11/2011 | Farrenkopf et al. |
| 2011/0283231 A1 | 11/2011 | Richstein et al. |
| 2011/0308919 A1 | 12/2011 | Hahn |
| 2011/0312473 A1 | 12/2011 | Chu et al. |
| 2011/0319229 A1 | 12/2011 | Corbalis et al. |
| 2012/0004075 A1 | 1/2012 | Kissel et al. |
| 2012/0004080 A1 | 1/2012 | Webb |
| 2012/0010053 A1 | 1/2012 | Bayerlein et al. |
| 2012/0015778 A1 | 1/2012 | Lee et al. |
| 2012/0015779 A1 | 1/2012 | Powch et al. |
| 2012/0015784 A1 | 1/2012 | Reed |
| 2012/0020135 A1 | 1/2012 | McCune |
| 2012/0021873 A1 | 1/2012 | Brunner |
| 2012/0021875 A1 | 1/2012 | Karl |
| 2012/0032896 A1 | 2/2012 | Vesely |
| 2012/0071301 A1 | 3/2012 | Kaylor et al. |
| 2012/0088633 A1 | 4/2012 | Crafton |
| 2012/0088634 A1 | 4/2012 | Heidecke |
| 2012/0088640 A1 | 4/2012 | Wissink |
| 2012/0116684 A1 | 5/2012 | Ingrassia et al. |
| 2012/0132877 A1 | 5/2012 | Wang |
| 2012/0133192 A1 | 5/2012 | Simpson |
| 2012/0165162 A1 | 6/2012 | Lu |
| 2012/0169603 A1 | 7/2012 | Peterson et al. |
| 2012/0174833 A1 | 7/2012 | Early |
| 2012/0178590 A1 | 7/2012 | Lu |
| 2012/0190502 A1 | 7/2012 | Paulus et al. |
| 2012/0212505 A1 | 8/2012 | Burroughs et al. |
| 2012/0218184 A1 | 8/2012 | Wissmar |
| 2012/0230504 A1 | 9/2012 | Kuroda |
| 2012/0242774 A1 | 9/2012 | Numano et al. |
| 2012/0248263 A1 | 10/2012 | Grotenhuis |
| 2012/0252580 A1 | 10/2012 | Dugan |
| 2012/0253234 A1 | 10/2012 | Yang et al. |
| 2012/0253489 A1 | 10/2012 | Dugan |
| 2012/0258433 A1 | 10/2012 | Hope et al. |
| 2012/0263892 A1 | 10/2012 | Rodgers |
| 2012/0270705 A1 | 10/2012 | Lo |
| 2012/0271143 A1 | 10/2012 | Aragones et al. |
| 2012/0277040 A1 | 11/2012 | Vincent et al. |
| 2012/0277891 A1 | 11/2012 | Aragones et al. |
| 2012/0293141 A1 | 11/2012 | Zhang et al. |
| 2012/0296455 A1 | 11/2012 | Ohnemus et al. |
| 2012/0298017 A1 | 11/2012 | Chen |
| 2012/0300515 A1 | 11/2012 | Carletti et al. |
| 2012/0319604 A1 | 12/2012 | Walters |
| 2012/0326873 A1 | 12/2012 | Utter, II |
| 2013/0002533 A1 | 1/2013 | Burroughs et al. |
| 2013/0004010 A1 | 1/2013 | Royer |
| 2013/0009993 A1 | 1/2013 | Horseman |
| 2013/0018494 A1 | 1/2013 | Amini |
| 2013/0034671 A1 | 2/2013 | George |
| 2013/0035612 A1 | 2/2013 | Mason et al. |
| 2013/0040783 A1 | 2/2013 | Duda et al. |
| 2013/0041590 A1 | 2/2013 | Burich et al. |
| 2013/0041617 A1 | 2/2013 | Pease et al. |
| 2013/0044521 A1 | 2/2013 | Zhao et al. |
| 2013/0050973 A1 | 2/2013 | Rohrbach |
| 2013/0053222 A1 | 2/2013 | Lo |
| 2013/0053990 A1 | 2/2013 | Ackland |
| 2013/0095959 A1 | 4/2013 | Marty |
| 2013/0095978 A1 | 4/2013 | Sauter |
| 2013/0130868 A1 | 5/2013 | Hou |
| 2013/0130869 A1 | 5/2013 | Hou |
| 2013/0139736 A1 | 6/2013 | Flaherty |
| 2013/0141235 A1 | 6/2013 | Utter, II |
| 2013/0147411 A1 | 6/2013 | Pang |
| 2013/0150214 A1 | 6/2013 | Wu |
| 2013/0154441 A1 | 6/2013 | Redmond |
| 2013/0165297 A1 | 6/2013 | Daly |
| 2013/0172152 A1 | 7/2013 | Watterson |
| 2013/0172153 A1 | 7/2013 | Watterson |
| 2013/0178334 A1 | 7/2013 | Brammer |
| 2013/0182781 A1 | 7/2013 | Matsutani |
| 2013/0185003 A1 | 7/2013 | Carbeck et al. |
| 2013/0190136 A1 | 7/2013 | Watterson |
| 2013/0190143 A1 | 7/2013 | Greenhill et al. |
| 2013/0190657 A1 | 7/2013 | Flaction et al. |
| 2013/0196821 A1 | 8/2013 | Watterson et al. |
| 2013/0196826 A1 | 8/2013 | Colledge |
| 2013/0196827 A1 | 8/2013 | Chang |
| 2013/0211858 A1 | 8/2013 | Ohnemus et al. |
| 2013/0228063 A1 | 9/2013 | Turner |
| 2013/0228422 A1 | 9/2013 | Mathieu |
| 2013/0231219 A1 | 9/2013 | Huang |
| 2013/0237383 A1 | 9/2013 | Chen |
| 2013/0245966 A1 | 9/2013 | Burroughs et al. |
| 2013/0263418 A1 | 10/2013 | Johnson, Jr. |
| 2013/0267386 A1 | 10/2013 | Her |
| 2013/0274040 A1 | 10/2013 | Coza et al. |
| 2013/0274069 A1 | 10/2013 | Watterson et al. |
| 2013/0274071 A1 | 10/2013 | Wang |
| 2013/0280682 A1 | 10/2013 | Levine et al. |
| 2013/0281241 A1 | 10/2013 | Watterson |
| 2013/0324368 A1 | 12/2013 | Aragones et al. |
| 2013/0325394 A1 | 12/2013 | Yuen et al. |
| 2013/0338802 A1 | 12/2013 | Winsper et al. |
| 2013/0346043 A1 | 12/2013 | Mewes et al. |
| 2014/0011645 A1 | 1/2014 | Johnson |
| 2014/0026788 A1 | 1/2014 | Kallio, III et al. |
| 2014/0031703 A1 | 1/2014 | Rayner et al. |
| 2014/0039840 A1 | 2/2014 | Yuen et al. |
| 2014/0052280 A1 | 2/2014 | Yuen et al. |
| 2014/0056461 A1 | 2/2014 | Afshar |
| 2014/0073488 A1 | 3/2014 | Wu |
| 2014/0080678 A1 | 3/2014 | Wu |
| 2014/0085077 A1 | 3/2014 | Luna et al. |
| 2014/0100464 A1 | 4/2014 | Kaleal et al. |
| 2014/0102340 A1 | 4/2014 | Kooistra |
| 2014/0121066 A1 | 5/2014 | Huang et al. |
| 2014/0139450 A1 | 5/2014 | Levesque et al. |
| 2014/0156228 A1 | 6/2014 | Molettiere et al. |
| 2014/0171266 A1 | 6/2014 | Hawkins, III et al. |
| 2014/0187383 A1 | 7/2014 | Martin |
| 2014/0195103 A1 | 7/2014 | Nassef |
| 2014/0221160 A1 | 8/2014 | Hardy et al. |
| 2014/0222173 A1 | 8/2014 | Giedwoyn et al. |
| 2014/0265690 A1 | 9/2014 | Henderson |
| 2014/0270375 A1 | 9/2014 | Canavan et al. |
| 2014/0274564 A1 | 9/2014 | Greenbaum |
| 2014/0274574 A1 | 9/2014 | Shorten et al. |
| 2014/0274579 A1 | 9/2014 | Olson |
| 2014/0358472 A1 | 12/2014 | Goel et al. |
| 2014/0358473 A1 | 12/2014 | Goel et al. |
| 2014/0360413 A1 | 12/2014 | Schenk |
| 2015/0001048 A1 | 1/2015 | Koppes et al. |
| 2015/0003621 A1 | 1/2015 | Trammell |
| 2015/0004579 A1 | 1/2015 | Shelton |

(56) References Cited

U.S. PATENT DOCUMENTS

| | | |
|---|---|---|
| 2015/0016623 A1 | 1/2015 | Trammell |
| 2015/0044648 A1 | 2/2015 | White et al. |
| 2015/0048807 A1 | 2/2015 | Fan et al. |
| 2015/0065273 A1 | 3/2015 | Lake |
| 2015/0065301 A1 | 3/2015 | Oteman |
| 2015/0105220 A1 | 4/2015 | Hong |
| 2015/0192929 A1 | 7/2015 | Rihn et al. |
| 2015/0199494 A1 | 7/2015 | Koduri et al. |
| 2015/0201722 A1 | 7/2015 | Brouard |
| 2015/0202487 A1 | 7/2015 | Wu |
| 2015/0209610 A1 | 7/2015 | Dalebout et al. |
| 2015/0209617 A1 | 7/2015 | Hsiao |
| 2015/0250304 A1 | 9/2015 | Dalebout |
| 2015/0251047 A1 | 9/2015 | Maaniitty et al. |
| 2015/0251048 A1 | 9/2015 | Dalebout |
| 2015/0251055 A1 | 9/2015 | Ashby |
| 2015/0253210 A1 | 9/2015 | Ashby et al. |
| 2015/0265903 A1 | 9/2015 | Kolen |
| 2015/0295397 A1 | 10/2015 | Lin et al. |
| 2015/0314184 A1 | 11/2015 | Moya Saez |
| 2015/0346994 A1 | 12/2015 | Chanyontpatanakul |
| 2015/0352396 A1 | 12/2015 | Dalebout |
| 2015/0352401 A1 | 12/2015 | Johnson |
| 2015/0352402 A1 | 12/2015 | Arnold et al. |
| 2015/0367158 A1 | 12/2015 | Pretz et al. |
| 2015/0367176 A1 | 12/2015 | Bejestan |
| 2016/0008650 A1 | 1/2016 | Ju et al. |
| 2016/0016035 A1 | 1/2016 | Hao |
| 2016/0027325 A1 | 1/2016 | Malhotra |
| 2016/0038785 A1 | 2/2016 | Netter |
| 2016/0047446 A1 | 2/2016 | Hung |
| 2016/0058335 A1 | 3/2016 | Ashby |
| 2016/0066818 A1 | 3/2016 | Cowley et al. |
| 2016/0096064 A1 | 4/2016 | Gatti |
| 2016/0121161 A1 | 5/2016 | Mountain |
| 2016/0193518 A1 | 7/2016 | Baxter |
| 2016/0206922 A1 | 7/2016 | Dalebout et al. |
| 2016/0211841 A1 | 7/2016 | Harrison |
| 2016/0219968 A1 | 8/2016 | Martin |
| 2016/0263426 A1 | 9/2016 | Mueller et al. |
| 2016/0303421 A1 | 10/2016 | Tyger et al. |
| 2016/0317861 A1 | 11/2016 | Dalebout et al. |
| 2016/0367851 A1 | 12/2016 | Astilean et al. |
| 2017/0056715 A1 | 3/2017 | Dalebout et al. |
| 2017/0056726 A1 | 3/2017 | Dalebout et al. |
| 2017/0068782 A1 | 3/2017 | Pillai et al. |
| 2017/0113093 A1 | 4/2017 | Bellavista et al. |
| 2017/0120102 A1 | 5/2017 | Chen |
| 2017/0128784 A1 | 5/2017 | Molins et al. |
| 2017/0136280 A1 | 5/2017 | Lee |
| 2017/0136288 A1 | 5/2017 | Huang |
| 2017/0136289 A1 | 5/2017 | Frank |
| 2017/0136291 A1 | 5/2017 | Huang |
| 2017/0136339 A1 | 5/2017 | Habiche |
| 2017/0165523 A1 | 6/2017 | Chou |
| 2017/0189745 A1 | 7/2017 | Hamilton et al. |
| 2017/0197106 A1 | 7/2017 | Dalebout et al. |
| 2017/0216660 A1 | 8/2017 | Lernihan |
| 2017/0266483 A1 | 9/2017 | Dalebout et al. |
| 2017/0266532 A1 | 9/2017 | Watterson |
| 2017/0266533 A1 | 9/2017 | Dalebout |
| 2017/0266534 A1 | 9/2017 | Watterson et al. |
| 2017/0266535 A1 | 9/2017 | Watterson |
| 2017/0274242 A1 | 9/2017 | Corbalis |
| 2017/0326411 A1 | 11/2017 | Watterson |
| 2017/0340917 A1 | 11/2017 | Chang |
| 2017/0368442 A1 | 12/2017 | Baudhuin |
| 2018/0001135 A1 | 1/2018 | Powell |
| 2018/0036585 A1 | 2/2018 | Powell |
| 2018/0056111 A1 | 3/2018 | Chiang et al. |
| 2018/0092603 A1 | 4/2018 | Duan et al. |
| 2018/0099179 A1 | 4/2018 | Chatterton et al. |
| 2018/0099180 A1 | 4/2018 | Wilkinson |
| 2018/0099181 A1 | 4/2018 | Powell |
| 2018/0099205 A1 | 4/2018 | Watterson |
| 2018/0104533 A1 | 4/2018 | Powell et al. |
| 2018/0111018 A1 | 4/2018 | Lee |
| 2018/0117385 A1 | 5/2018 | Shirvani et al. |
| 2018/0117388 A1 | 5/2018 | Porter |
| 2018/0117419 A1 | 5/2018 | Jackson |
| 2018/0147440 A1 | 5/2018 | Lin |
| 2018/0154205 A1 | 6/2018 | Watterson |
| 2018/0154207 A1 | 6/2018 | Hochstrasser |
| 2018/0154208 A1 | 6/2018 | Powell et al. |
| 2018/0154209 A1 | 6/2018 | Watterson |
| 2018/0185699 A1 | 7/2018 | Kueker |
| 2019/0058370 A1 | 2/2019 | Tinney |

FOREIGN PATENT DOCUMENTS

| | | |
|---|---|---|
| EP | 2841172 | 1/2017 |
| IT | UB0159645 | 6/2017 |
| KR | 100624647 | 10/2006 |
| TW | 177052 | 1/1992 |
| TW | M253381 | 12/2004 |
| TW | M333198 | 6/2008 |
| TW | M517957 | 2/2016 |
| WO | 2003101543 | 12/2003 |
| WO | 2016100530 | 6/2016 |

OTHER PUBLICATIONS

U.S. Appl. No. 15/853,415, filed Dec. 22, 2017, Wade A. Powell
U.S. Appl. No. 16/222,035, filed Dec. 17, 2018, William T. Dalebout, et al.
U.S. Appl. No. 16/258,356, filed Jan. 25, 2019, Michael L. Olson, et al.
U.S. Appl. No. 16/378,022, filed Apr. 8, 2019, Scott R. Watterson.
Darken et al., The Omni-Directional Treadmill: A Locomotion Device for Virtual Worlds, Calhoun: The NPS Institutional Archive Dspace Repository, 1997.
English translation of the abstract of KR100624647. Oct. 16, 2006.
English translation of the abstract of CN102357284. May 22, 2013.
English translation of the abstract of CN106310589. Nov. 27, 2018.
English translation of the abstract of IT UB0159645. Jun. 17, 2017.

* cited by examiner

SYSTEMS AND METHODS FOR COOLING INTERNAL EXERCISE EQUIPMENT COMPONENTS

CROSS-REFERENCE TO RELATED APPLICATIONS

This application claims priority to U.S. Provisional Patent Application No. 62/357,815, filed on Jul. 1, 2016, which application is incorporated herein by reference in its entirety.

BACKGROUND

Aerobic exercise is a popular form of exercise that improves one's cardiovascular health by reducing blood pressure and providing other benefits to the human body. Aerobic exercise generally involves low intensity physical exertion over a long duration of time. Typically, the human body can adequately supply enough oxygen to meet the body's demands at the intensity levels involved during aerobic exercise. Popular forms of aerobic exercise include running, jogging, swimming, and cycling, among others activities. In contrast, anaerobic exercise typically involves high intensity exercises over a short duration of time. Popular forms of anaerobic exercise include strength training and short distance running.

Many people choose to perform aerobic exercises indoors, such as in a gym or their home. Often, a user will use an aerobic exercise machine to perform an aerobic workout indoors. One type of aerobic exercise machine is a treadmill, which is a machine that has a running deck attached to a support frame. The running deck can support the weight of a person using the machine. The running deck incorporates a conveyor belt that is driven by a motor. A user can run or walk in place on the conveyor belt by running or walking at the conveyor belt's speed. The speed and other operations of the treadmill, including incline, are generally controlled through a control module that is also attached to the support frame and within a convenient reach of the user. The control module can include a display, buttons for increasing or decreasing a speed of the conveyor belt, controls for adjusting a tilt angle of the running deck, or other controls. Other popular exercise machines that allow a user to perform aerobic exercises indoors include elliptical trainers, rowing machines, stepper machines, and stationary bikes to name a few.

One type of treadmill is disclosed in World Intellectual Property Organization Publication No. WO11989107473 issued to Steven T. Sherrard, et al. In this reference, an exercise treadmill includes transverse modular components that are fixably, yet slidably supported through T-slots in extruded side rails having inwardly opening T-slots. Landings integral with the side rails cover the edges of the tread belt. The bed is carried on bed rails supported on the side rails by bolts extending through the T-slots into bed slides. Transverse bed supports capped by resilient shock mounts support the center of the bed. Idler and drive rollers at opposite ends of the bed are slidably supported through the T-slots of the side rails on bearing slides. The rear idler roller is adjustably positioned by bolts engaging end caps at the rear ends of the side rails. A motor moves the tread belt over the bed and rollers. An inertial flywheel, fan, and encoder wheel are mounted on the motor axle. A linear lift mechanism within the stanchion raises and lowers the treadmill. This reference also indicates that the inertial flywheel is significantly heavier than those found in other exercise treadmills to reduce the peak loads placed on the treadmill's motor. A fan recessed within the outer surface of the flywheel draws air between the spokes of the flywheel and over the air inlet grill of the motor.

SUMMARY

In one embodiment, an exercise machine includes a deck, a lift motor connected to the deck, and a cooling mechanism that cools the lift motor when the cooling mechanism is activated.

The cooling mechanism may include a fan assembly.

The exercise machine may include a flywheel, where the fan assembly is attached to the flywheel and the fan assembly generates an airflow that directs air across the lift motor.

Generating the airflow may include pushing air towards the lift motor.

Generating the airflow may include drawing air towards the fan assembly across the lift motor.

The exercise machine may include a first pulley incorporated into the deck, a tread belt incorporated into the deck and in engagement with the first pulley, a drive motor in mechanical communication with the first pulley, and the flywheel being rotationally fixed with respect to the drive motor. When the drive motor rotates, it causes the tread belt to move in a rotational direction and causes the flywheel to spin.

The exercise machine may include a second pulley incorporated into the deck at an opposite end of the deck than the first pulley, wherein the tread belt surrounds the first pulley and the second pulley.

The drive motor, flywheel, and fan assembly may be coaxial, and the fan assembly may be located adjacent to the lift motor.

The exercise machine may include a second fan assembly connected to a second side of the flywheel where the second fan assembly generates a second airflow when the flywheel rotates, wherein the second airflow passes over the drive motor.

The exercise machine may include a dump resistor connected to the drive motor where the dump resistor is positioned within the airflow generated by the fan assembly.

The cooling mechanism may include a ring member, an annulus defined in the ring member, and at least one fan blade formed on the ring member.

When the ring member is rotating, a pressure drop may be generated within the annulus.

The exercise machine may include an annular lip formed on the circumference of the ring member and adjacent to the fan blade.

The exercise machine may include a housing and at least one vent located in a bottom side of the housing where the lift motor and the cooling mechanism are located within the housing.

In one embodiment, a fan assembly includes a ring member, a face of the ring member, an annulus defined in the ring member, and at least one fan blade formed on the face of the ring member.

When the ring member is rotating, a pressure drop may be generated within the annulus.

The fan assembly may include an annular lip formed on the circumference of the ring member and adjacent to the fan blade.

The fan assembly may include the ring member attached to a flywheel, where a pressure drop pulls intake air towards the annulus and where the flywheel and the annular lip collectively reverse the flow of the intake air away from the annulus at an angle greater than ten degrees with respect to a rotational axis of the ring member.

The fan assembly may be incorporated into a treadmill and direct an airflow across a lift motor.

In one embodiment, a treadmill includes a deck, a first pulley incorporated into the deck, a tread belt incorporated into the deck and in engagement with the first pulley, a drive motor in mechanical communication with the first pulley, a flywheel being rotationally fixed with respect to the drive motor where the drive motor causes the tread belt to move in a rotational direction and causes the flywheel to spin, a lift motor connected to the deck, and a fan assembly that cools the lift motor when activated. The fan assembly is attached to the flywheel and the fan assembly generates an airflow that directs air across the lift motor.

DETAILED DESCRIPTION

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. Often, the width of an object is transverse the object's length. Additionally, for purposes of this disclosure, the term "post" generally refers to an upright structural member.

Figure 1:
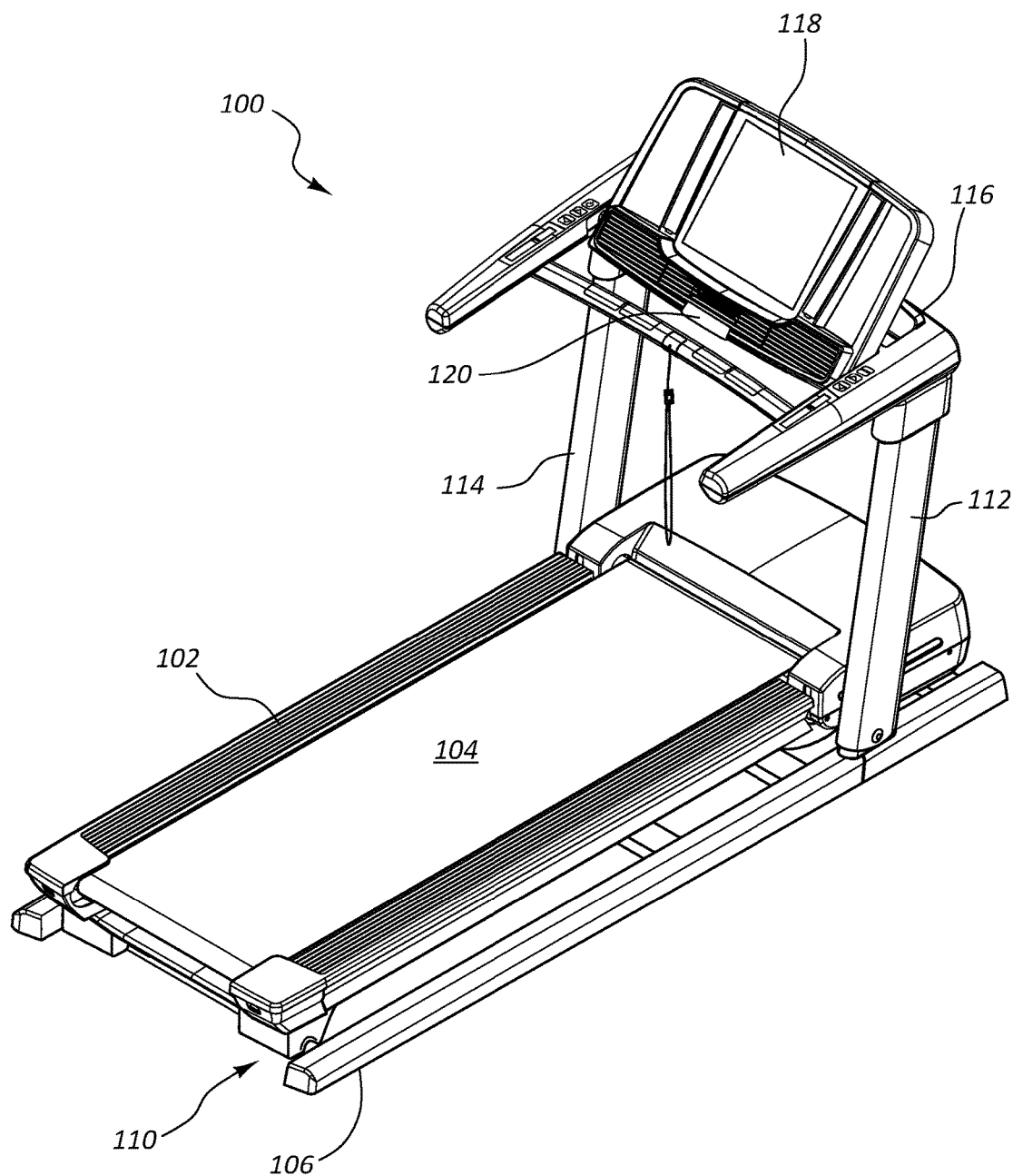
FIG. 1 depicts an example of an exercise machine in accordance with aspects of the present disclosure.

FIG. 1 depicts an example of a treadmill 100 having a deck 102 with a first pulley disposed in a front portion of the deck 102 and a second pulley incorporated into a rear portion of the deck 102. A tread belt 104 surrounds the first pulley and the second pulley. A drive motor is in mechanical communication with either the first pulley or the second pulley.

The rear portion of the deck 102 is attached to a base member 106 of the treadmill's frame. A pivot connection 110 between the rear portion of the deck 102 and the base member 106 allows the front portion of the deck 102 to incline upwards or decline downwards. When the deck 102 inclines or declines, the base member 106 remains stationary.

A first side post 112 is attached to a first side of the base member 106, and a second side post 114 is attached to a second side of the base member 106. In the example depicted in FIG. 1, the first side post 112 and the second side post 114 also remain stationary as the deck 102 inclines and/or declines. The first side post 112 and the second side post 114 collectively support a console 116. The console 116 includes a display 118 and an input mechanism 120 for controlling the deck's incline angle.

Figure 2:
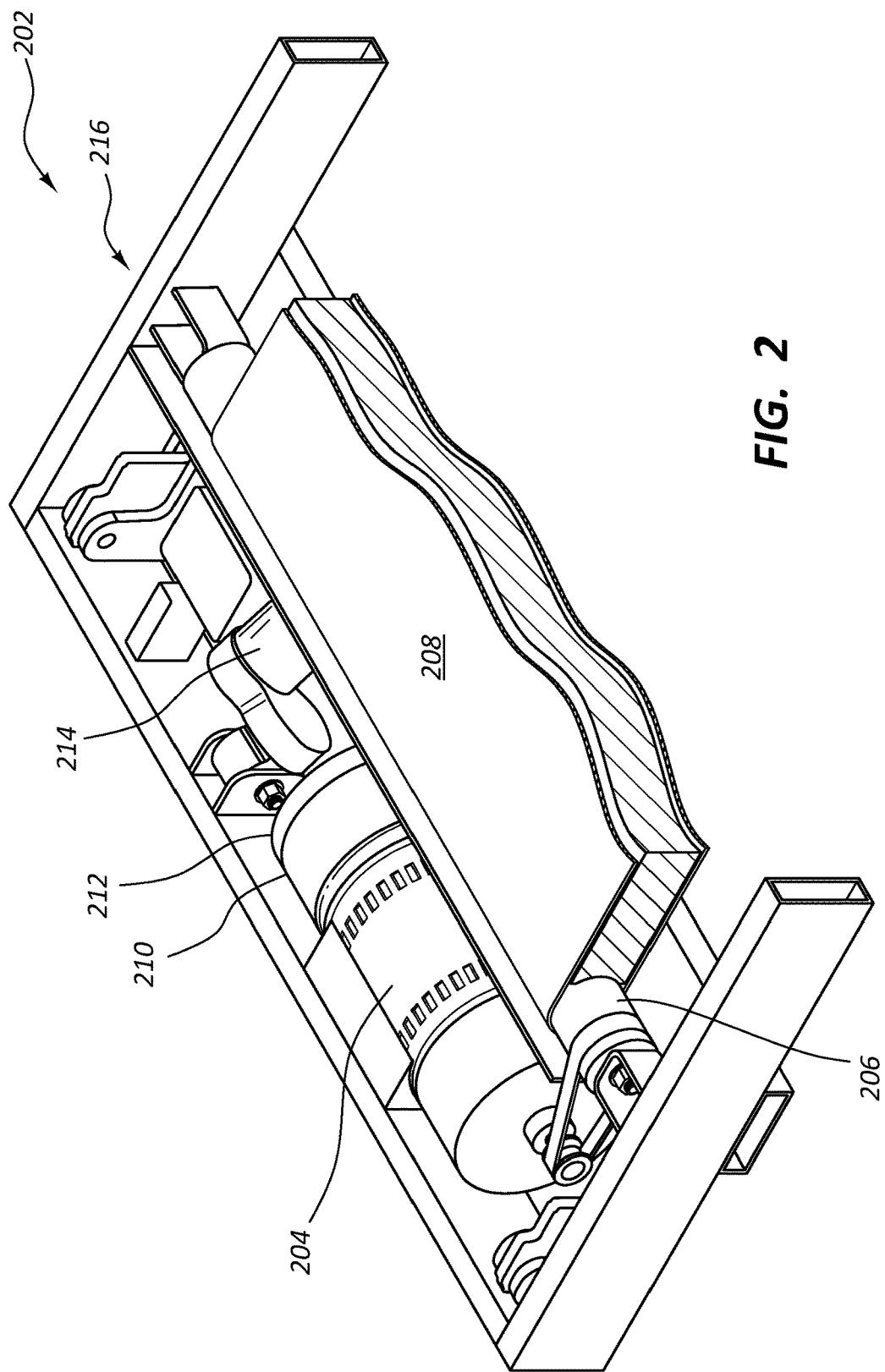
FIG. 2 depicts an example cut-away view of an exercise machine in accordance with aspects of the present disclosure.

FIG. 2 illustrates a cut-away view of an example of a treadmill 202 with a cover removed for illustrative purposes. Inside the cover, a drive motor 204 is disposed adjacent to a pulley 206 that moves the tread belt 208 in a rotational direction. Attached to and coaxial with the drive motor 204 is a flywheel 210. The flywheel 210 rotates with the drive motor 204.

A fan assembly 212 is connected to the flywheel 210 on the side of the flywheel that is away from the drive motor 204. The fan assembly 212 is also coaxial with the drive motor 204. A lift motor 214 is adjacent to the fan assembly 212. The lift motor 214 is oriented so that it is connected to the deck 216 and also to the base frame (not shown) of the treadmill. When activated, the lift motor 214 causes a rod to extend relative to the motor, which pushes against the front portion of the deck and the base frame causing the front portion of the deck to raise. In other situations, when the lift motor 214 is activated, the rod is retracted, which causes the front portion of the deck to lower. In these cases, the lift motor 214 may be transversely oriented with respect to the fan assembly 212.

In some cases, the lift motor 214 is located within inches of the fan assembly 212. In some situations, the lift motor 214 is located less than an inch away from the fan assembly 212. When the drive motor 204 is active, the flywheel 210 and the fan assembly 212 rotate together. The fan assembly 212 causes air to flow around the lift motor 214, which can lower the lift motor's temperature, including due to convection type heat transfer. The other components within the housing may also experience a temperature drop due to the operation of the fan assembly 212.

Figure 3:
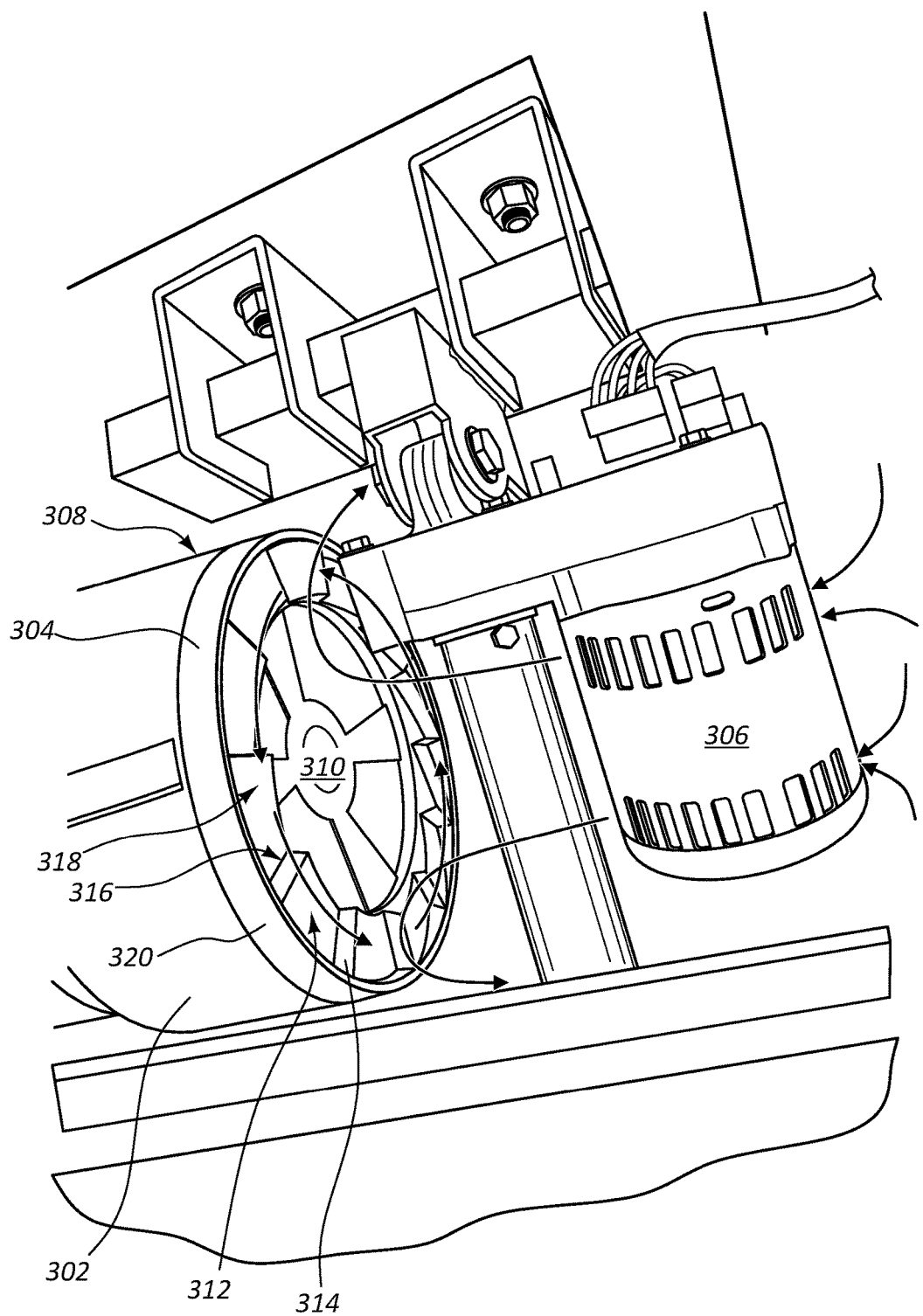
FIG. 3 depicts an example of a cooling mechanism in accordance with aspects of the present disclosure.

FIG. 3 illustrates an example of a treadmill 300 with a cover removed for illustrative purposes. The treadmill 300 includes a flywheel 302 and a fan assembly 304 attached to the flywheel 302. A lift motor 306 is located adjacent to the fan assembly 304.

In this example, the fan assembly 304 includes a ring member 308 that defines a central annulus 310. Distally located with respect to the central annulus 310, a plurality of fan blades 312 or ramps are formed in the ring member's face 314. While any appropriate type of fan blade geometry may be used, the fan blade geometry in this example includes a leading side 316 that forms an edge face that is transversely oriented with a base of the fan assembly 304. A trailing side 318 of the fan blade 312 tapers towards a base of the ring member 308 and towards an adjacent fan blade. A circumferential lip 320 is located on the circumference of the ring member 308. In this example, the circumferential lip has a height that is approximately the height of the leading side 316 of the fan blades 312.

Figure 4A:
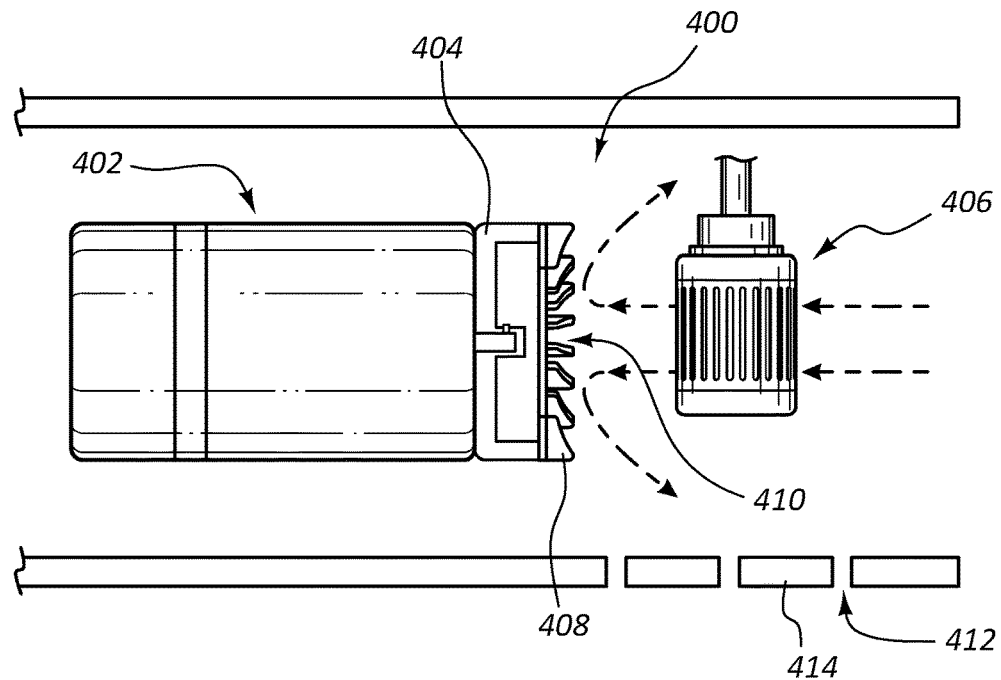
FIG. 4A depicts an example of a cooling mechanism in accordance with aspects of the present disclosure.

FIG. 4A illustrates an example of the cooling mechanism 400. In this example, the cooling mechanism 400 includes the drive motor 402, the flywheel 404, and the fan assembly 408. The lift motor 406 is located adjacent to the drive motor 402.

As the drive motor 402 rotates, the flywheel 404 and fan assembly 408 also rotate. As the fan assembly 408 rotates, air is moved by the blades and a pressure drop is generated in the annulus 410 of the ring member. This pressure drop draws air towards the annulus of the ring member, creating an airflow across the lift motor 406. The fan blades of the fan assembly 408 push air outward across the leading sides of the fan blades towards the circumferential lip of the fan blade. The circumferential lip pushes the airflow forward so that the intake air reverses its direction. In some examples, the airflow is rerouted between 120 degrees to 175 degrees relative to the intake air's initial travel direction.

With the movement of the air generated by the fan assembly, a pressure drop may be generated behind the fan assembly and adjacent the flywheel 404. In this example, the air from behind the fan assembly 408 may be drawn across the drive motor 402 and into the airflow, thereby increasing the air circulation in the entire housing, while also cooling the drive motor. Vent openings 412 may be formed in and defined by the bottom portion 414 of the housing to increase an air exchange between the inside and outside of the motor housing.

Figure 4B:
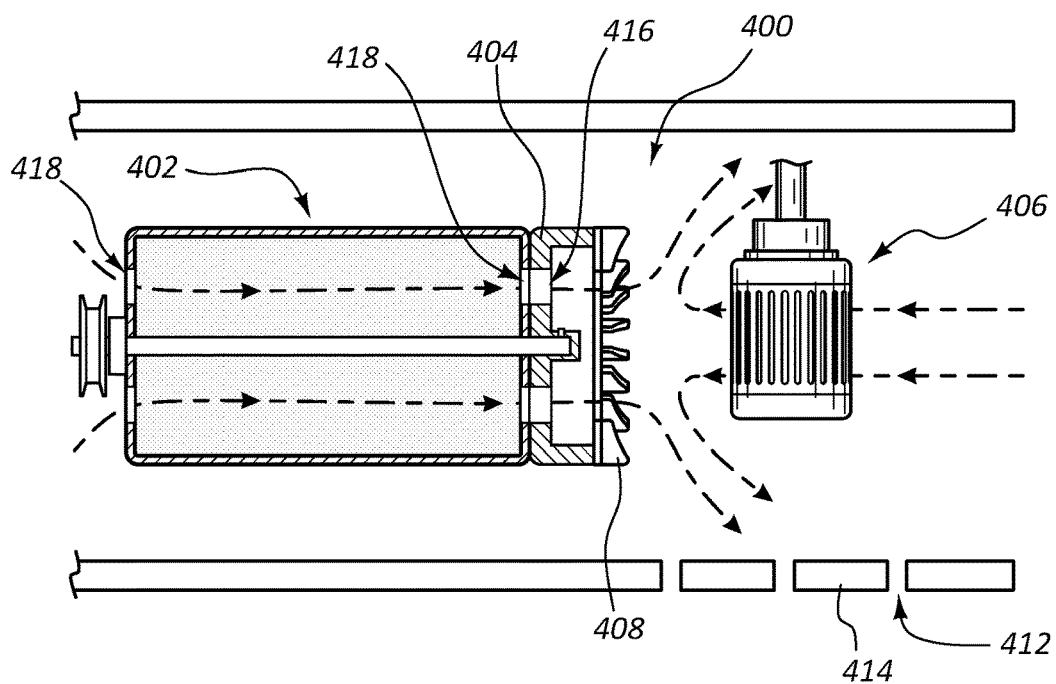
FIG. 4B illustrates a cross-sectional view of an example cooling mechanism in accordance with aspects of the present disclosure.

FIG. 4B illustrates a cross-sectional view of an example variation to the cooling mechanism 400 of FIG. 4A. As illustrated in FIG. 4B, any number of flywheel orifices 416 may be defined by the center portion of the flywheel 404. Similarly, a plurality of motor housing orifices 418 may be defined by the outer housing of the drive motor 402. As illustrated, the inclusion of flywheel orifices 416 and motor housing orifices 418 may create a ventilation passageway that allows for the passage of air through the body of the drive motor 402, through the flywheel orifices 416, where it is then pushed outward across the leading sides of the fan blades towards the circumferential lip of the fan blade, as illustrated in FIG. 4A. This passage of air through the drive motor 402 can cool the drive motor and extend its useful life.

Figure 5:
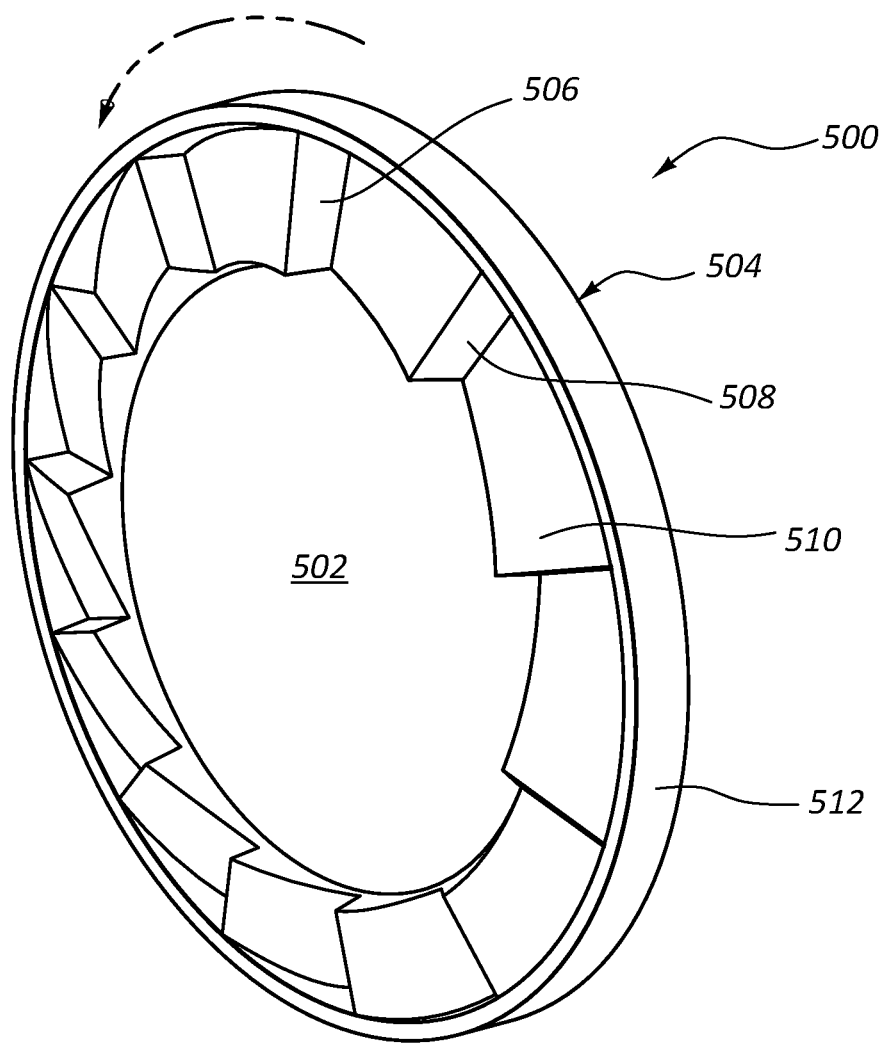
FIG. 5 depicts an example of a cooling mechanism in accordance with aspects of the present disclosure.

FIG. 5 illustrates an example of a cooling mechanism 500. In this example, the cooling mechanism includes an annulus 502 centrally located within the ring member 504. A plurality of fan blades 506 or ramps are distally located on the annulus 502. As shown by the rotation al arrow of FIG. 5, the illustrated cooling mechanism is configured to rotate in a counter-clockwise direction. For ease of explanation, each cooling mechanism will be described and illustrated herein as rotating in a counter-clockwise direction during operation, as viewed from the front of the cooling mechanism. It is understood that the speed, rotation, and/or orientation of each cooling mechanism may be modified and/or reversed to change the resulting airflow properties.

Continuing with FIG. 5, each of the fan blades 506 includes a leading side 508 and a trailing side 510. The leading side 508 includes an edge face that extends from a base of the ring member 504. The trailing side 510 of the fan blade progressively tapers towards an adjacent fan blade and towards the base of the ring member 504. A circumferential lip 512 is disposed distally to the fan blades 506 and includes a height that is substantially the height of the blades' edge face. The ratio of the height of the circumferential lip 512 relative to the height of the blades' edge face may be varied to vary the amount of air displaced and reoriented relative to its initial direction of flow. Furthermore, the geometry, material, and mass of the circumferential lip 512 may be modified to accommodate various balancing techniques, including selectively adding and/or removing material to improve harmonic balance of the cooling mechanism during rotation.

Figure 6:
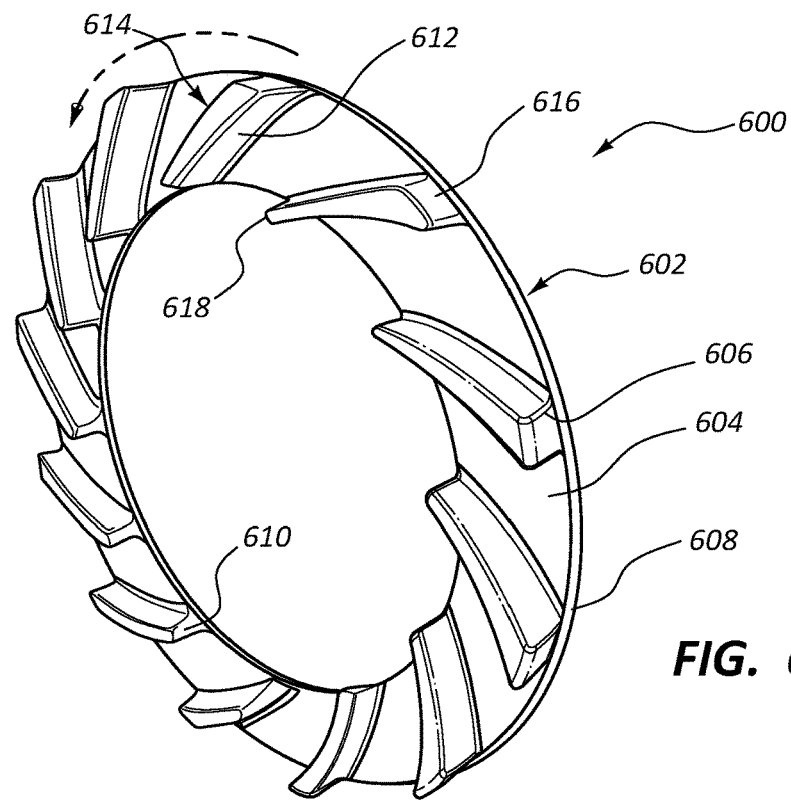
FIG. 6 depicts an example of a cooling mechanism in accordance with aspects of the present disclosure.

FIG. 6 illustrates an example of a cooling mechanism 600. In this example, the cooling mechanism 600 includes a ring member 602 with a fan face 604. A plurality of fan blades 606 are formed in the fan face 604. The fan blades 606 span the fan face from an outer ring diameter 608 to an inner ring diameter 610. Each fan blade 606 includes a trailing side 612, a leading side 614, a distal side 616, and a proximal side 618. In the view orientation of the present example, the leading side 614 of the fan blades is forward of the trailing side 616. Additionally, the cross sectional thickness of the fan blade at the distal side 616 is greater than the fan blade's cross sectional thickness at the proximal side 618. The leading side 614 of the fan blade 606 has a slightly convex surface and the trailing side 612 has a slightly concave surface. In this example, the ring member 602 does not include a circumferential lip, varying the resulting angular flow of the re-directed air.

Figure 7:
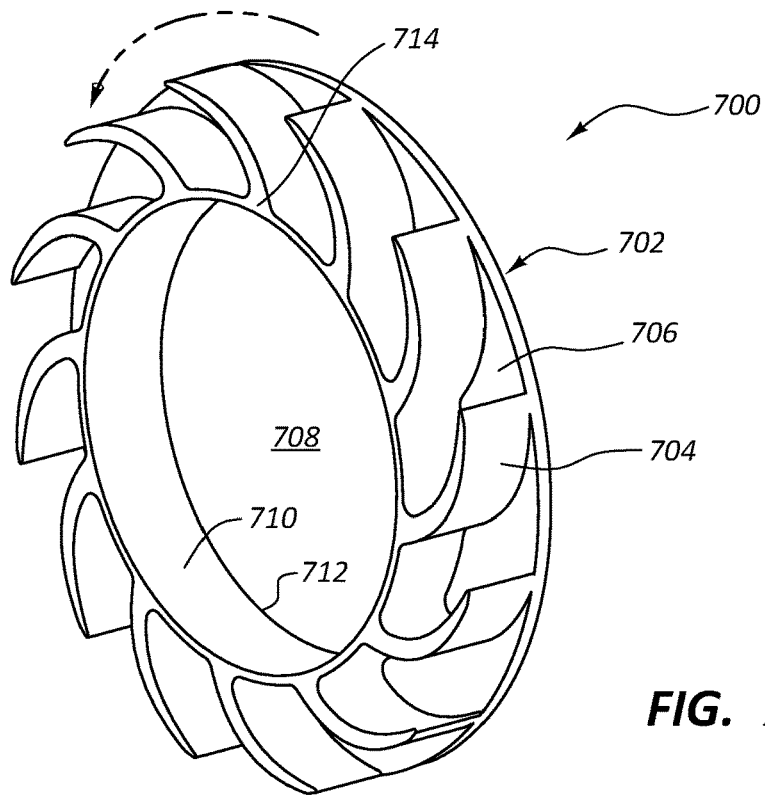
FIG. 7 depicts an example of a cooling mechanism in accordance with aspects of the present disclosure.

FIG. 7 illustrates an example of a cooling mechanism 700. In this example, the ring member 702 includes a plurality of fan blades 704 spaced along the ring's fan face 706. The ring member 702 includes an inner diameter defined by an annulus 708 in the ring member 702. An inner circumferential lip 710 is located on the inner diameter 712, which is integrally formed with the proximal sides 714 of the fan blades 704.

Figure 8:
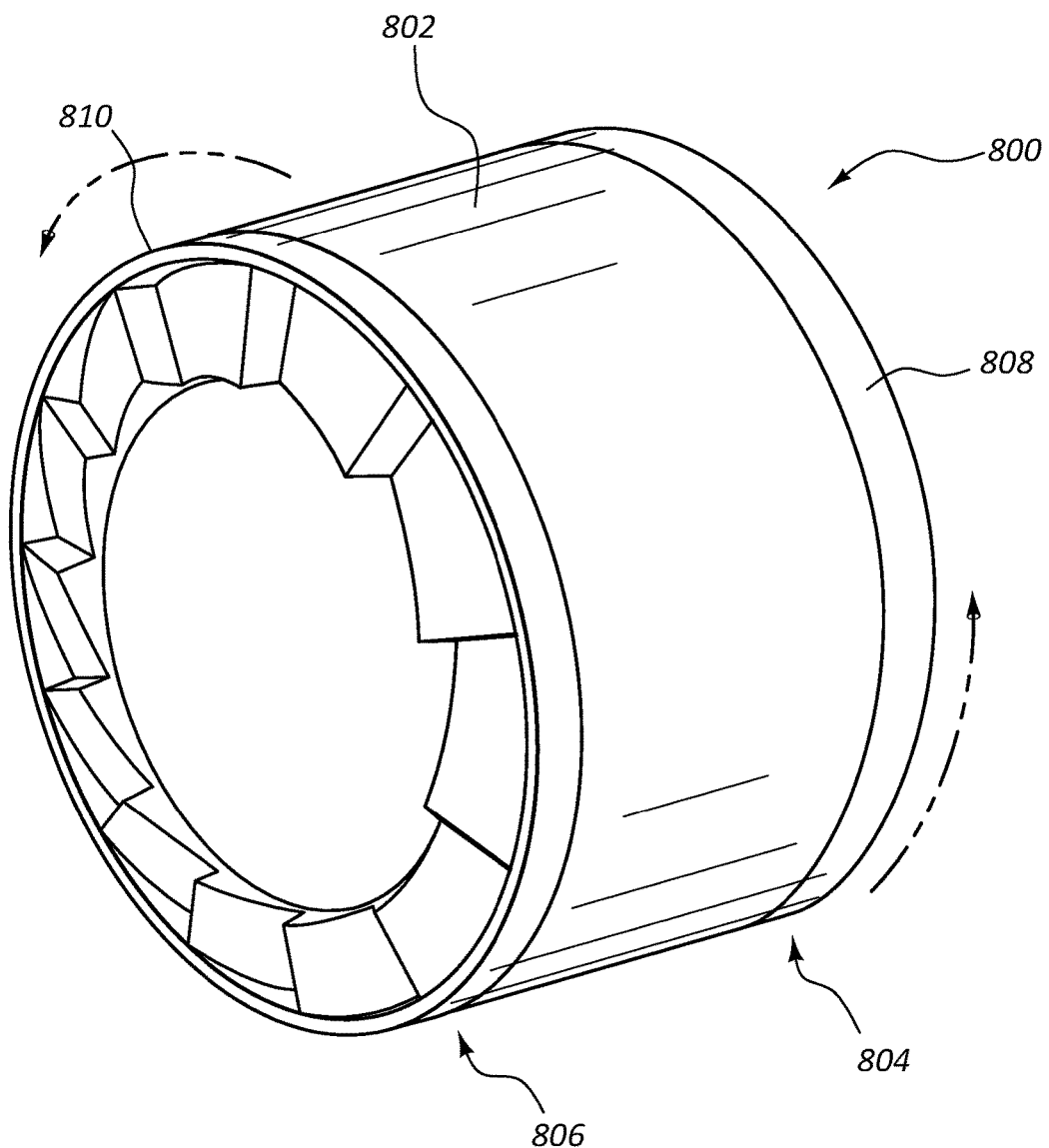
FIG. 8 depicts an example of a cooling mechanism in accordance with aspects of the present disclosure.

FIG. 8 illustrates an example of a cooling mechanism 800. In this example, the cooling mechanism 800 includes a flywheel 802 with a first side 804 and a second side 806 opposite the first side 804. A first fan assembly 808 may be attached to the first side 804, and a second fan assembly 810 may be attached to the second side 806. As the flywheel 802 rotates, the first fan assembly 808 and the second fan assembly 810 may rotate simultaneously causing separate air flows to be generated. In some cases, the lift motor may be primarily cooled by an airflow generated by the first fan assembly 808 and the drive motor may be primarily cooled by an airflow generated by the second fan assembly 810.

Figure 9:
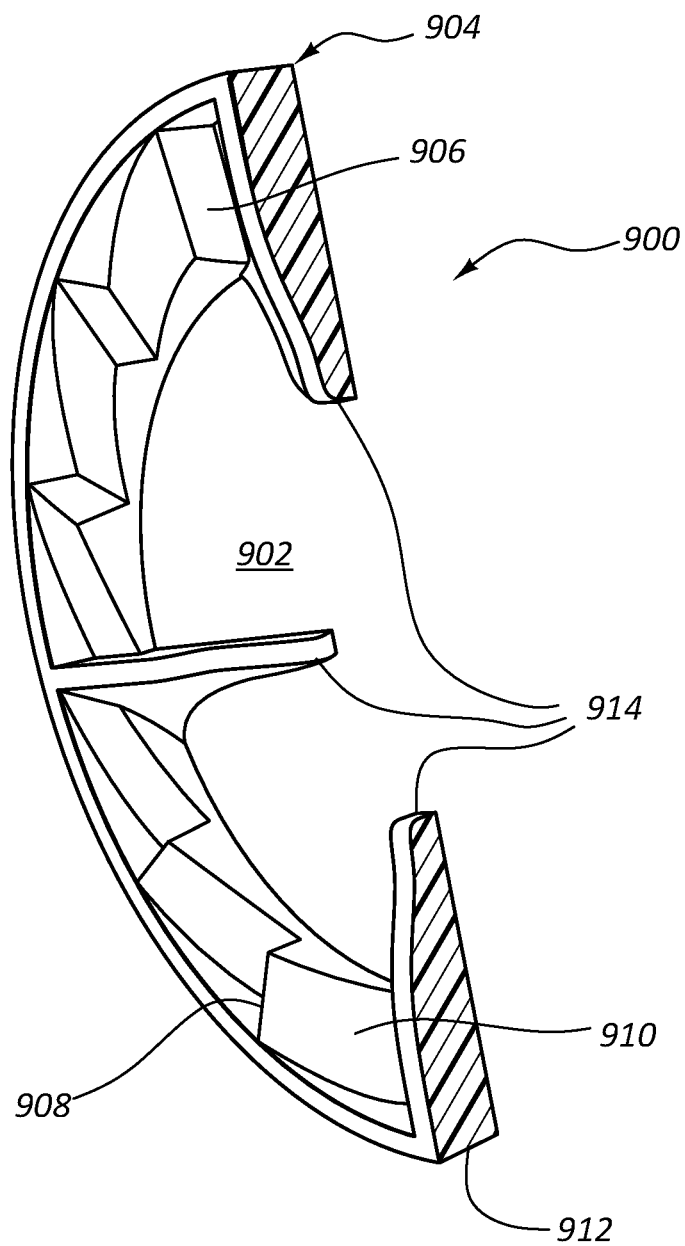
FIG. 9 illustrates a cross-sectional example of a cooling mechanism in accordance with aspects of the present disclosure.

FIG. 9 shows a cross-sectional view of an example of a cooling mechanism 900. Similar to FIG. 5 above, the cooling mechanism includes an annulus 902 centrally located within the ring member 904. A plurality of fan blades 906 or ramps are distally located on the annulus 902. Each of the fan blades 906 includes a leading side 908 and a trailing side 910. A circumferential lip 912 is disposed distally to the fan blades 906 and is illustrated as having a height that is substantially the height of the blades' edge face. Additionally, one or more extended fan blades 914 may extend into the annulus 902 to further aid in the movement of air in and around the cooling mechanism 900. The extended fan blades 914 can assume the same geometry as the fan blades 906, or assume different geometries to selectively modify the airflow within the annulus 902.

Figure 10:
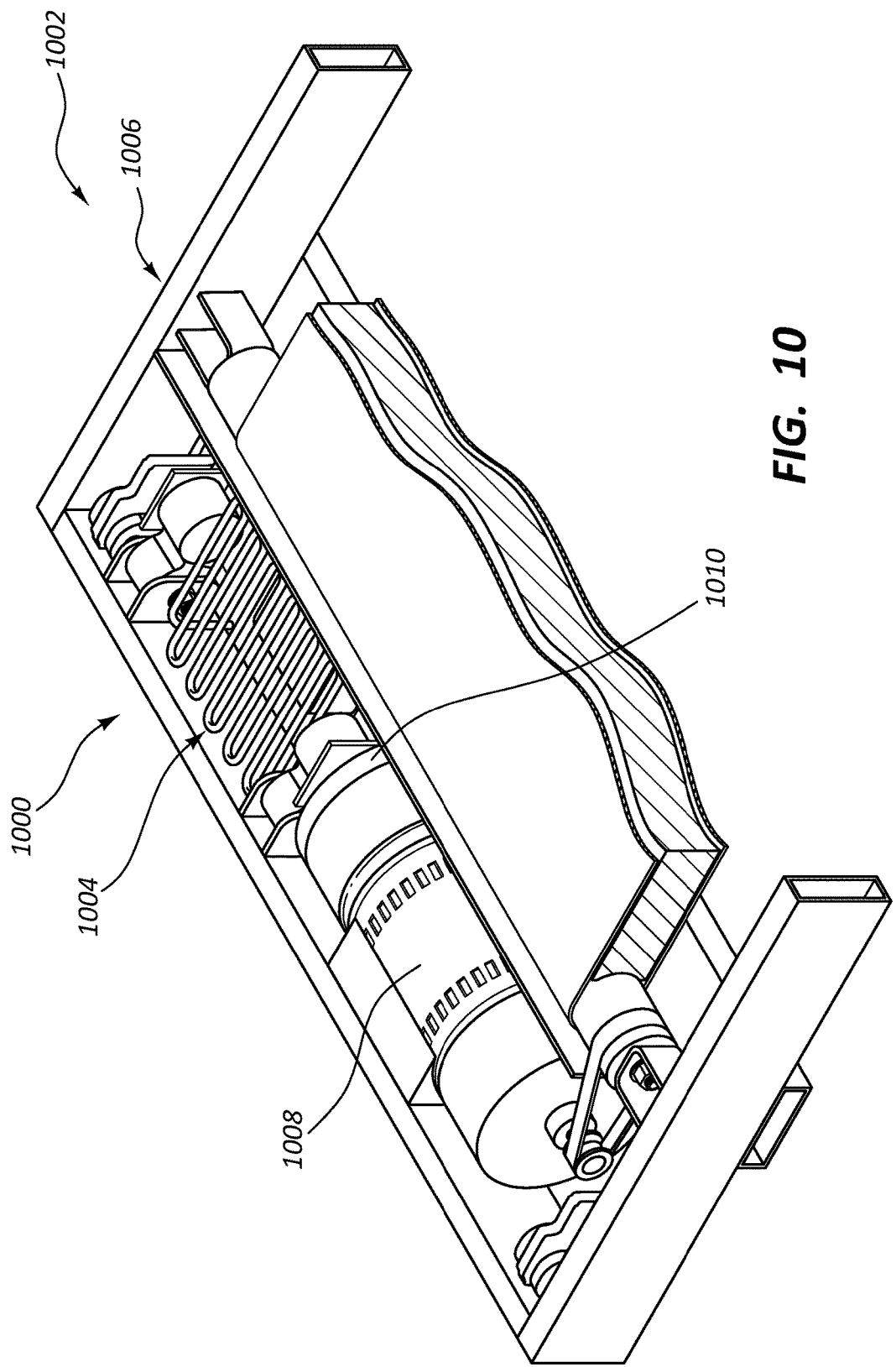
FIG. 10 depicts an example of a cooling mechanism in accordance with aspects of the present disclosure.

FIG. 10 illustrates an example of a cooling mechanism 1000 in a treadmill 1002. In this example, a dump resistor 1004 is located within the housing 1006. For ease of explanation, the lift motor 214 is not shown in FIG. 10. The dump resistor 1004 may be used to dissipate unneeded electricity in the system. In some cases, the drive motor 1008 may be the source of unneeded electricity. For example, in some cases the load on the motor is progressively reduced as the incline on the deck increases because the user's body weight contributes to moving the tread belt. At some incline angles, particularly those above 12% grade, the user's body weight may generate all the force necessary to move the tread belt, so that there is no load on the drive motor. At even steeper incline angles, the user's body weight moves the tread belt, which correspondingly moves the pulley and therefore the drive motor 908 to the point where the drive motor 1008 generates electricity. This generated electricity may be directed to the dump resistor 1004, which converts the unneeded electricity into heat. The dissipated heat increases the temperature in the housing. The fan assembly 1010 may be used to cool the interior of the housing by drawing air across the dump resistor 1004. As illustrated, the dump resistor may be in the form of a coiled heating element.

GENERAL DESCRIPTION

In general, the invention disclosed herein may provide users with an exercise machine that can cool its internal components during the performance of an exercise. In some cases, a workout program may involve raising and lowering the deck. Each time that the deck is moved upwards or downwards, a demand is made on the lift motor. Lift motors are not generally designed to be used continuously throughout a workout. Typically, an exercise program performed on a treadmill involves moving the deck to an incline and keeping the deck at that angle for a portion of the workout. The lift motor may generate heat as it is used. Under some conditions, the heat generated in the lift motor degrades the seals, fluids, and other lift motor components. Additionally, after consistent extreme use, a lift motor typically benefits from a period of inactivity to allow for heat dissipation and normalization of the fluids and seals contained in the lift motor. The cooling mechanisms described herein may be used to lower the temperature of the lift motor, thereby extending its ability to operate continually and extending its useful life between maintenance and rebuild.

In some cases, when the lift motor increases its temperature, the components around the lift motor may also experience an elevated temperature. Similarly, the other internal components of a treadmill experience periods of increased temperature. Thus, the lift motor may increase the temperature of the exercise machine's other components, and vice-versa, which can negatively impact their performance.

The deck may include a first pulley located in a front portion of the deck and a second pulley located in a rear portion of the deck. A tread belt may surround the first and second pulleys and provide a surface on which the user may exercise. At least one of the first pulley and the second pulley may be connected to a drive motor so that when the drive motor is active, the pulley rotates. As the pulley rotates, the tread belt moves as well. The user may exercise by walking, running, or cycling on the tread belt's moving surface.

The deck may be capable of having its front portion raised and lowered as well as its rear portion raised and lowered to control the lengthwise slope of the running deck. With these elevation controls, the orientation of the running deck can be adjusted as desired by the user or as instructed by a programmed workout. In those examples where the treadmill is involved with simulating a route that involves changes in elevation, the running deck can be oriented to mimic the elevation changes in the route while the user performs an exercise on the deck.

In one example, the lengthwise slope and/or lateral tilt angle of the deck can be controlled with one or more lift motors. In one example, a single lift motor connects the deck and the exercise machine's base. In this example, when the single lift motor extends a rod, the deck's incline angle increases and when the lift motor retracts the rod, the deck's incline angle decreases.

Any appropriate trigger may be used to cause the lift motor to change the deck's incline angle. In some cases, the incline angle is changed in response to an input from the user, a simulated environment, a programmed workout, a remote device, another type of device or program, or combinations thereof.

In some cases, the exercise machine includes a console attached to an upright structure. In some cases, the upright structure includes a first post adjacent to a first side of the deck and a second post adjacent to a second side of the deck. In this example, the console is supported by the first and second post. The deck moves independently of the first and second posts and also moves independently of the console. In other examples, the posts may move with the deck as the deck's incline angle changes.

The console may locate a display screen and the treadmill's controls within a convenient reach of the user to control the operating parameters of the deck. For example, the console may include controls to adjust the speed of the tread belt, adjust a volume of a speaker integrated into the treadmill, adjust an incline angle of the running deck, adjust a decline of the running deck, adjust a lateral tilt of the running deck, select an exercise setting, control a timer, change a view on a display of the console, monitor the user's heart rate or other physiological parameters during the workout, perform other tasks, or combinations thereof. Buttons, levers, touch screens, voice commands, or other mechanisms may be incorporated into the console and can be used to control the capabilities mentioned above. Information relating to these functions may be presented to the user through the display. For example, a calorie count, a timer, a distance, a selected program, an incline angle, a decline angle, a lateral tilt angle, another type of information, or combinations thereof may be presented to the user through the display.

The treadmill may include preprogrammed workouts that simulate an outdoor route. In other examples, the treadmill has the capability of depicting a real world route. For example, the user may input instructions through the control console, a mobile device, another type of device, or combinations thereof to select a course from a map. This map may be a map of real world roads, mountain sides, hiking trails, beaches, golf courses, scenic destinations, other types of locations with real world routes, or combinations thereof. In response to the user's selection, the display of the control console may visually depict the beginning of the selected route. The user may observe details about the location, such as the route's terrain and scenery. In some examples, the display presents a video or a still frame taken of the selected area that represents how the route looked when the video was taken. In other examples, the video or still frame is modified in the display to account for changes to the route's location, such as real time weather, recent construction, and so forth. Further, the display may also add simulated features to the display, such as simulated vehicular traffic, simulated flora, simulated fauna, simulated spectators, simulated competitors, or other types of simulated features. While the various types of routes have been described as being presented through the display of the control console, the route may be presented through another type of display, such as a home entertainment system, a nearby television, a mobile device, another type of display, or combinations thereof.

In addition to simulating the route through a visual presentation of a display, the treadmill may also modify the orientation of the running deck to match the inclines and slopes of the route. For example, if the beginning of the simulated route is on an uphill slope, the running deck may be caused to alter its orientation to raise the front portion of the running deck. Likewise, if the beginning of the simulated route is on a downward slope, the rear portion of the running deck may be caused to elevate to simulate the decline in the route. Also, if the route has a lateral tilt angle, the running deck may be tilted laterally to the appropriate side of the running deck to mimic the lateral tilt angle.

While the programmed workout or the simulated environment may send control signals to orient the deck, the user may, in some instances, override these programmed control signals by manually inputting controls through the console. For example, if the programmed workout or the simulated environment cause the deck to be steeper than the user desires, the user can adjust the deck's orientation with the controls in the console.

Any appropriate type of lift motor may be used in accordance with the principles described herein. For example, a non-exhaustive list of lift motors that may be used includes screw motors, linear actuators, hydraulic motors, pneumatic motors, solenoids, electro-mechanical motors, other types of lift motors, or combinations thereof. Further, the lift motor may be powered with compressed gas, electricity, magnetic fields, other types of power sources, or combinations thereof. Further, the lift motors may also have the ability to laterally tilt the running deck to any appropriate angle formed between a running surface of the running deck and the surface upon which the treadmill rests. For example, the range of the lateral tilt angle may span from negative 55 degrees to positive 55 degrees or any range there between.

Any appropriate type of drive motor may be used to drive the tread belt in a rotational direction. In some examples, the drive motor may be an alternating current motor that draws power from an alternating power source, such as the power circuit of a building. In some cases, the drive motor is a direct current motor. In some of the examples with a direct current motor, the direct current motor draws power from a building power circuit, but the alternating current is converted to direct current.

A flywheel may be connected to a portion of the drive motor so that the flywheel rotates when the drive motor is active. The flywheel may store rotational energy and assist with moving the tread belt at a consistent speed. In some examples, the flywheel has a common rotational axis with the drive motor. In these examples, the flywheel may be connected to the drive motor with an axle. In other situations, the flywheel is attached directly to a side of the drive motor. The flywheel may include any appropriate size, shape, length, width, and weight in accordance with the principles described herein.

The lift motor may operate independent of the drive motor. In some examples, the lift motor may be active when the drive motor is dormant. In other situations, the drive motor may be active when the lift motor is dormant. In some situations, the lift motor and the drive motor may be operated simultaneously, but driven in response to different command sources.

In some cases, the drive motor, flywheel, and the lift motor reside within a common housing. The housing may be incorporated into the deck adjacent to at least one of the motors. In some cases, a lift motor is incorporated in the front portion of the deck, and the housing is located in the front housing of the deck. In other examples, a lift motor is incorporated into a rear portion of the deck, and the housing is incorporated in the rear portion of the deck. In other examples, deck includes a lift motor in the front portion of the deck and in the rear portion of the deck where the elevation of the front and rear portions of the deck can be controlled independently.

The temperature of the lift motor may increase based on continued use or from other causes. A cooling mechanism may be incorporated into the housing to lower the internal temperature of the housing and/or lower the lift motor's temperature. In some examples, the cooling mechanism includes a fan assembly that is attached to the flywheel. The cooling mechanism may be attached to the flywheel by any number of securing methods and systems including, but in no way limited to, adhesive, fasteners, and the like. Alternatively, the cooling mechanism may be formed directly on, or as an integral part of the flywheel. According to this embodiment, the cooling mechanism may be formed on the flywheel via machining, simultaneous casting, metal injection molding, 3-D printing, combinations thereof, and the like.

Any appropriate type of fan assembly may be used in accordance with the principles described in the present disclosure. In one example, the fan assembly includes a ring member that defines a central annulus. The ring member may include a fan face and an attachment face opposite of the fan face. The attachment face may connect to the flywheel, and a fan blade may be formed on the fan face. In some examples, the fan blade includes a geometry that forces air to move in response to the rotation of the ring element. In some cases, the fan blades are protrusions that extend beyond the fan face. These blades may include any appropriate type of shape including, but not limited to, a generally rectangular shape, a generally crescent shape, a generally square shape, another general shape, or combinations thereof. In some cases, the blade generates lift, which causes the high and low pressure regions of the air in the immediate vicinity of the blade as the ring element rotates. In other instances, the blade forces airflow via disruption of space, imparting a force on and causing movement of the air molecules.

In some cases, the ring element includes a lip that protrudes from the fan face's edge and extends away from the fan face in the same direction as the fan blade extends from the fan face. The lip may extend away from the fan face at the same distance as the fan blades. In some cases, the circumferential lip may extend away from the fan face at a greater distance than the fan blade. In yet other examples, the fan blades may extend from the fan face at a greater distance than the lip extends. The lip may contribute to directing the airflow generated by the fan assembly.

In some examples, a low pressure region is generated within the annulus of the ring element when the fan assembly rotates. As a result, air is pulled into the annulus. In those examples where the ring member is attached to the side of the flywheel, the flywheel blocks air from traveling through the annulus which focuses the airflow to the side. The shape of the fan blades may also direct the airflow to the side. The air that is directed to the ring member's side is forced forward of the fan face as the air moves towards the lip attached to the ring's circumferential edge. The lip blocks the air from flowing directly off of the ring element's side. Thus, the airflow that is pulled towards the annulus of the ring member is rerouted to move in an opposing direction. In some cases, the airflow is rerouted approximately 180 degrees. In some examples, the airflow is rerouted between approximately 120 degrees to approximately 175 degrees. The redirected airflow may be contained within the housing. As the redirected airflow travels off of the fan face at an angle, the airflow may generate low pressure regions behind the fan assembly. These low pressure regions may cause air to flow within other regions within the housing, including across the drive motor.

In other examples, the ring member includes a fan face without the circumferential lip. In these examples, the air flow may exit the fan face directly off of the ring member's side. Initial testing shows that those ring members with a circumferential lip on the ring's outer diameter result in a fifty percent noise reduction relative to those ring members without a circumferential lip, without materially reducing the cooling effect.

The lift motor may be located on the fan side of the ring member within the housing. Thus, when the flywheel rotates, the fan assembly may draw in air into the annulus so that air is pulled across the lift motor. As a result, the airflow may remove heat from the lift motor. In other examples, the lift motor may be located elsewhere within the housing and the entire interior of the housing may be lowered as a result of the fan assembly's operation. In some cases, the housing may include vent openings that allow hot air to exit the housing and cool air to be drawn into the housing. The vent openings may be located on an underside of the housing to prevent sweat, liquid, debris, or other substances from falling into the vent holes.

The cooling mechanism as described herein may lower the temperature of the machine's components located within the housing. In particular, the fan assembly may be oriented to generate an airflow across the lift motor to cool the lift motor. Lowering the temperature of the lift motor may reduce the rate of degradation of the lift motor's seals, fluids, and other components. Further, initial testing of cooling mechanisms as described herein have lowered the temperature of the internal housing by approximately 20 degrees Celsius. Another benefit to the cooling mechanism as described herein is the effective temperature differential in a tight space that cannot accommodate bulky or large cooling assemblies.

While the examples above have been described with reference to cooling the lift motor, the cooling mechanism may be used to cool other exercise machine components in addition to or in lieu of the lift motor. For example, some exercise machines may include a printed circuit board with cooling fins. The increased air flow may make the fins of the printed circuit board remove heat more effectively.

In some examples, the load on the drive motor diminishes as the incline of the deck increases. As the incline angle of the deck increases, the user's body weight pushes the tread belt down the length of the deck. In some cases, when the deck's incline angle reaches 12 degrees, the user's body weight is sufficient to drive movement of the tread belt. This can cause the electric motor to operate in reverse, causing the motor to generate electricity. The generated electricity can be directed to a dump resistor where the electricity is converted into heat. In examples where the dump resistor is located within the housing, the fan assembly may direct an airflow across the dump resistor to remove the resistor's heat. In some cases, the dump resistor may have a coiled geometry to maximize the surface area and heat transfer efficiency of the dump resistor. In other examples, the dump resistor may have a flat geometry with multiple turns. Regardless of the dump resistor's geometry, the increased airflow across the resistor's surface may reduce the resistor's temperature.

In some examples, the flywheel is connected to multiple fan assemblies. For example, a first fan assembly may be connected to a first side of the flywheel, and a second fan assembly may be connected to a second side of the flywheel that is opposite of the first side. The first fan assembly may generate a first airflow that causes air to pass through the lift motor while the second fan assembly may generate a second airflow that causes air to pass through the drive motor which may lower the temperature of the drive motor. In other examples, additional fan assemblies may be connected to the flywheel with an axle. In this type of example, the fan assemblies may be connected in series and be spaced apart from each other.

In some cases, the fan assembly is attached to the flywheel. In other examples, the fan assembly is integrally formed in the flywheel. Further, in some cases, the fan assembly is attached to the side of the flywheel. In yet other examples, the fan assembly is disposed about the circumference of the flywheel.

In some examples, the fan assembly may be a centrifugal fan where the fan assembly includes an impeller that includes a series of blades. The fan assembly blows air at right angles to the intake of the fan through a centrifugal force.

While the examples above describe a cooling mechanism that can be used in relation to a treadmill, the cooling mechanism may be used in any appropriate type of exercise machine. For example, the fan assembly may be attached to the flywheel of a resistance mechanism. In these types of examples, the resistance mechanisms may be incorporated into stationary bikes, elliptical trainers, rowing machines, or other types of exercise machines. The fan assemblies may be used to cool the components of the exercise machine. These components may include motors, lift motors, dump resistors, electronics, bearings, sensors, other types of components, or combinations thereof.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples described herein, but is to be accorded the broadest scope consistent with the principles and novel features disclosed herein.

What is claimed is:

1. An exercise machine, comprising:
    a deck;
    a lift motor connected to the deck; and
    a cooling mechanism that cools the lift motor when the cooling mechanism is activated, the cooling mechanism including:
        a ring member, wherein a circumferential lip is formed on a distal circumference of the ring member; and
        at least one fan blade formed on the ring member.

2. The exercise machine of claim 1, wherein the ring member includes a fan assembly that includes the at least one fan blade.

3. The exercise machine of claim 2, further comprising:
    a flywheel;
    wherein the fan assembly is attached to the flywheel; and
    wherein the fan assembly is configured to generate an airflow that directs air across the lift motor.

4. The exercise machine of claim 3, wherein the fan assembly is configured to push air towards the lift motor during operation.

5. The exercise machine of claim 3, wherein the fan assembly is configured to draw in air towards the fan assembly during operation.

6. The exercise machine of claim 3, further comprising:
a first pulley incorporated into the deck;
a tread belt incorporated into the deck and in engagement with the first pulley; and
a drive motor in mechanical communication with the first pulley;
wherein the flywheel is rotationally fixed to the drive motor; and
wherein the drive motor causes the tread belt to move in a rotational direction and causes the flywheel to spin.

7. The exercise machine of claim 6, further comprising:
a second pulley incorporated into the deck at an opposite end of the deck relative to the first pulley;
wherein the tread belt surrounds the first pulley and the second pulley.

8. The exercise machine of claim 6, wherein the drive motor, the flywheel, and the fan assembly are coaxial; and
wherein the fan assembly is located adjacent to the lift motor.

9. The exercise machine of claim 8, further comprising:
a second fan assembly connected to a second side of the flywheel;
wherein the second fan assembly is configured to generate a second airflow that passes over the drive motor when the flywheel rotates.

10. The exercise machine of claim 6, further comprising:
a dump resistor connected to the drive motor;
wherein the dump resistor is positioned within the airflow generated by the fan assembly.

11. The exercise machine of claim 1, the ring member forming an annulus and wherein the ring member is configured to generate a pressure drop within the annulus when the ring member is rotating.

12. The exercise machine of claim 1,
wherein the circumferential lip is distal to the at least one fan blade.

13. The exercise machine of claim 1, further comprising:
a housing;
at least one vent defined by a bottom side of the housing;
wherein the lift motor and the cooling mechanism are located within the housing.

14. A treadmill, comprising:
a deck;
a first pulley incorporated into the deck;
a tread belt incorporated into the deck and in engagement with the first pulley;
a drive motor in mechanical communication with the first pulley;
a flywheel being rotationally fixed with respect to the drive motor, wherein the flywheel is coaxial with the drive motor and the drive motor is configured to cause the tread belt to move in a rotational direction and cause the flywheel to spin;
a lift motor connected to the deck; and
a fan assembly that is configured to cool the lift motor when activated;
wherein the fan assembly is attached to and coaxial with the flywheel; and
wherein the fan assembly is configured to generate an airflow that directs air across the lift motor.

15. The treadmill of claim 1, the at least one blade having a leading side transversely oriented with a base of the ring member, the circumferential lip having a lip height that is approximately the same as a blade height of the leading side of the at least one fan blade.

* * * * *